United States Patent Office 3,395,245
Patented July 30, 1968

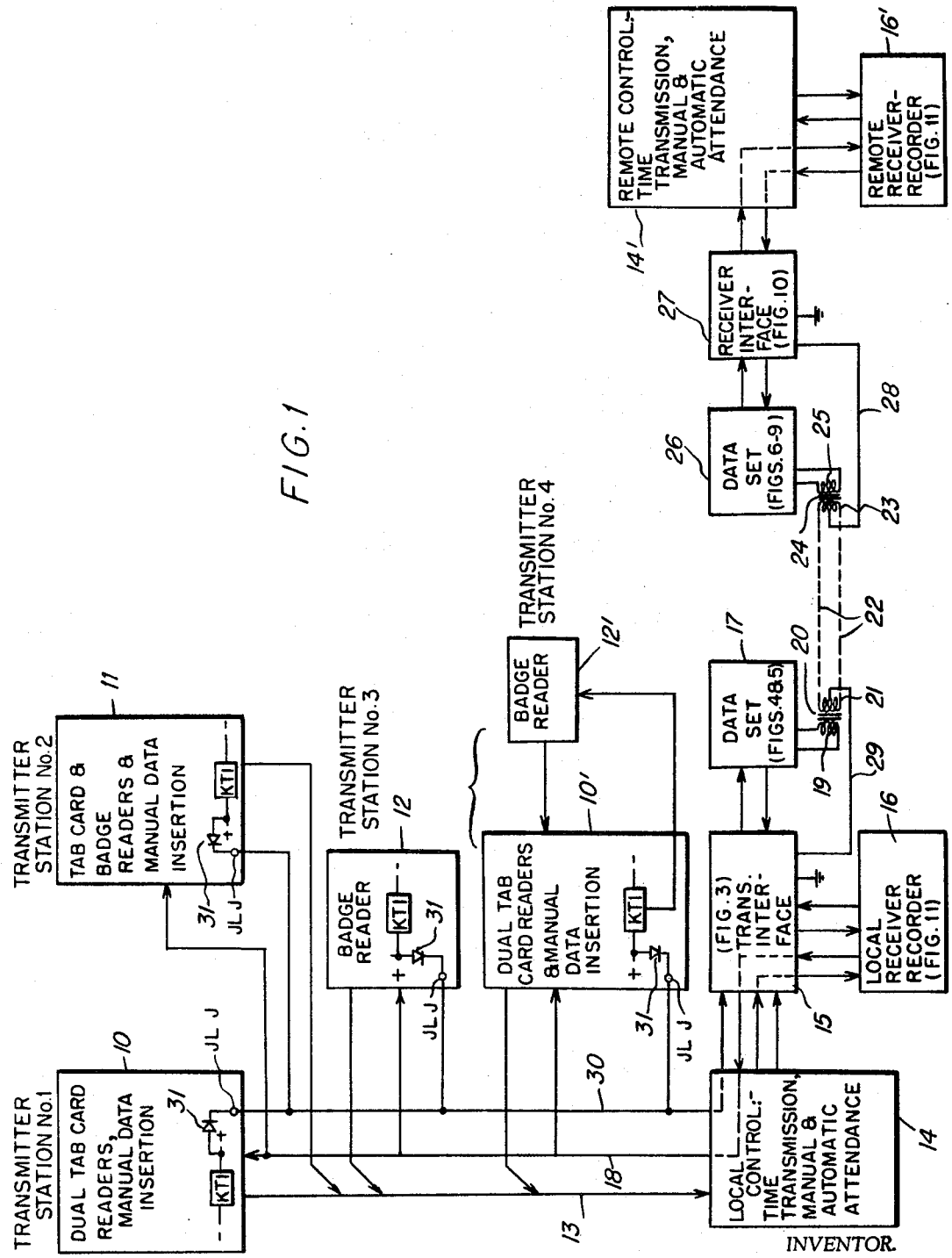

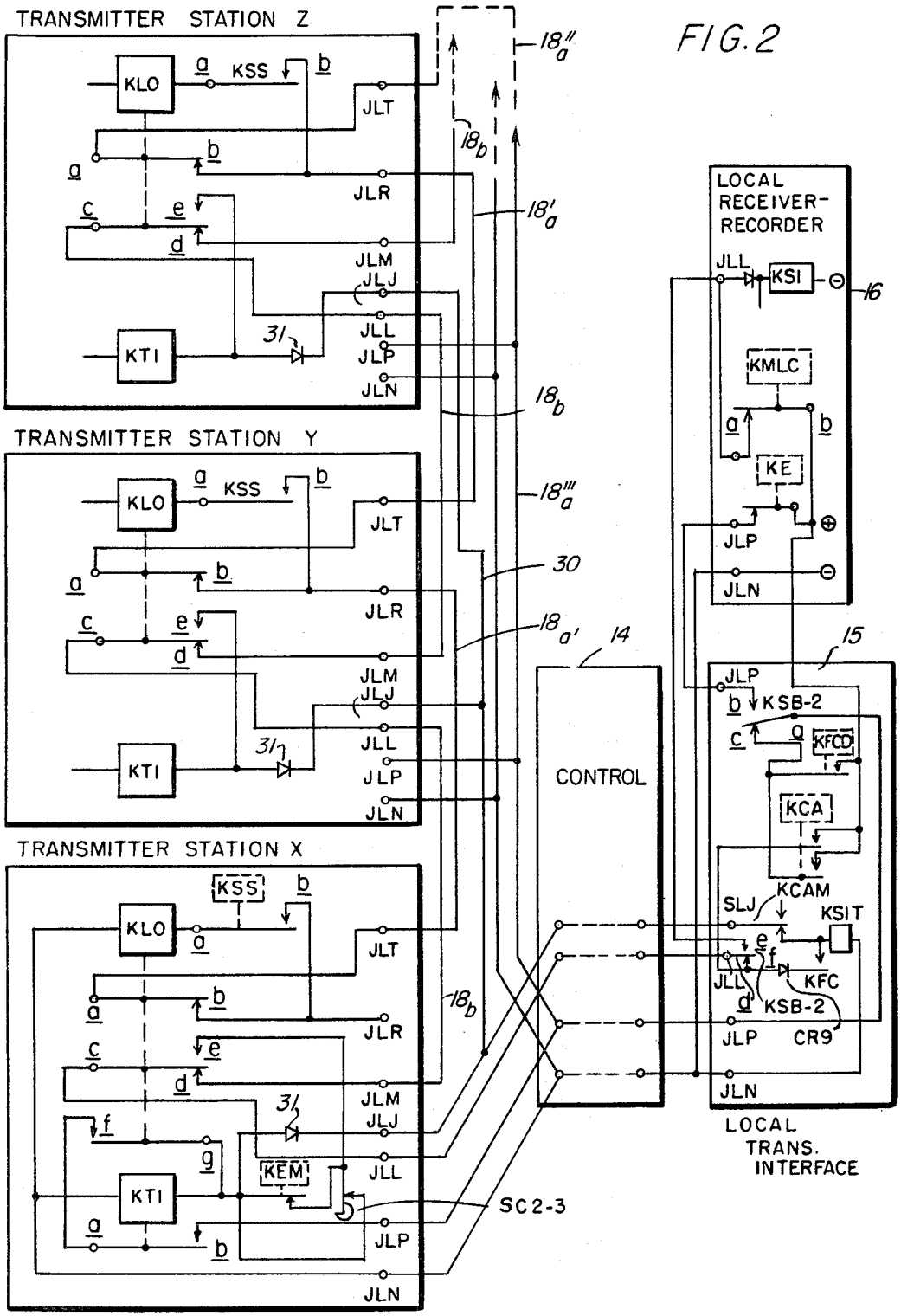

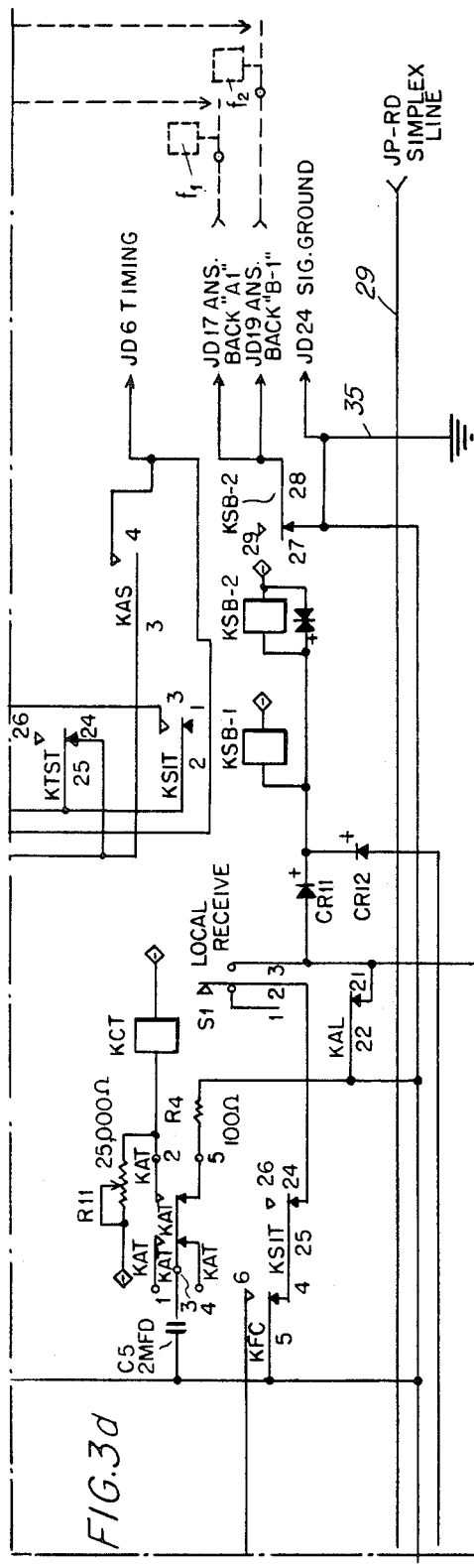

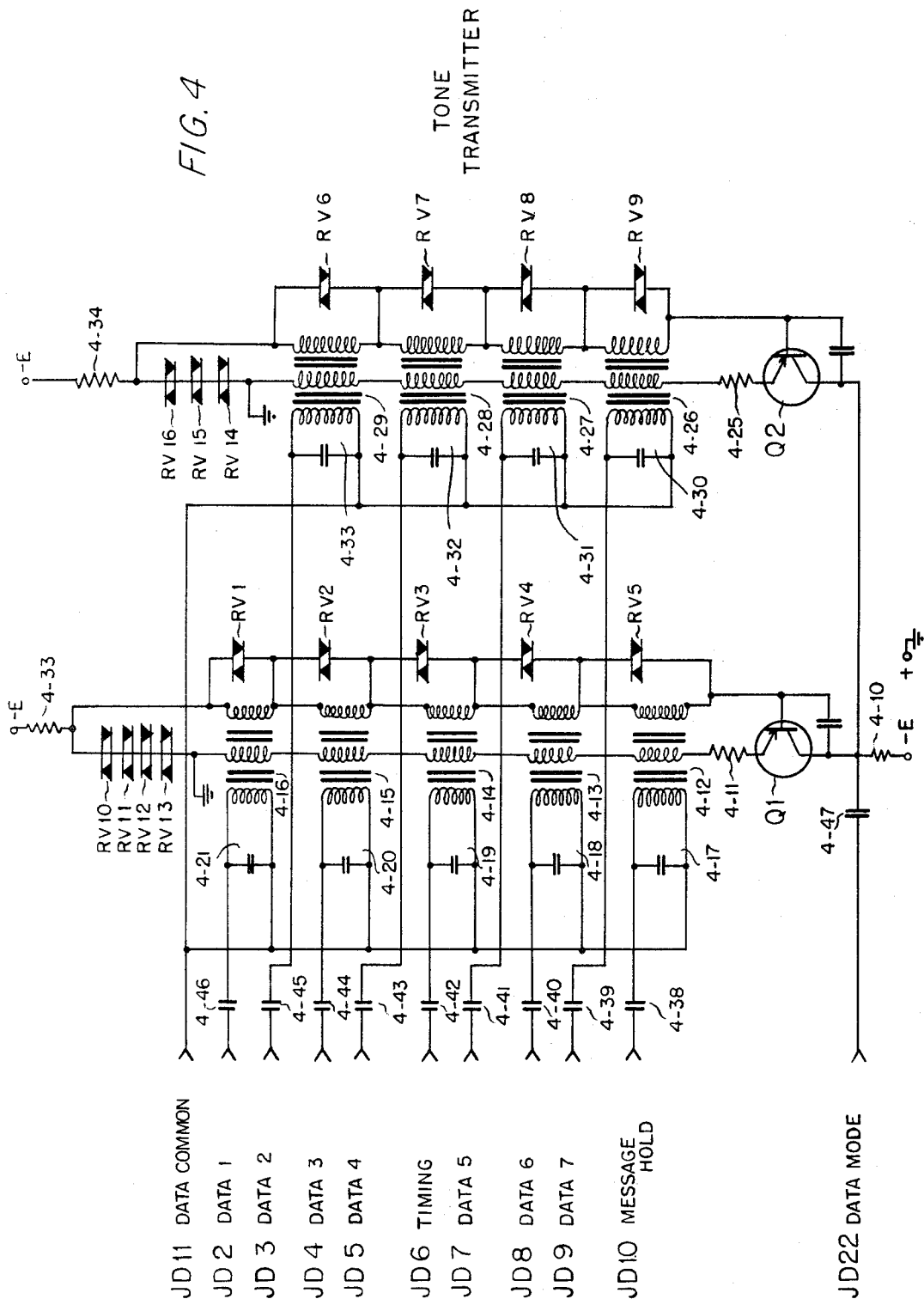

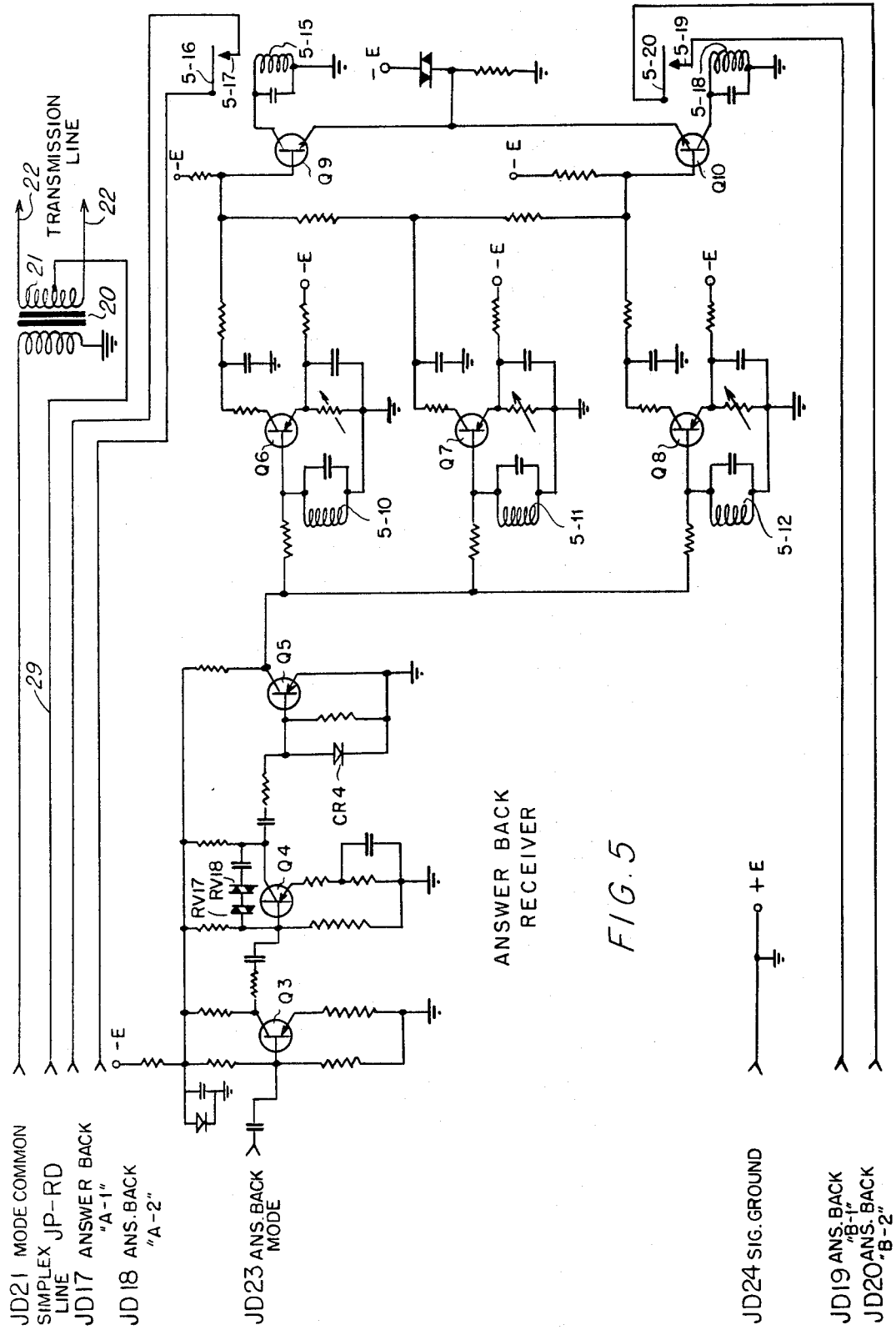

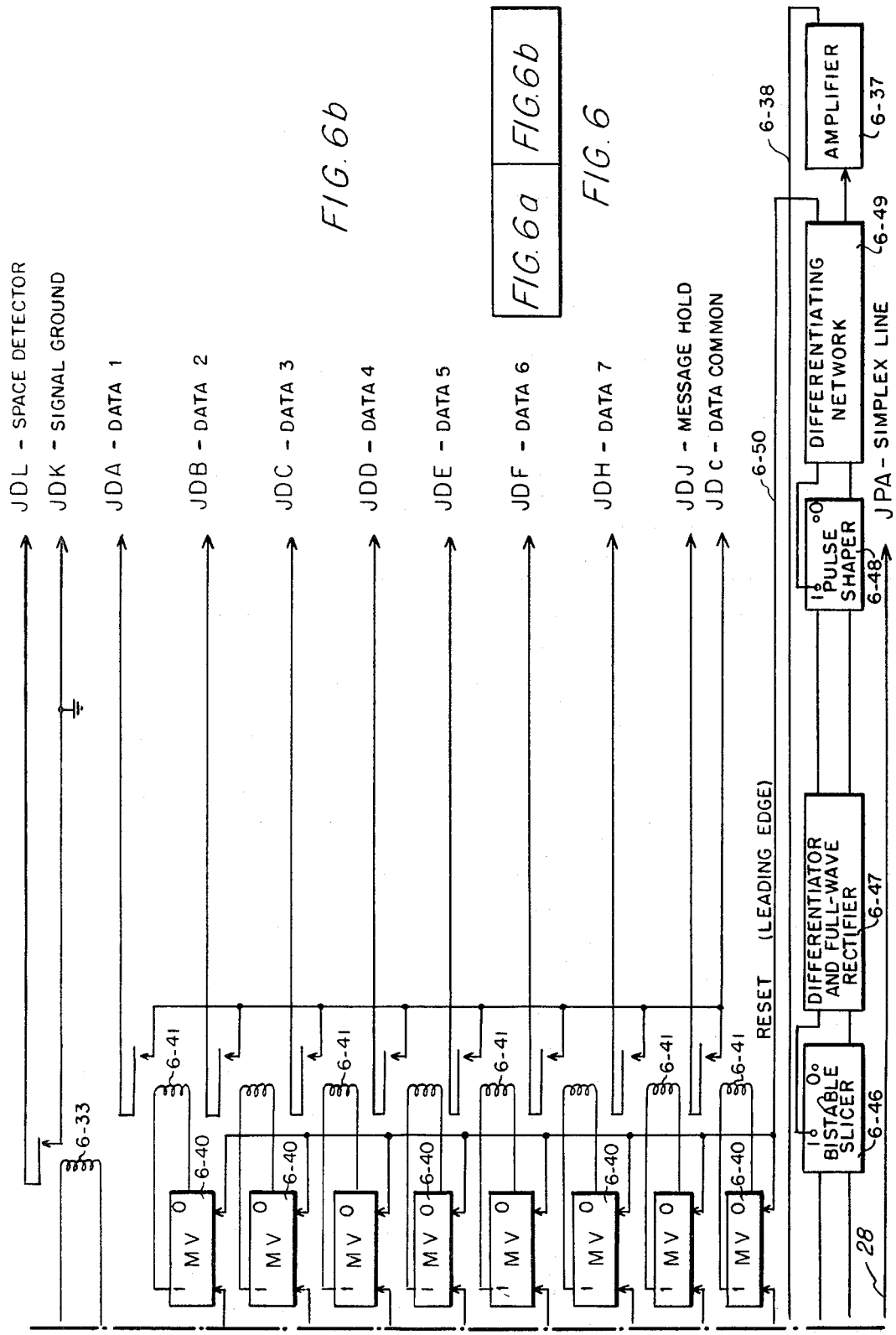

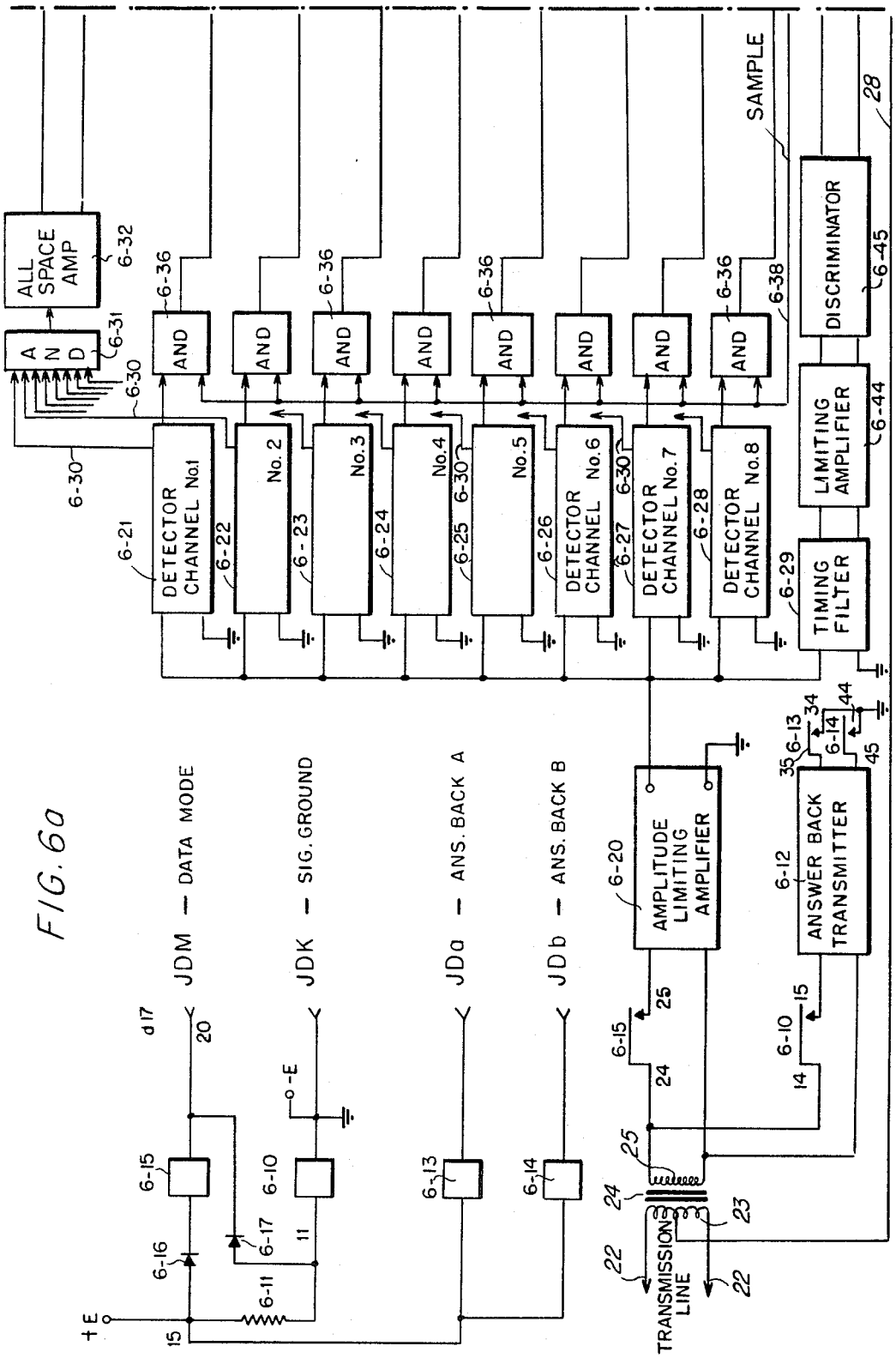

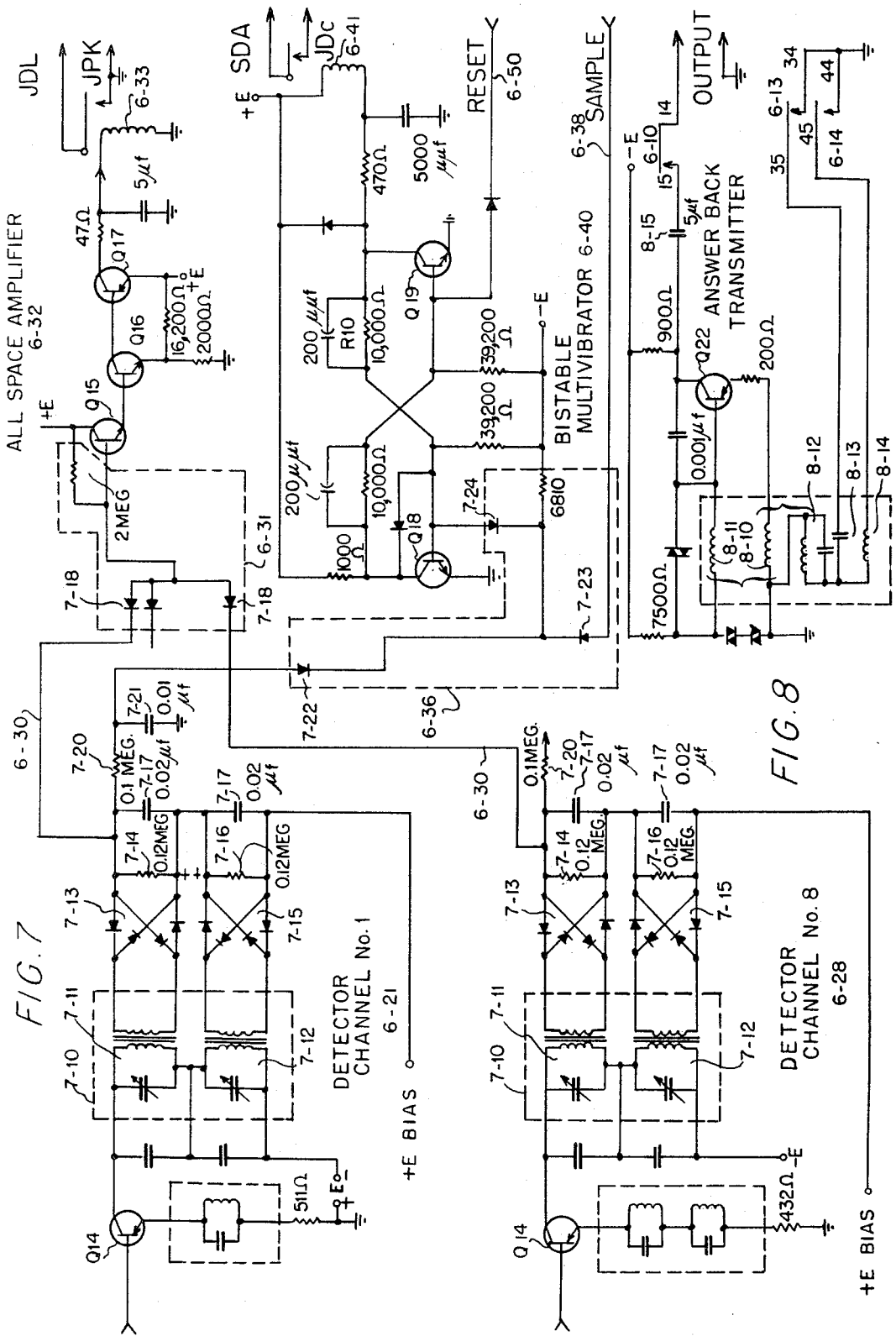

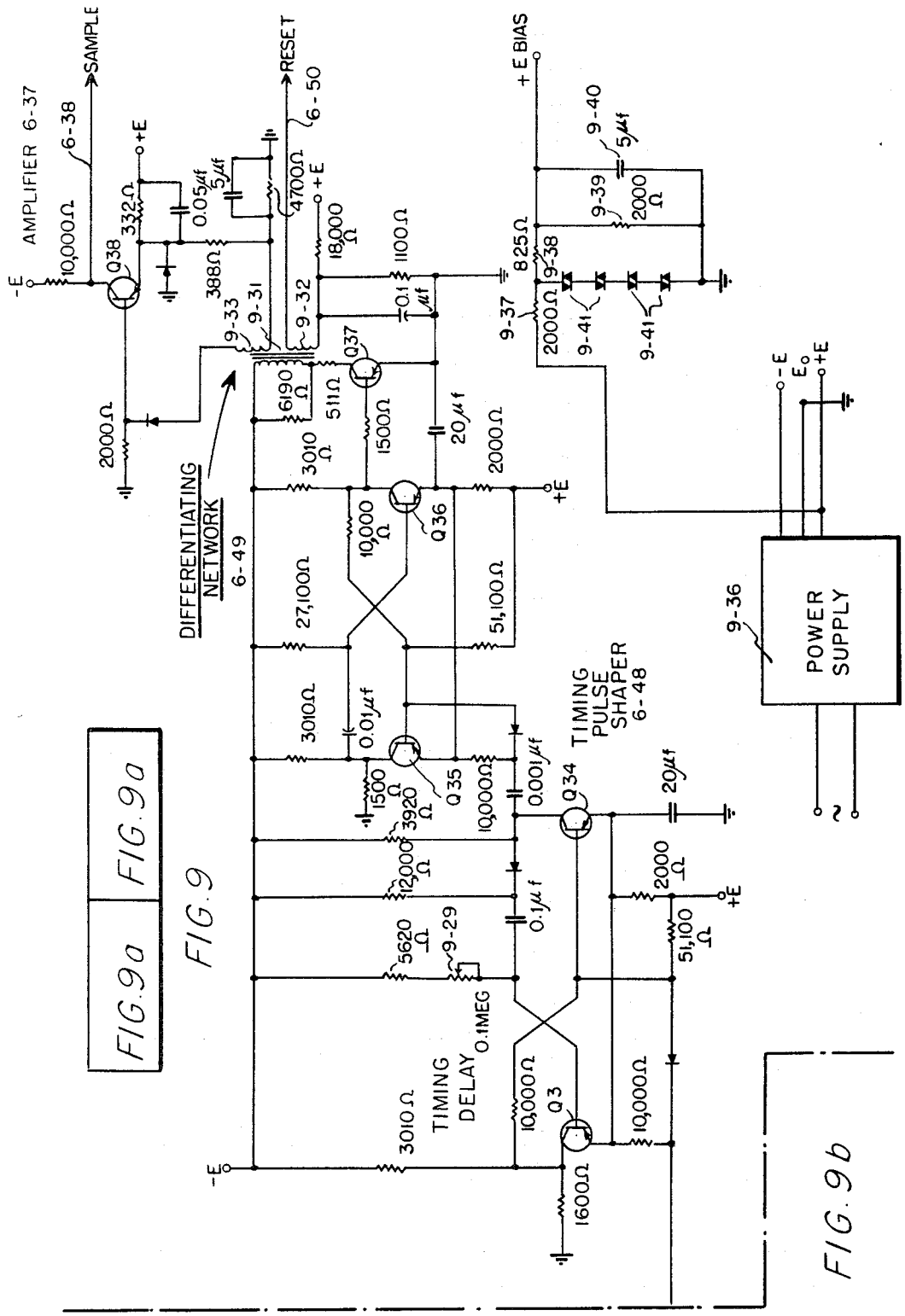

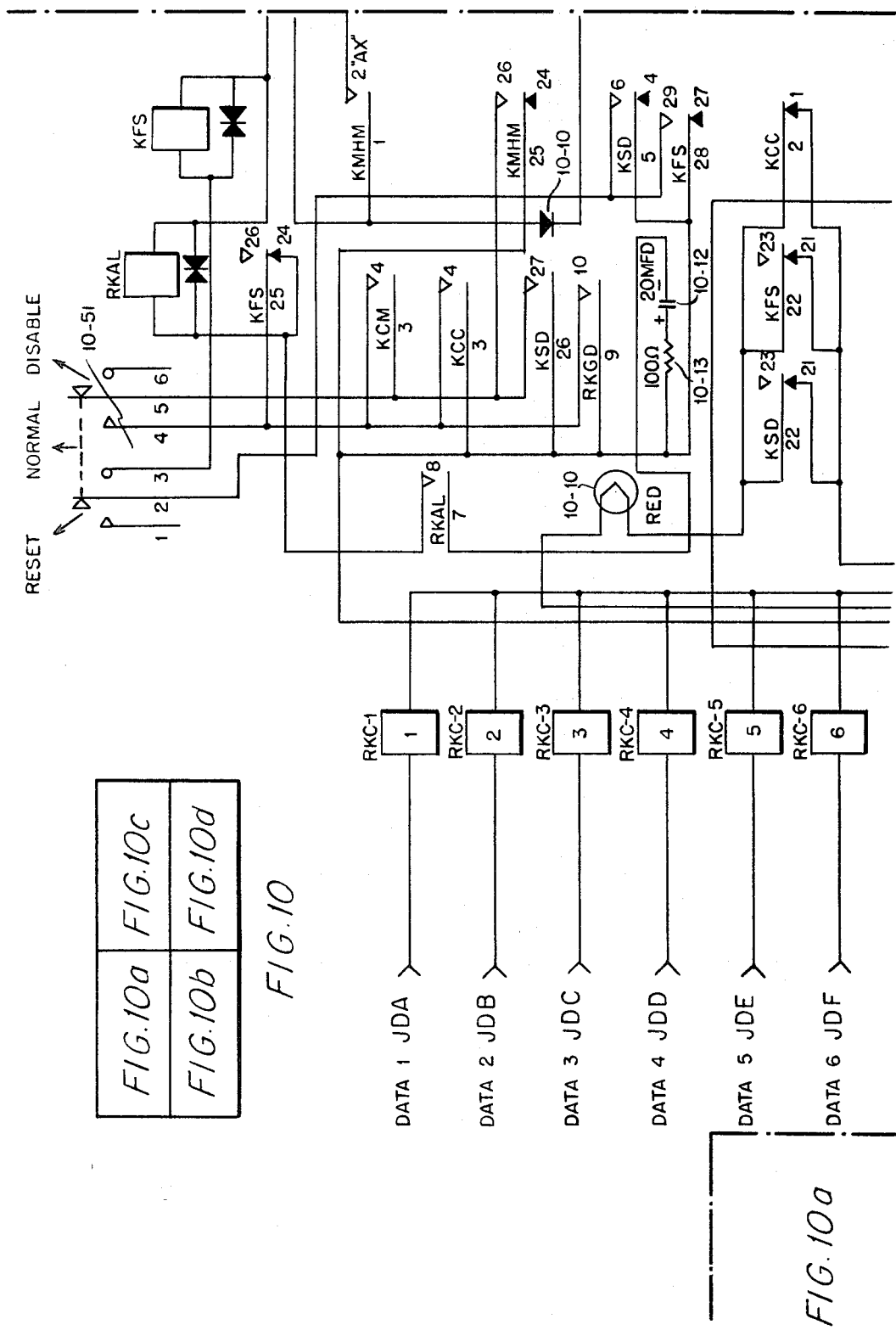

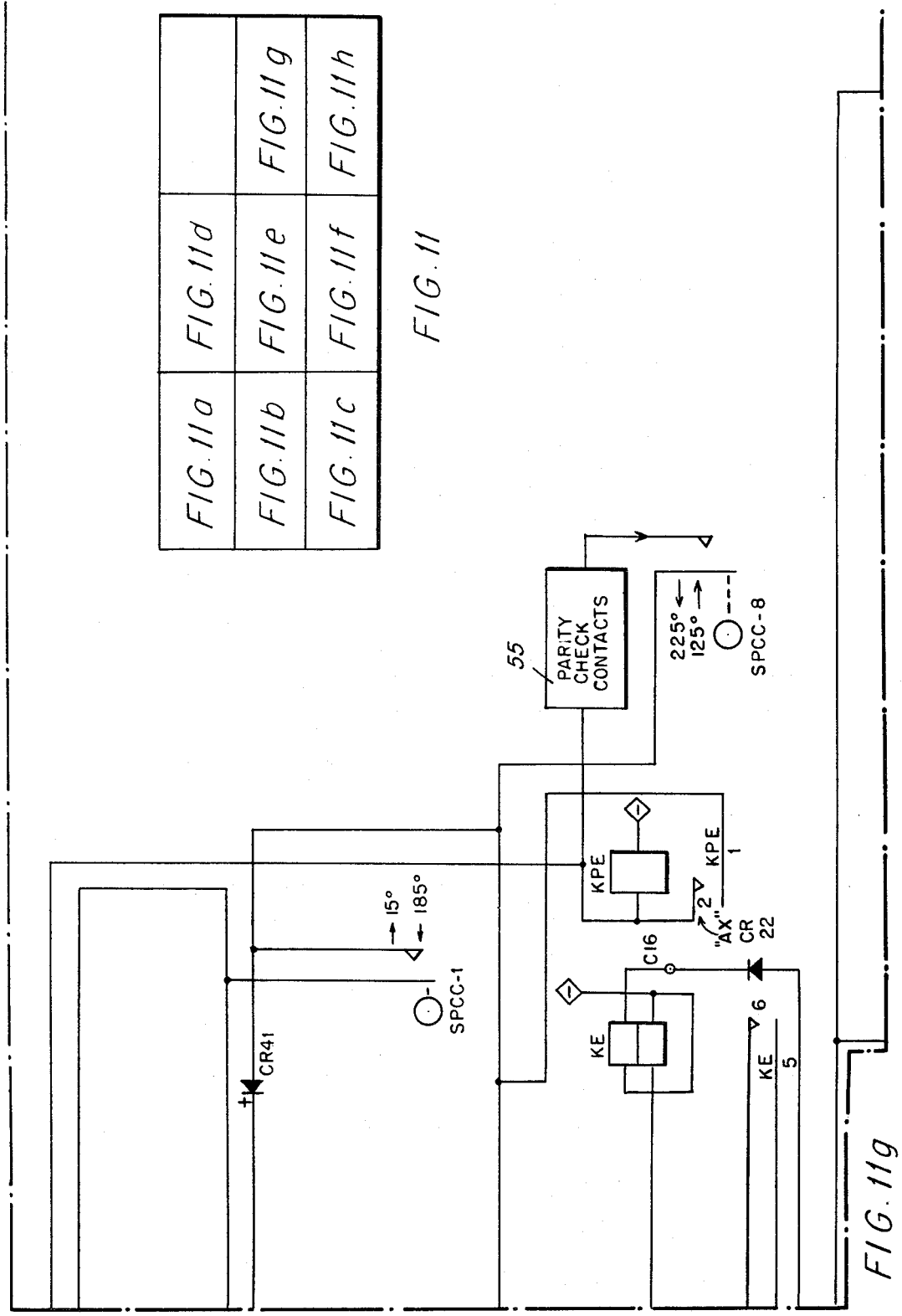

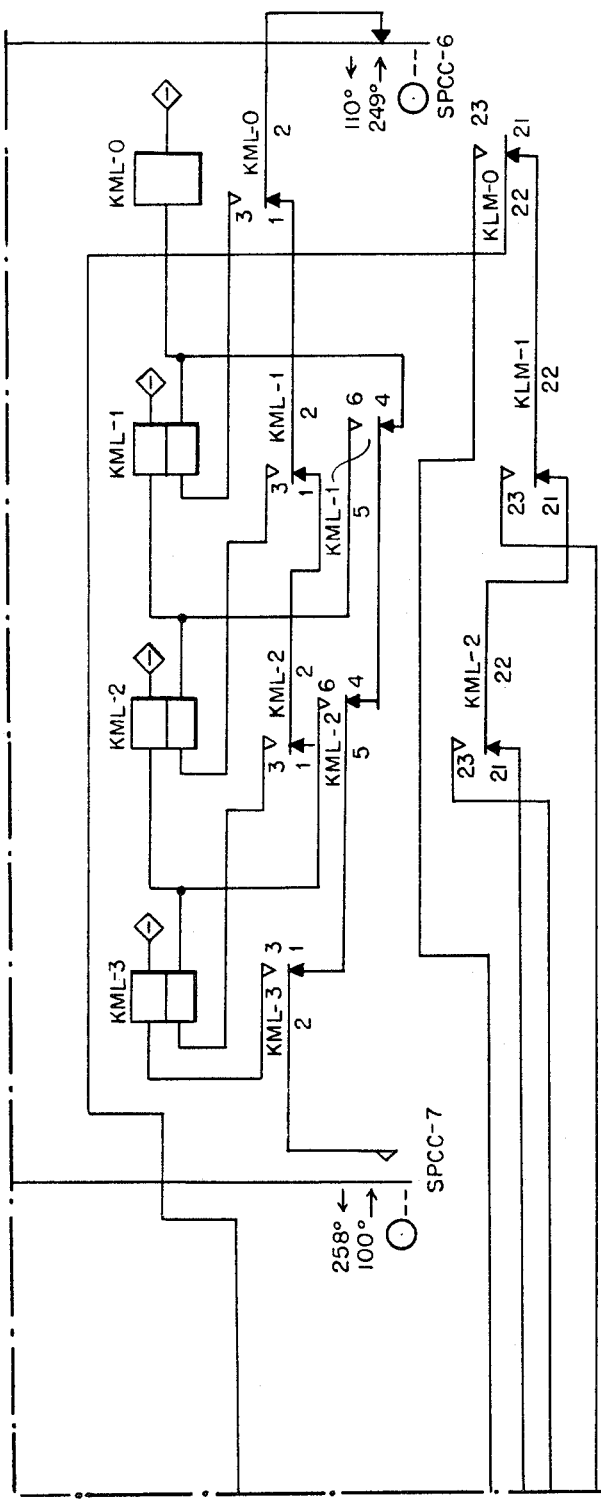

3,395,245
CONTROLLED CODED DATA COMMUNICATION
SYSTEM
Ben A. Harris, Rochester, N.Y., assignor to Friden, Inc.,
San Leandro, Calif., a corporation of Delaware
Filed Mar. 16, 1964, Ser. No. 352,141
33 Claims. (Cl. 178—2)

ABSTRACT OF THE DISCLOSURE

A controlled coded-data transmission system wherein coded data is transmitted from a selected one of a plurality of transmitting stations to a remote receiver, or to a local receiver under certain conditions. The coded-data and all supervisory and/or control signals are transmitted over a communication channel comprising a two-conductor circuit with a simplex signal leg. The communication channel terminates in a unit such as the 402 data set manufactured for the Bell System or any suitable equivalent. An individual control circuit is used at each end for the control of associated circuits and equipment, and for responding in an appropriate manner to control signals from the control circuit at the remote end. The control circuit at the transmitting end is caused to respond in selected different manners in response to the same signal from the receiving end depending upon the prevailing conditions at the transmitting end. An answer-back receiver is provided at the transmitting end and an answer-back transmitter at the receiving end. The answer-back circuits are selectively coupled to the line for the transmission of addition control signals during certain stages of the data transmission.

---

The present invention relates to data transmission and collection systems and, particularly, to systems in which random transmissions of data in coded form are made from one or more transmitters to a remote central receiver. In greater particularity, the invention relates to systems wherein data transmissions to the receiver and return control-signal transmissions to a transmitter are accomplished by bidirectional transmission of parallel-bit data and control codes over a single communication channel including a two-conductor simplex channel portion.

The present invention is an improvement of the data collection system disclosed in applicant's United States application Ser. No. 254,896, now U.S. Patent 3,309,673, issued Mar. 14, 1967, and entitled "Data Transmission System," and assigned to the same assignee as the present application, wherein a plurality of outlying transmitters transmit data to a central receiver for recording. These transmitters use various mechanical structures, which are disclosed in a number of copending United States patent applications all assigned to the same assignee as the present application. These applications include: "A Tabulating Card Reader" application Ser. No. 249,202 of W. C. Ahrns filed Jan. 3, 1963, and application Ser. No. 249,228, now U.S. Patent 3,304,410, issued to E. O. Blodgett on Feb. 14, 1967; "A Badge Reader" application Ser. No. 249,252, now U.S. Patent No. 3,304,411 issued to E. O. Blodgett on Feb. 14, 1967; "Resettable Control Device Having Elements Reset by Use of Hearth Shaped Cams" application Ser. No. 254,991, now U.S. Patent No. 3,249,300 issued to W. T. Van Buskirk on May 3, 1966; "Multiple Switching Electrical Control Device" application Ser. No. 254,992, now U.S. Patent No. 3,227,847 issued to E. O. Blodgett on Jan. 4, 1966; and "Electrical Sequential Circuit Controller" application Ser. No. 254,990, now U.S. Patent No. 3,204,051, issued to E. O. Blodgett on Aug. 31, 1965.

The transmitters are coupled to the data receiver through a common data transmission channel including multiple channel conductors providing an electrically conductive circuit corresponding to each code-bit level used to represent coded alpha-numeric characters and symbols. The common channel also includes signal-control conductive circuits through which the transmitters are electrically interlocked against concurrent transmissions by any two transmitters through the common data transmission channel, and further signal-control conductive circuits of the common channel enable control by both the receiver and an associated attendance-mode control unit over each operational period and certain operational characteristics of the transmitters. The control unit last mentioned includes a time clock, having a mechanical construction disclosed in United States copending application Ser. No. 249,201, now Patent No. 3,205,651 assigned to the same asignee as the present application, which supplies coded time digits to the central receiver and automatically provides periodic attendance mode operation of the transmitters and central receiver for personnel attendance recordings.

It will be evident from the foregoing brief outline of the data transmission system of application Ser. No. 254,896 that the common data transmission and control channel of the system utilizes a relatively large number of conductive electrical circuits. There is no particular objection to this where the outlying data transmitters and central data receiver are reasonably closely spaced, as in a manufacturing plant even though spread over a relatively large area, since the common channel may simply be comprised by a multi-conductor cable. Larger spacings of a transmitter group on the one hand from a central receiver on the other hand make the use of a multi-conductor common channel less attractive and more uneconomical, and this is especially true where such spacing is of the order of perhaps tend to a hundred miles or more as is commonly desirable for centralized data collection applications.

It is an object of the present invention to provide an improved data transmission system of the type described and one which enables a data transmitter or group of transmitters to be coupled through a relatively simple and economical form of common transmission channel to a remotely situated data receiver without sacrifice of speed of data transmissions and while preserving full system control over transmitter inter-related operations.

It is a further object of the invention to provide a novel data transmission system wherein a remotely situated data receiver not only receives and records data supplied to the receiver by one or more local data transmitters through a simple simplexed form of two-conductor transmission channel of telephone-line quality, but also controls through such channel the individual operation of each transmitter and the electrically interlocked operations of plural transmitters together with the automatic operations of a local standby data receiver which receives and preserves transmitted data upon operational failure for any reason of the transmission channel or remote receiver.

Other objects and advantages of the invention will appear as a detailed description thereof proceeds in the light of the drawings forming a part of this application and in which:

FIG. 1 represents in block diagram form a complete data transmission system embodying the present invention;

FIG. 2 is a simplified circuit diagram of an electrical priority interlock control used between the data transmitters of the system to prevent concurrent transmissions by any two thereof;

Figure 3A:
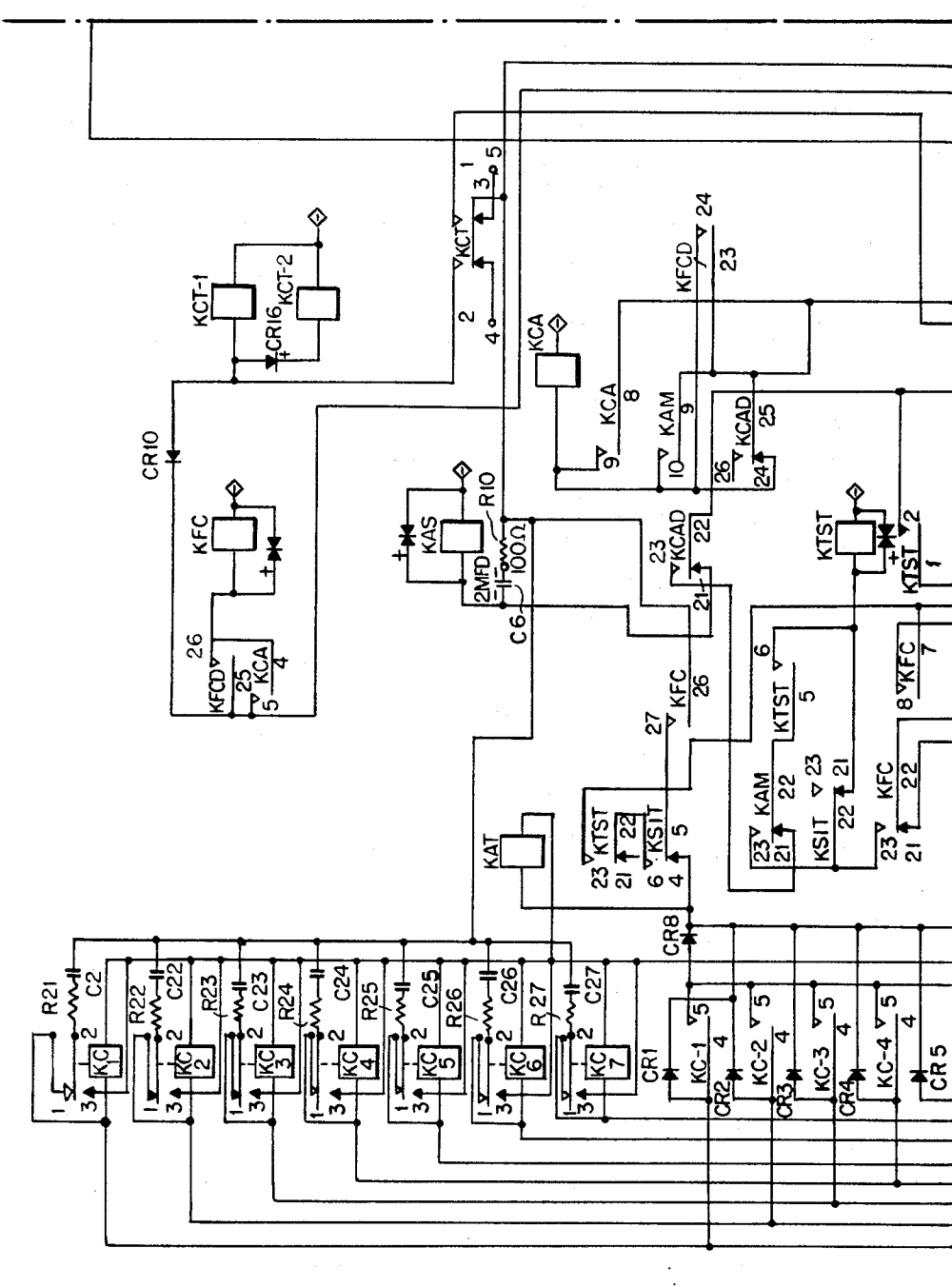
Figure 3B:
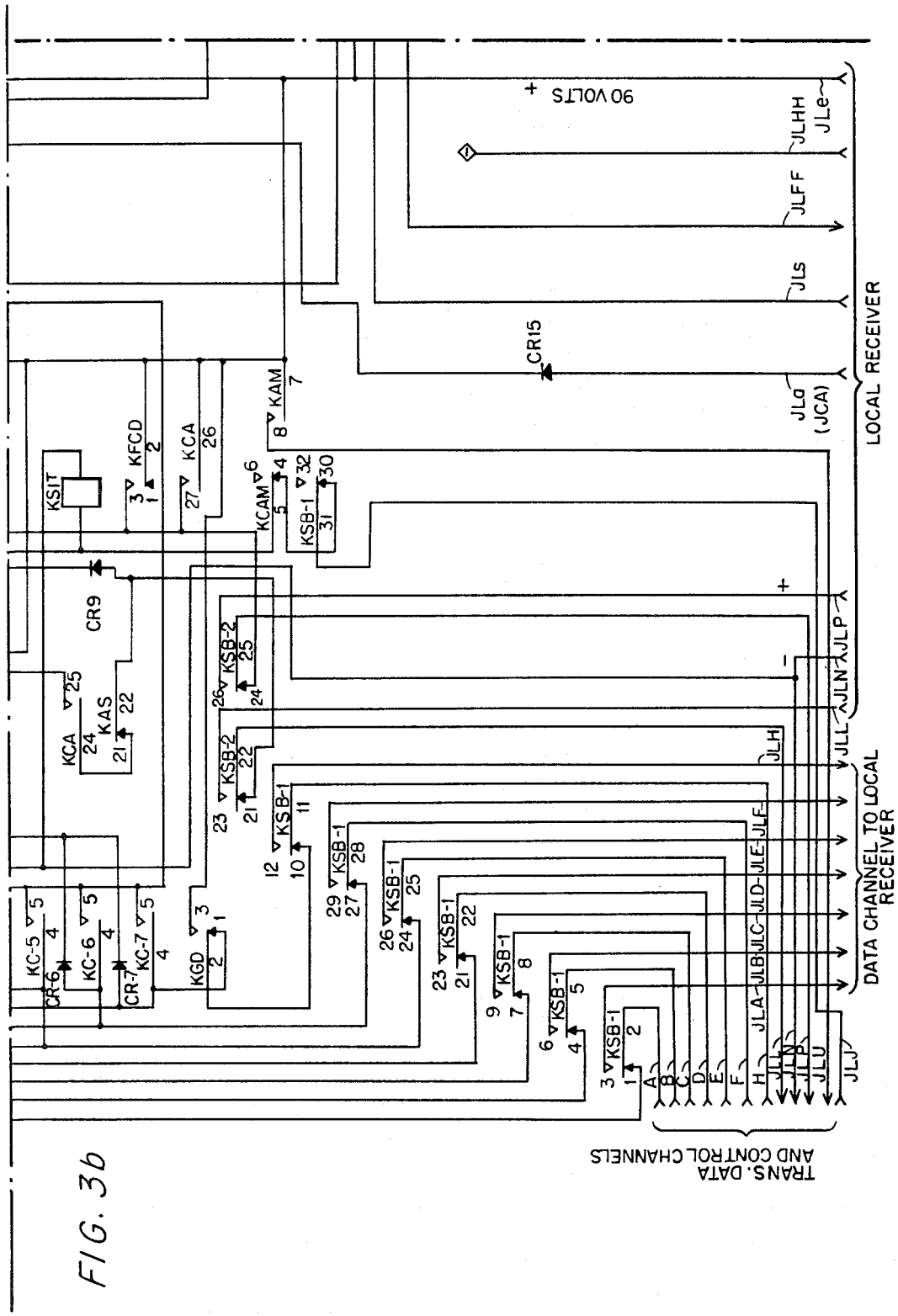
Figure 3C:
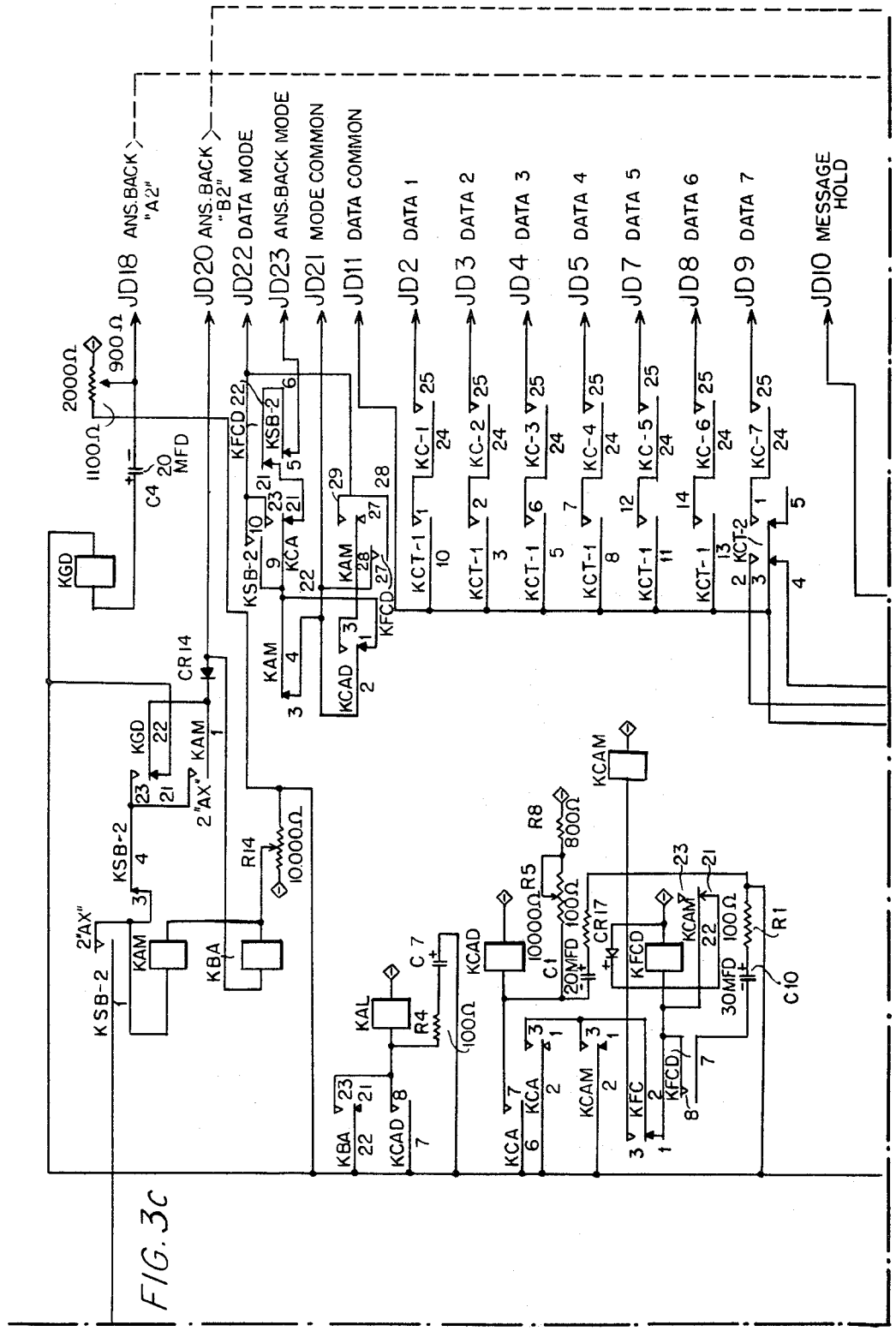
Figure 9A:
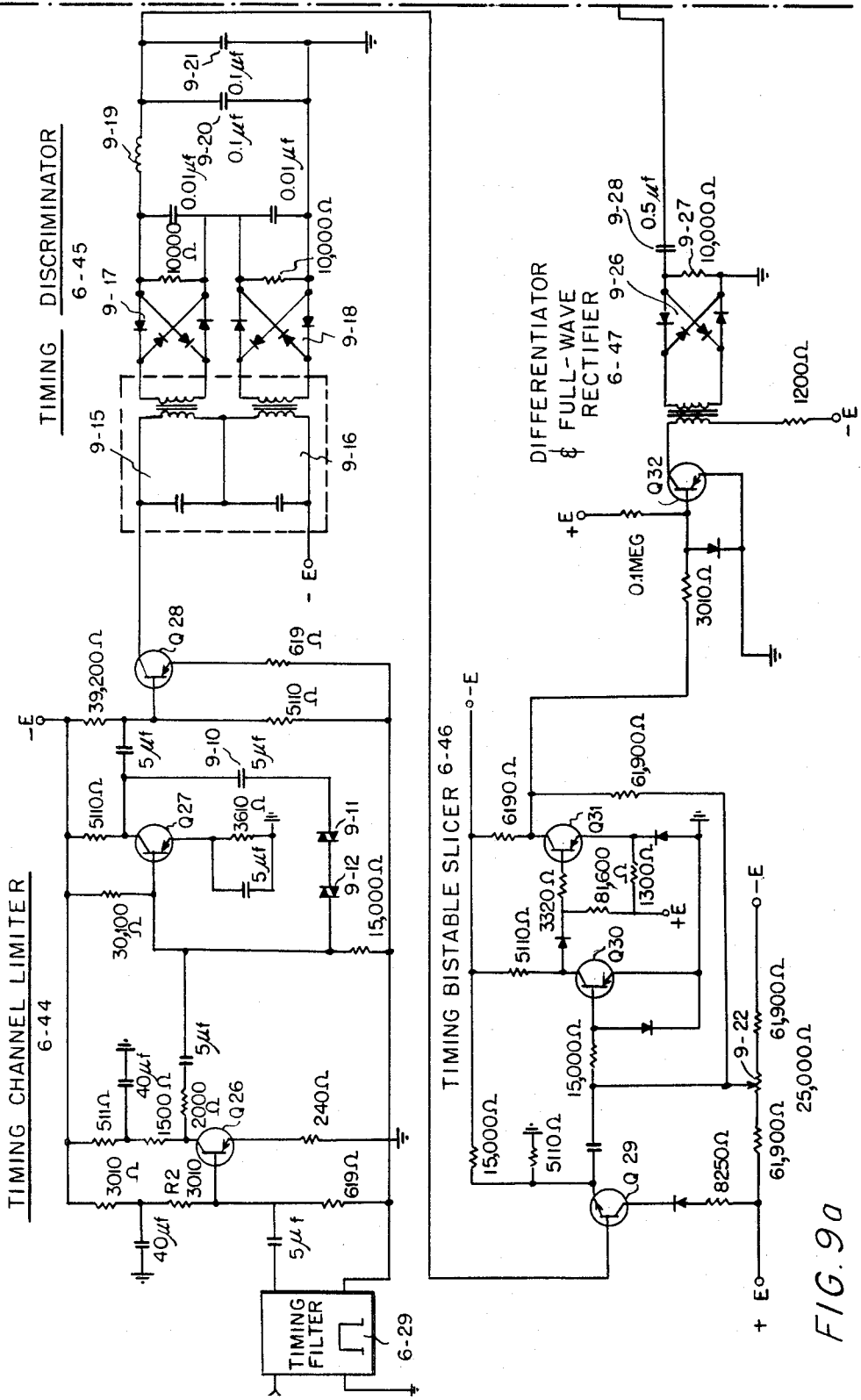
Figure 10B:
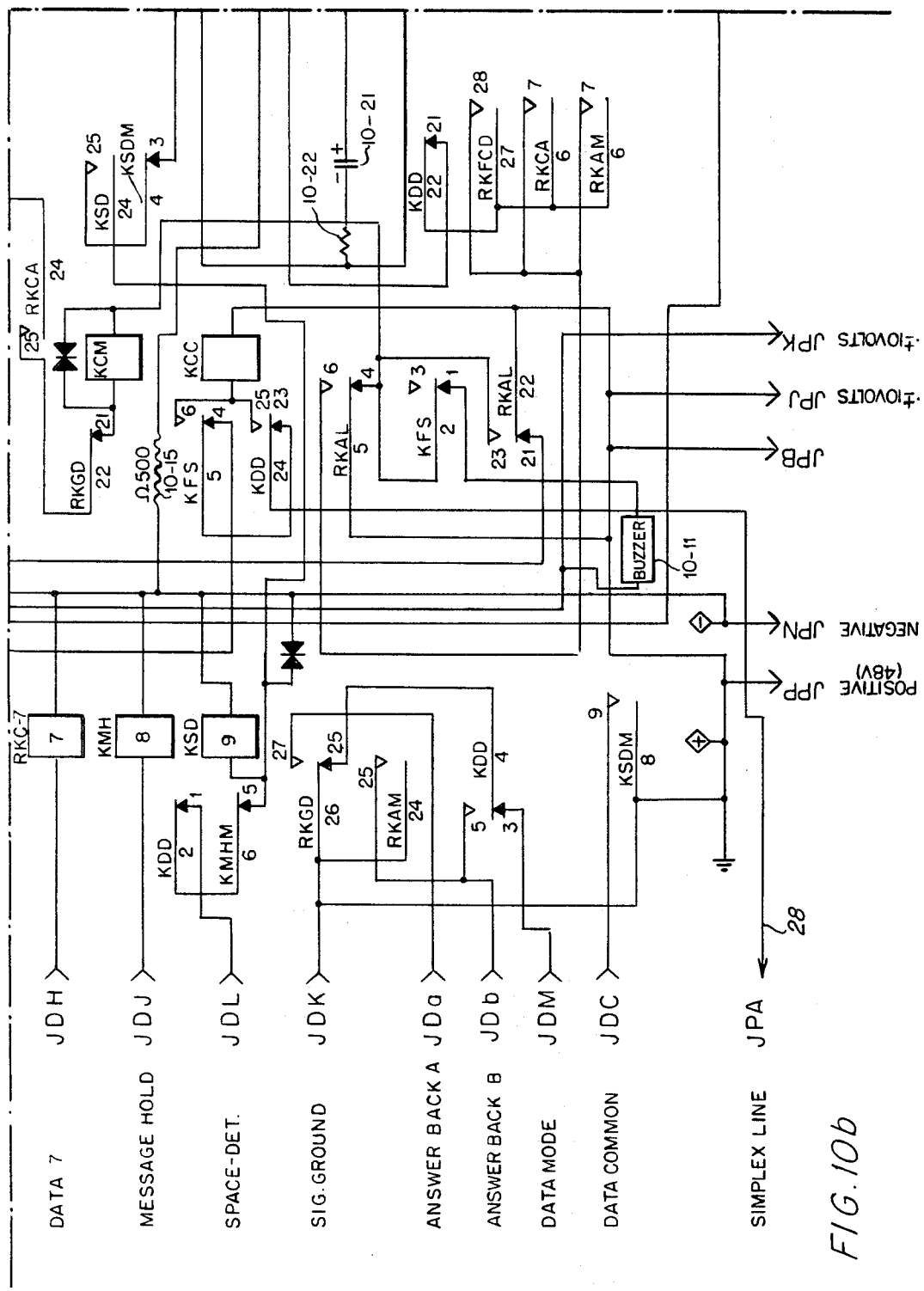
Figure 10C:
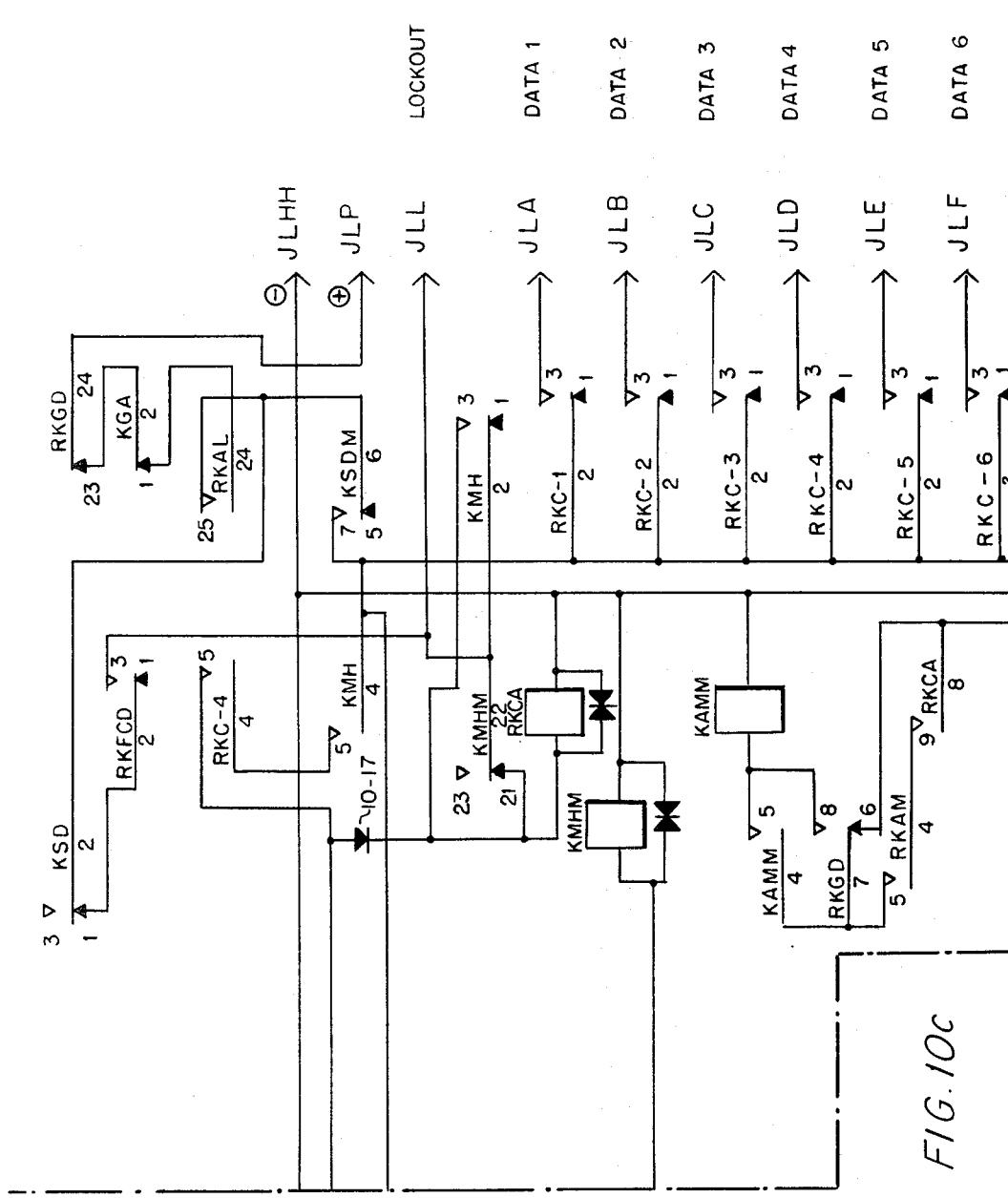
Figure 10D:
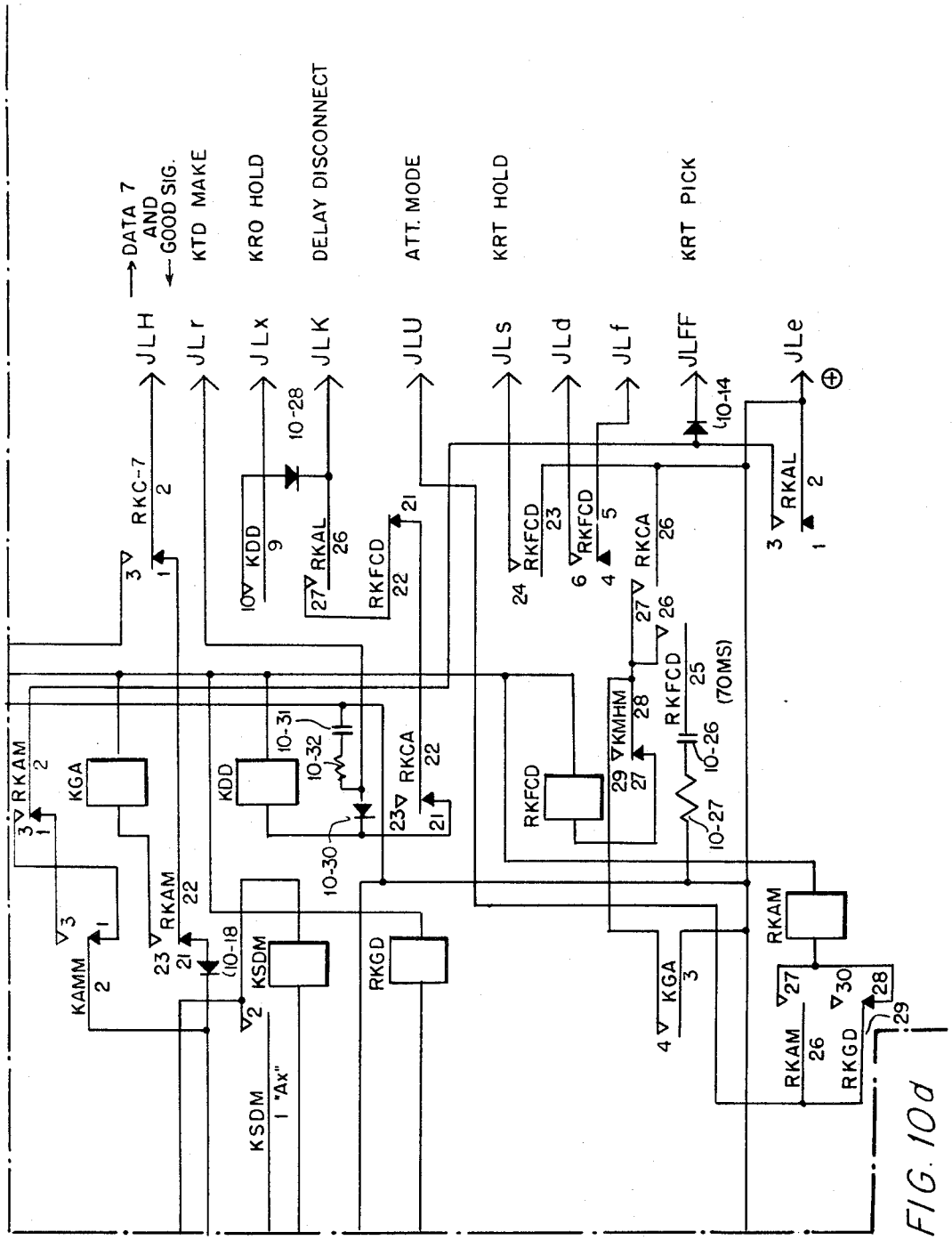
Figure 110:
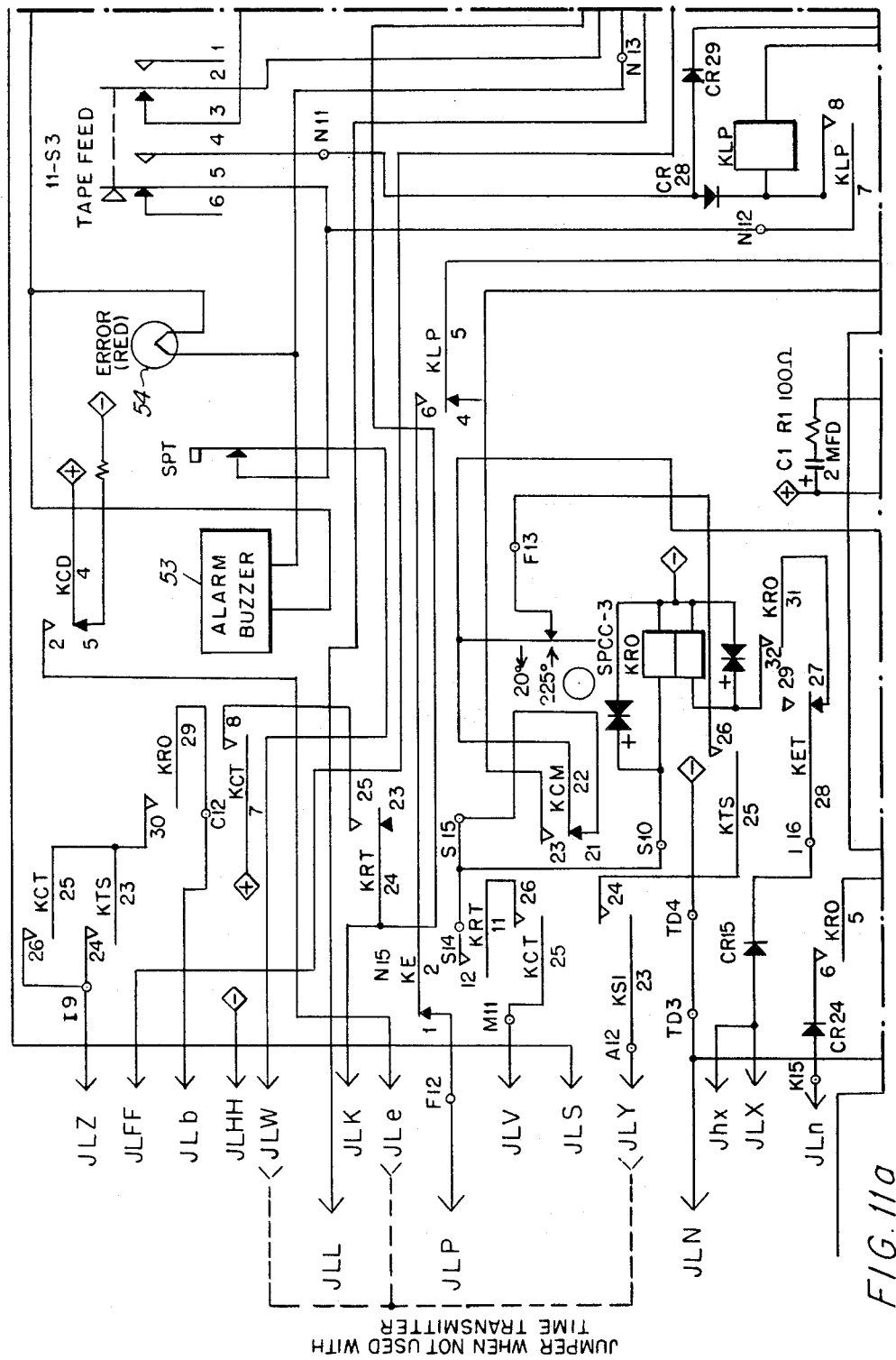

FIGS. 3a–3d arranged as in FIG. 3 represent the electrical circuit diagram of the transmitter interface unit 15 shown in FIG. 1;

FIG. 4 represents the electrical circuit diagram of a tone transmitter used in the transmitter data set unit 17 of FIG. 1, and FIG. 5 shows the electrical circuit arrangement of an answer back receiver used in this unit;

FIGS. 6a and 6b arranged as in FIG. 6 show in block diagram form the construction of the receiver data set unit 26 of FIG. 1, FIG. 7 represents the electrical circuit arrangement of certain components of this data set unit, FIG. 8 shows the electrical circuit arrangement of an answer-back transmitter employed in this unit, and FIGS. 9a and 9b arranged as in FIG. 9 show the electrical circuit diagram of a timing signal translating channel of this data set unit;

FIGS. 10a–10d arranged as in FIG. 10 represent the electrical circuit of the receiver interface unit 27 of FIG. 1, and FIGS. 11a–11h arranged as in FIG. 11 show the electrical circuit arrangement of both the local and the remote data receiver-recorders 16 and 16' of FIG. 1.

GENERAL ORGANIZATION AND OPERATION

An illustrative form of a complete data transmission system embodying the present invention is schematically represented in block diagram form in FIG. 1 of the drawings. By way of illustrative example, the system is one of a type suitable for collection and recording of data at a remote location, and is considered as including at four data originating locations various configurations of data transmitters each having a complement of equipment suitable for transmission of the particular type or types of data originating at the location. Thus at location or station No. 1 the transmitter 10 includes two readers for reading conventional tabulating cards, and also includes provision for manual insertion of additional data such as in factory operations the identification of the transmitting locality and the character and extent of a fabrication operation completed. The data transmitter at the data originating location or station No. 2 includes a transmitter 11 having a reader for reading conventional tabulating cards, a reader for reading data recorded in the identifying badge furnished the employee making the data transmission (usually the operator who has performed the fabrication process or other transaction reported), and provision for the manual insertion of pertinent data. The data originating location or station No. 3 is shown by way of example as merely including a transmitter 12 having an identification badge reader such as might be utilized at an appropriate location in a plant or facility for employee attendance reporting. The data originating source or station No. 4 is represented as including a transmitter 10' like that used at station No. 1, comprised by two tabulating card readers with additional provision for manual insertion of data, together with a badge reader 12' equivalent to that at station No. 3 but used both for attendance reporting during certain times of the day and for identification of personnel making data reports during the normal working hours of the day.

All of the data transmitting equipments of the several stations just described transmit data through a common multi-conductor transmission channel 13 extending through a central control unit 14 to a transmitter interface unit 15, and the data is translated by the latter unit either to a local receiver-recorder unit 16 or to a transmitter data set unit 17. Data supplied to the unit 16 is recorded in machine-sensible form as by use of punched paper tape, and there may be recorded with this data the time of data transmission as furnished by the central control unit 14. The latter unit also contains provision for manually or automatically changing the system operation, through certain conductors of a control channel 18 extending through the interface unit 15 and receiver-recorder unit 16 to each of the station transmitters, to one where all badge readers in the system operate only for attendance reporting or alternatively to a system operation where badge readers in the system identify each person performing a data transmission. The control channel 18 also includes a system electrical priority interlock control presently to be described. Data supplied to the transmitter data set unit 17 has its parallel-presented code bits, representing successive alpha-numeric or symbol characters, appearing as an electrical energization of an individual one of plural code-bit electrical circuits identifying distinctive code-bit levels (often assigned for convenience of identification binary-weighted values 1, 2, 4, 8, 16, etc.) which together make up the code form employed. The data set unit 17 transforms this electrical-circuit form of code presentation to one utilizing audible tones, of which an individual tone of distinctive frequency is generated to identify the presence ("mark") of an electrical-circuit code bit in each individual one of the code-bit levels and a second tone of individual frequency is generated to indicate the absence ("space") of a "mark" code bit in a corresponding code level.

In the system herein described by way of example, the code form used employs seven code-bit levels so that for a code-bit group having "mark" code bits in all seven code-bit levels there will be seven "mark" tones of distinctive frequency generated concurrently. Code-bit groups utilizing both "mark" and "space" code bits will, of course, cause concurrent generation of a total of seven "mark" and "space" tones of individual frequencies.

These concurrently generated tones are applied to the primary winding 19 of a line transformer 20 having a secondary winding 21 connected to a two-conductor transmission line 22 which may be of extended length as indicated in broken lines. The remote end of the transmission line 22 is connected to the primary winding 23 of a remotely situated line transformer 24 having a secondary winding 25 through which the transmitted code-bit-group tones are supplied to a receiver data set unit 26. This unit utilizes each "mark" tone to effect energization of a corresponding code-bit level electrical circuit of a receiver interface unit 27, thus converting the code-bit-group tones received by the unit 26 to corresponding parallel-presented code-bit group energizations of code-bit electrical circuits of the unit 27. As will be explained more fully hereinafter, the receiver interface unit 27 so controls an answer-back transmitter included in the unit 26 as to effect transmission of certain answer-back system control information through the transmission line 22 to an answer-back receiver included in the transmitter data set 17. This control information is utilized in controlling the operations of the system transmitter stations in certain respects presently to be explained.

A direct current control circuit also extends from the receiver interface unit 27 to the transmitter interface unit 15. This circuit has an input conductor 28 connected to a center tap on the primary winding 23 of the transformer 24 and an output conductor 29 connected to a center tap on the secondary winding 21 of the transformer 20, whereby direct current is conducted from the conductor 28 to the conductor 29 through the line conductors 22 operating in parallel as a conventional simplexed line. A ground connection of the units 15 and 27 provides a return for this direct current control circuit.

Parallel-presented code-bit groups created in the receiver interface unit 27 as just described are transmitted through a control unit 14', which is identical in construction to the control unit 14 and performs the same functions as the latter depending upon which of the units 14 or 14' is operationally employed in the system at any given time, to a remote receiver-recorder unit 16' having a construction identical to that of the receiver-recorder 16. In normal operation of the system, the remote receiver-recorder 16' receives and records all data transmissions and the local receiver-recorder 16 merely operates to receive and record data (and thus preserve such data) during intervals when any system operational condition prevents the remote receiver-recorder 16' from receiving and recording data.

Since the several transmitter stations of the system transmit data to the transmitter interface unit 15 through the common data channel 13, the stations are electrically interlocked against concurrent transmissions. This electrical priority interlock control will presently be described more fully, and utilizes a common control circuit 30 which is energized through a diode rectifier device 31 of each transmitter station in response to energization of a relay KTI also included in such each station. The relay KTI of a given transmitter station must be energized before that station is able to gain access to the common data channel 13. The manner in which such energization is accomplished will now be considered.

FIG. 2 shows the electrical priority interlock control circuit arrangement represented in simplified form for three representative data transmitting stations identified generally as X, Y and Z. This general identification of the transmitting stations by alphabetic characters is adopted for the reason that the electrical interlock components hereinafter described are used at each transmitter station without regard to the complement of data transmitting equipments used in the transmitter. The relay and control circuit shown for station X and particularly described hereinafter is likewise included in identical form in stations Y and Z although not so shown in FIG. 2 in the interest of simplifying the drawing.

As explained more fully in the aforementioned application Ser. No. 254,896, each transmitting station having a tabulating card reader also is provided with a transaction selector manually set by the operator preliminary to each data transmission and identifying a particular category or class of data with which the transmission is concerned. This transaction selector not only identifies the type of transaction reported by the data transmission, but assists the operator in performing the manual insertion of data manually set into the transmitter and in reminding him that one or more tabulating cards should be manually inserted in one or both tabulating card readers provided and that a badge should be inserted in a badge reader when provided. Having accomplished the required manual data insertion, having further inserted the required tabulating card or cards in the tabulating card readers provided, and having lastly inserted a badge in a badge reader if provided, the operator depresses a start button. The transmitter thereupon performs an automatic check operation to ascertain that manual data insertion dials have been properly set as required by the transaction selector, that the system is not at that time operating in the attendance reporting mode, that a tabulating card has been properly inserted in each tabulating card reader if such is required, and that a badge has properly been inserted in a badge reader if this is required by the character of data to be transmitted. Upon completing this automatic check operation and finding no error in the preliminary set-up conditions required, a relay KSS is energized to signify readiness of the transmitter to perform a transmission operation and to initiate demand for access to the common data channel 13 (FIG. 1).

Energization of the relay KSS as last described effects closure of its contacts $a$ and $b$ for the purpose of energizing a lockout relay KLO through an energizing circuit which includes normally closed contacts of lockout relays provided in each of the other transmitters considered in their order of arrangement in the system. Specifically, the energizating circuit of the lockout relay KLO of the transmission station X extends from a negatively energized output line terminal JLN of the receiver-recorder unit 16 through the control unit 14 to the energizing winding of the relay KLO; through the now closed contacts $a$ and $b$ of the relay KSS (assuming that station X is requesting access to the common data channel 13) and through normally closed contacts $a$ and $b$ of the relay KLO to the output line terminal JLT of this transmitter station; through a control circuit conductor $18_a'$ to an input terminal JLR of the next higher order transmitter station Y and through normally closed contacts $a$ and $b$ of the relay KLO of this station to the output terminal JLT of the station; through a further extension of the control circuit conductor $18_a'$ to the input terminal JLR of the even higher order transmitter station Z and through the normally closed contacts $a$ and $b$ of the relay KLO of this station to its output terminal JLT; and in similar manner through extensions of the control circuit involving normally closed contacts of KLO relays of yet higher order transmission stations (indicated by the broken line conductor $18_a''$) to a control circuit conductor $18_a'''$ which is positively energized through the control unit 14 from the output terminal JLP of the transmitter interface unit 15. The latter terminal receives positive energization from the local receiver-recorder unit 16 either (1) through normally open contacts $a$ and $b$ of a relay KSB–2 (closed when the local receiver-recorder unit 16 is conditioned to receive and record transmitted data) provided in the interface unit 15 and normally closed contacts of an error relay KE of the unit 16, or (2) directly from the unit 16 through normally open contacts of a relay KFCD or a relay KCA provided in the interface unit 15 (and closed when the remote receiver-recorder is conditioned to receive data transmissions) and normally closed contacts $a$ and $c$ of the relay KSB–2.

Once the lockout relay KLO becomes energized, it maintains its energization through a hold circuit (not shown for simplicity) energized internally of the individual transmitter station. The lockout relay remains so energized until the transmitter station generates and transmits an "end-of-message" signal and receives back from the receiver-recorder a "message received good" signal, or until the transmitter station receives from the receiver-recorder an error signal indicating that erroneous data has been received. It will be evident from the energizing circuit last traced that no lower order transmitter can have its lockout relay KLO energized if the lockout relay of any higher order station is energized at the time the lower order station energizes its relay KSS.

Whenever the lockout relay KLO of a transmitter station becomes energized in the manner last explained, its contacts $c$, $d$ and $e$ transfer to energize a secure lockout relay KT1 of the station. For the transmitter station X, this energizing circuit extends from the negatively energized circuit JLN of the local receiver-recorder unit 16 through the input terminal JLN of the transmitter station to the energizing winding of the relay KT1, and extends from the latter through the normally closed contacts of an end of message relay KEM and the now closed contacts $c$ and $e$ of the lockout relay KLO to the station line terminal JLL. The latter is positively energized from the output terminal JLL of the interface unit 15, in turn positively energized from the local receiver-recorder 16 either (1) through normally open contacts $d$ and $e$ of the relay KSB–2 should this relay be energized and through normally closed contacts of a receiver relay KMLC or (2) through normally closed contacts $d$ and $f$ of the relay KSB–2 and normally open contacts of the relays KCA or KFCD whenever either of these relays is energized. The secure lockout relay KT1 remains energized by the positive energization supplied from the positively energized transmitter terminal JLP through the now closed contacts $a$ and $b$ of the relay KT1 and the now closed contacts $f$ and $g$ of the relay KLO. Thus the lockout secure relay KT1 is deenergized with the relay KLO as at the end of a data transmission or upon receipt of an error signal from the receiver-recorder unit 16 or 16' which effects interruption of the hold circuit of the relay KLO as earlier mentioned.

It will be noted that the normally closed contacts c and d of the lockout relay KLO in each transmitter station complete a closed circuit between the input terminal JLL and an output terminal JLM of the transmitter. A control conductor 18b connects the output terminal JLM of each lower order transmitter to the input terminal JLL of the next higher order station. Since the secure lockout relay KT1 is energized under control of its associated lockout relay KLO by reason of energization applied to the transmitter input terminal JLL, it will be evident that energization of the lockout relay KLO of any lower order station prevents energization of the secure lockout relay KT1 of all higher order stations. The energization of both the lockout relay KLO and the lockout secure relay KT1 of each transmitter station is required before that station may transmit data to the common data channel 13 (FIG. 1). Thus while the energization of the lockout relay KLO of an intermediate order station prevents energization of the lockout relay of the lower order stations, it does not prevent energization of the lockout relay of higher order stations. At the same time, however, each intermediate order station upon energizing its secure lockout relay KT1 prevents energization of the secure lockout relays of higher order stations so that the latter are unable to initiate data transmissions until the transmissions of the intermediate order transmitter have been completed. Accordingly, essentially concurrent demands by several transmitter stations for access to the common data channel 13 are honored successively in the order of arrangement of the demanding stations from lower to higher order thereof in the transmission system.

Whenever the relay KT1 of any transmitting station is energized, the positive energization applied to the relay is supplied through an associated diode rectifier 31 and a terminal JLJ of that station to the control conductor 30 to energize a relay KSIT of the interface unit 15 through normally closed contacts of a relay KCAM provided in this unit. The functions of these relays will be explained hereinafter in connection with the description of this interface unit, and it will only be explained at this point that the relay KSIT upon becoming so energized remains energized through a normally open pair of contacts of a relay KFC and through a diode rectifier CR9 and the normally closed contacts d and f of the relay KSB–2 from the terminal JLL. The contacts d and f of the relay KSB–2 are closed (and the relay KFC is energized) while the remote receiver-recorder is receiving data transmissions, and energization of the terminal JLL is briefly interrupted (briefly to deenergize the relay KSIT) by the open state of the cam-actuated contacts SC2–3 of a transmitter (during a brief energization of the transmitter relay KEM) to signal an end of transmission by the transmitter. If the local receiver-recorder 16 is receiving data, the contacts d and e of the relay KSB–2 are closed and the brief interruption of energization of the terminal JLL briefly deenergizes a relay KS1 of the unit 16 to signify to the latter the end of a transmission.

The detailed constructions, electrical circuit arrangements, and modes of operation of the several forms of FIG. 1 transmitter stations 10, 10′, 11, 12 and 12′, control units 14, 14′, and (with certain differences hereinafter mentioned) the receiver-recorder units 16, 16′ are disclosed in the aforementioned copending application Ser. No. 254,896, and copending applications referred to therein. The present invention is concerned more directly with the data and control transmission link comprised by the units 15, 17, 26 and 27 which so intercouple the data transmitters, control units and data receiver-recorders as to permit the transmission of data in one direction and the return transmission of various types of system control signals in opposite direction through the relatively simple, two-conductor, simplexed transmission line 22 while preserving the transmitter station electrical control interlock described in connection with FIG. 2. Accordingly, reference will be made in the following description only to such constructional details and operational characteristics of the data transmitters, control units, and data receiver-recorders as may be necessary to an understanding of the present invention.

1. *The transmitter interface unit 15*

The electrical circuit arrangement of the transmitter interface unit 15 is shown in FIGS. 3a–3d arranged as in FIG. 3. Unidirectional operating power is supplied to this unit, with the polarities indicated, through input terminals JLN, JLHH and JLe from the power supply of the local receiver-recorder unit 16. The latter also supplies to the interface unit additional electrical energizations, under relay control of the receiver-recorder unit, through input terminals JLP, JLa and JLs for purposes hereinafter described.

As soon as the local control unit 14 and local receiver-recorder unit 16 (FIG. 1) are turned on in readiness for operation, the local receiver-recorder unit energizes the input circuits JLe and JLHH of the transmitter interface unit. The normally closed contacts 21 and 22 of a relay KAL (FIG. 3d) energize the input circuit JLFF extending to the local receiver-recorder unit to condition the latter for reception by energizing a relay therein (KRT) and also energize the relays KSB–1 and KSB–2 (FIG. 3d) through a diode rectifier device CR11. The relay KSB–1 thereupon transfers its contacts 1–12 and 21–29 (FIG. 3b) to connect the incoming common data transmission channel conductors A–F and H to the outgoing data line conductors JLA–JLF and JLH extending to the data input channel of the local receiver-recorder unit. The relay KSB–2 contacts 21–23 transfer to connect the output control conductor JLL to the control conductor JLL extending from the local receiver-recorder unit, and the relay KSB–2 contacts 24–26 transfer to connect the output control circuit conductor JLP from the local receiver-recorder unit to the output circuit conductor JLP extending to the data transmitters. Energization of the relays KSB–1 and KSB–2 thus effect connection of the common data channel to the local receiver-recorder unit so that the latter may receive and record data transmissions, and connect various control circuits from the local data-recorder unit to the data transmitters to control the operations of the latter during and upon completion of each data transmission interval as more fully described in co-pending application Ser. No. 254,896.

In preparation for subsequent transmission of data to the remote receiver-recorder unit, energization of the relay KSB–2 as last described effects closure of its normally open contacts 9 and 10 (FIG. 3c) to complete a circuit between the data mode output terminals JD21 and JD22 (extending to the transmitter data set 17 of FIG. 1) through the normally closed contacts 3 and 4 of a relay KAM. As will presently be explained in connection with the description of the transmitter data set unit, the completion of this electrical circuit between the output terminals JD21 and JD22 effects connection of the tone generator of the transmitter data set 17 to the receiver of the receiver data set 26 through the transmission line 22 (FIG. 1) to transmit to the latter unit "space" tones which extinguish in the receiver interface unit 27 a normally illuminated red indicator warning lamp. Extinguishing this lamp indicates that the transmitter interface unit is conditioned for operation, and further indicates that the simplex control circuit (in FIG. 1 the conductors 28, 29, line conductors 22 in parallel, and ground return circuit) electrically continuous.

Energization of the relay KSB–2 at this time effects closure of its normally open contacts 1 and 2 (FIG. 3c) to energize an attendance mode relay KAM of the transmitter interface unit if the local receiver-recorder is operating in the attendance mode; this energizing circuit includes the input circuit JLa energized by the local receiver-recorder unit when in the attendance mode, a diode rectifier CR15, the now closed contacts 1 and 2 of the relay KSB-2, and a portion of the resistor R14 selected by manual adjustment of a tap thereon. It may be noted in passing that the attendance mode operational state of the local receiver-recorder unit normally should only occur at the same time that the remote receiver-recorder unit is also operating in the attendance mode either automatically or under manual control. Upon energization of the attendance mode relay KAM, its contacts 7 and 8 (FIG. 3b) close to place positive potential energization upon the output control circuit conductor JLU which extends to all of the data transmitters and causes them to operate only with attendance mode transmissions.

Energization of the relay KSB-1 at this time causes its normally closed contacts 30 and 31 (FIG. 3b) to open and prevent energization of the relay KSIT (FIG. 3b) through the normally closed contacts 4 and 5 of a relay KCAM from the circuit control conductor JLJ, thus preventing the relay KSIT from controlling the transmitter data set in a manner presently to be explained and serving to indicate the end of a data transmission.

A relay KAS (FIG. 3a) is energized at this time through the normally closed contacts 21 and 22 of a relay KCAD. This relay has the principal functions at this time of effecting transmission to the receiver interface unit of a twenty-five millisecond all space signal, for a purpose presently to be explained and to provide an initial delay during which data transmissions may not begin.

The operational state of the transmitter interface unit having been indicated to the receiver interface unit by extinguishment of a red warning light at the latter as previously explained, a reset switch is manually operated at the receiver interface unit and by relay control therein completes electrical continuity of the simplex line control circuit including the conductor 29 (FIG. 3d) of the transmitter interface unit. This causes a relay KCA (FIG. 3a) to be energized, the energizing circuit extending from the negatively energized input conductor JLHH through the operating winding of the relay KCA, the normally closed contacts 24 and 25 of a relay KCAD, the simplex line conductor 29, the now completed ground connection at the receiver interface unit, and the local ground conductor 35 (FIG. 3d) of the transmitter interface unit to the positively energized input conductor JLe. Energization of the relay KCA is maintained through its now closed contacts 8 and 9 from the simplex line conductor 29. Energization of the relay KCA effects closure of its normally open contacts 6 and 7 (FIG. 3c) to energize a relay KCAD, and the contacts 2 and 3 of the relay KCA close to energize a relay KFCD through the normally closed contacts 1 and 2 of a relay KFC. The relay KAS was previously energized through the normally closed contacts 21 and 22 of the relay KCAD, but the latter contacts now open to initiate deenergization of the relay KAS. A condensor C6, previously charged through a resistor R6, now discharges through the operating winding of the relay KAS to maintain this relay energized for twenty five milliseconds after opening of the relay contacts 21 and 22 of the relay KCAD.

This twenty five millisecond interval permits transmission of an all space signal terminated by a timing transition frequency shift serving to remove any data which may be temporarily stored at that time by the receiver data set, and while this is occurring the yet open contacts 21 and 22 (FIG. 3b) of the relay KAS prevent the now closed contacts 24 and 25 of the relay KCA from energizing the control conductor JLL so that data transmissions cannot be initiated. In particular, the energized state of the relay KAS maintains its normally open contacts 3 and 4 (FIG. 3d) closed to complete an electrically continuous circuit between a data common conductor JD11 and a timing conductor JL6 extending to the transmitter data set. This electrically continuous circuit causes the transmitter data set to transmit a timing "mark" tone, and may be traced from the conductor JD11 through the normally closed contacts 3 and 4 of a relay KCT-2, the normally closed contacts 24 and 25 of a relay KTST, and the now closed contacts 3 and 4 of the relay KAS to the conductor JD6. Now when the relay KAS becomes deenergized after its twenty five millisecond delay interval, its contacts 3 and 4 open to cause the transmitter data set to transmit a timing transition by terminating the transmission of the timing "mark" tone signal and initiating the generation of a timing "space" tone signal of different frequency. This transition timing signal is utilized by the receiver data set 26 (FIG. 1) to clear from the latter, in a manner presently to be explained, any data information which might be temporarily stored therein at this time.

The now closed contacts 7 and 8 of the relay KCAD energize the relay KAL directly from the input energized circuit JLe. The relay contacts 21 and 22 (FIG. 3d) of the relay KAL now open to interrupt direct energization of the relays KSB-1 and KSB-2 from the conductor JLe. If a transmission to the local receiver is in progress at this time, energization is supplied from the receiver through the conductor JLs and the diode CR12 to maintain the relays KSB-1 and KSB-2 energized to the end of the transmission. Upon the deenergization of these relays, the relay KSB-2 contacts 21 and 22 (FIG. 3b) close to energize the control circuit JLL (which permits the data transmitters to operate as explained in connection with FIG. 2) through the normally closed contacts 21 and 22 of the relay KAS when the latter becomes deenergized at the end of its twenty five millisecond delay interval, the now closed contacts 24 and 25 of the relay KCA, and the normally closed contacts 21 and 22 of the relay KFC. The relay KSB-2 contacts 24 and 25 now close to energize the control circuit conductor JLP through the now closed contacts 26 and 27 of the relay KCA. The deenergization of the relay KSB-1 causes normally closed sets of its contacts 1-12 and 21-29 to connect to the common data channel line conductors A-F and H to individual ones of a plurality of data relays KC-1-KC-7 of the transmitter interface unit. The transmitter interface unit is now ready to effect data transmissions through the transmitter data set unit 17 (FIG. 1) to the remote receiver-recorder unit.

A data transmitter having demanded and gained access to the common data channel energizes the control conductor JLJ, as previously explained in connection with FIG. 2, to energize the relay KSIT through the now closed contacts 30 and 31 of the relay KSB-1 and the normally closed contacts 4 and 5 of the relay KCAM. The contacts 2 and 3 of the relay KSIT close to complete an electrically continuous circuit between the data common conductor JD11 and the message hold conductor JD10 through the normally closed contacts 3 and 4 of a relay KCT-2. This cause the transmitter data set to transmit a message hold "mark" tone indicating that a data transmission will begin.

Data codes now received through common data channel conductors A-F and H appear as twelve millisecond pulse energization of these conductors. These code pulses energize individual ones of the data relays KC-1-KC-7, the energization of each relay being slightly delayed by reason of condenser-resistor series delay networks C21-C27 and R21-R27 connected serially through the normally closed contacts 1 and 2 of each of these relays and the input energized circuit conductor JLe. The purpose of this delayed relay energization is to avoid false operation of the relays which otherwise might be caused by brief-duration electrical transients originating in the inherent capacitance existing between the common data channel conductors A-H. Once any data relay has operated however, the condenser of its associated delay network is discharged through the normally open but now closed contacts 2 and 3 of that relay.

Any of the data relays KC-1-KC-7 when once energized by a received data pulse remains energized for a short interval beyond the termination of the data pulse.

This effective "stretching" of the data pulses to approximately fifteen to twenty-one milliseconds is accomplished by a relay KAT and a relay KCT operating as a monostable relay multivibrator. The relay KAT (FIG. 3a) is energized by any received data pulse initially translated through at least one diode rectifier device CR1–CR7 and later translated through the closed contacts 4 and 5 of any operated one of the data relays KC–1–KC–7. The relay KAT upon becoming so energized closes its contacts 2 and 3 (FIG. 3d) to energize the relay KCT by the charging current of a condenser C5 of relatively large size. The relay KCT contacts 1 and 3 (FIG. 3a) close to maintain the relay KAT energized through the diode rectifier CR8 after the input data code pulse terminates, and the relay KCT contacts 2 and 3 close to energize a relay KCT–1 and through a rectifier CR16 a relay KCT–2.

The relay KCT–1 operates slightly ahead of the relay KCT–2. As shown in FIG. 3c, normally open contacts of the relays KCT–1 and KCT–2 close upon energization of these relays to complete an electrical circuit from the data common conductor JD11 through the contacts 24 and 25 of any of the energized data relays KC–1–KC–7 to the output data conductors JD1–JD9 which extend to the transmitter data set 17. These completed data circuits control a tone generator in the latter to cause generation of a "mark" tone corresponding to each energized one of the data relays KC–1–KC–7. The slightly delayed closing of the contacts 2 and 3 of the relay KCT–2 causes an electrical circuit to be completed between the data common conductor JD11 and the timing signal conductor JD6, and this completed circuit causes the transmitter data set to generate a timing transition involving a change from a "space" tone frequency to a "mark" tone frequency later followed upon opening of these relay contacts by a reverse change from a "mark" tone frequency to a "space" tone frequency. This timing transition is used at the receiver interface unit to sample or interpret the code tones which it has just received. The relay KCT becomes deenergized when the condenser C5 is nearly fully charged. The contacts 1, 2 and 3 of the relay KCT thereupon open to deenergize the relay KAT, and relays KCT–1 and KCT–2, and whichever of the relays KC–1–KC–7 which were just previously held energized. The contacts 3 and 5 (FIG. 3d) of the relay KAT now close to discharge the condenser C5 in preparation for a new cyclic operation of relays KAT and KCT upon receipt of the next data code.

When the first data code received effects energization of the relays KAT and KCT as just described, the contacts 2 and 3 of the relay KCT not only energize the relays KCT–1 and KCT–2 as just explained but also energize a relay KFC (FIG. 3a) through a diode rectifier device CR10 and the now closed contacts 4 and 5 of the relay KCA. The relay KFC remains energized, to the end of a data transmission, through the now closed contacts 4 and 5 of the relay KCA and the now closed contacts 5 and 6 of the relay KFC. A memory relay (remembering that a transmission has begun) KCAM (FIG. 3c) is now energized through the now closed contacts 2 and 3 of the relay KFC and the now closed contacts 2 and 3 of the relay KCA. The contacts 4 and 5 (FIG. 3b) of the relay KCAM open so that the relay KSIT must now remain energized from the data transmitter through the now closed contacts 7 and 8 of the relay KFC, a diode rectifier CR9, and the normally closed contacts 21 and 22 of the relay KSB–2 from the transmitter-energized control circuit conductor JLL as explained in connection with FIG. 2. The contacts 21 and 22 of the relay KCAM also now open immediately to deenergize (without delay) the relay KFCD.

Succeeding received data codes received through the common data channel conductors A–H effect repeated operations of the type just described. When the data transmitter has completed a data transmission, the transmitter signifies an "end of transmission" by a twelve millisecond deenergization of the control circuit conductor JLL and this temporarily deenergizes the relay KSIT. The relay KTST (FIG. 3a) is thereupon energized through the normally closed contacts 21 and 22 of the relay KSIT and the now closed contacts 22 and 23 of the relay KFC. The relay KTST remains energized through its now closed contacts 5 and 6, the normally closed contacts 21 and 22 of a relay KAM, and the now closed contacts 22 and 23 of the relay KCAD. The relay KAT, with subsequent energization thereby of the relay KCT as previously explained, is now energized through the normally closed contacts 4 and 5 of the relay KSIT and the now closed contacts 26 and 27 of the relay KFC. The relay KCT energizes the relays KCT–1 and KCT–2 as previously described, and the relay KCT–2 contacts 2 and 3 (FIG. 3c) close and then open to cause generation by the transmitter data set of a timing "space" to "mark" and "mark" to "space" tone transition by completion and interruption of an electrical circuit between the data common conductor JD11 and the timing conductor JD6 as previously described.

The message hold "mark" tone generated by the transmitter data set was changed to a "space" tone when the electrical circuit between the data common conductor JD11 and the message hold conductor JD10 was interrupted by the brief opening of the contacts 2 and 3 of the relay KSIT, but the message hold "mark" tone is restored as these contacts later close when the transmitter at the "end of message" interval reenergizes the control line conductor JLL to reenergize the relay KSIT. This delays the restoration of the message hold "mark" tone, after generation of a timing transition, until the end of the "end of message" interval and in effect repeats the "end of message" transmitter signal to the remote receiver-recorder unit.

In this end of message transmission, the relay KTST performs several functions. Its contacts 1 and 2 (FIG. 3a) close to maintain the control line conductor JLP energized through the normally closed contacts 24 and 25 of the relay KSB–2 to prevent releasing the transmitter in error before a "message received good" signal is returned to the transmitter over the common data channel conductor H by operation of a message good relay KGD in a manner presently to be explained. The relay KTST contacts 22 and 23 (FIG. 3a) complete a holding circuit for the relay KSIT, upon reclosure of the contacts 5 and 6 of the latter relay and through the now closed contacts 26 and 27 of the relay KFC, when the relay KSIT is reenergized at the end of the "end of message" signal interval. If the relay KSIT were to become deenergized again by the time the relay KCT–2 became deenergized a proper message hold mark tone would not be transmitted thus causing a failure to send the proper "end of message" termination tone. The relay KTST contacts 24 and 25 (FIG. 3d) open the circuit by which premature reenergization of the relay KSIT (with premature closing of its contacts 2 and 3) could make the message hold tone marking and thus cause the receiver data set not to see the "end of message" transmission at all.

The remote receiver-recorder (16' in FIG. 1) receives and utilizes the "end of message" signal to call for a time transmission from the time transmitter of the remote control unit 14' (FIG. 1), if the system operation requires such time transmission, and additionally to ascertain that the length of the received message is correct as identified by a transaction code which is the first code transmitted by each data transmitter. If the remote receiver-recorder finds that the length of message is correct and that there has been no parity error during the transmission, it controls the receiver interface unit (unit 27 of FIG. 1) to remove the ground connection from the simplex line which includes the conductor 29 of the transmitter interface unit so that the relay KCA is thereupon deenergized.

The relay KCA contacts 22 and 23 (FIG. 3c) thereupon open to interrupt the electrical continuity between the mode common conductor JD21 and the data mode conductor JD22 and effect disconnection of the tone transmitter of the transmitter data set 17 (FIG. 1) from the common data transmission channel 22. The now closed contacts 21 and 22 of the relay KCA complete an electrical circuit between the mode common conductor JD21 and the answer-back mode conductor JD23, this circuit including the normally closed contacts 3 and 4 of the relay KAM, the now closed contacts 21 and 22 of the relay KCA, the normally closed contacts 21 and 22 of a relay KFCD, and the now closed contacts 5 and 6 of the relay KSB-2. The completion of this electrical circuit causes an answer-back receiver in the transmitter data set unit 17 (FIG. 1) to be connected to the common data transmission channel 22 in readiness to receive answer-back transmissions from the receiver data set (26 in FIG. 1). The relay KCA contacts 6 and 7 (FIG. 3c) also open to interrupt the energizing circuit of the relay KCAD, but this relay remains energized for 150 milliseconds by the charging current of a condenser C1 connected through a resistor R3 to the operating winding of the relay KCAD. The relay KTST (FIG. 3a) is maintained energized through its now closed contacts 5 and 6, the normally closed contacts 21 and 22 of the relay KAM, and the now closed contacts 22 and 23 of the relay KCAD for the 150 millisecond continuing energization of the latter, and the relay KTST contacts 1 and 2 maintain energization on the control circuit conductor JLP so that the data transmitter may receive the "good" signal transmitted at this time by answer back from the remote receiver-recorder unit.

The good signal when received by the transmitter data set 17 (FIG. 1) causes the completion of an electrically continuous circuit between the answer-back "A1" conductor JD17 and the answer-back "A2" conductor JD18 of the transmitter interface unit. The completion of this electrical circuit effects energization of a good relay KGD (FIG. 3c) by discharge of a condenser C4 through the now completed circuit extending between the conductors JD18 and JD17 and including the now closed contacts 27 and 28 of the relay KSB-2. The relay KGD contacts 2 and 3 (FIG. 3b) now close to place a "message good" potential energization on the common data channel conductor H through the now closed contacts 10 and 11 of the relay KSB-1. This signal causes the transmitter to release its access to the common data transmission channel.

When the relay KCA was deenergized earlier by interruption of the electrical continuity of the simplex line 29, its contacts 4 and 5 (FIG. 3a) open to deenergize the relay KFC which in turn opens its contacts 2 and 3 (FIG. 3c) to deenergize the relay KCAM and additionally opens its contacts 7 and 8 and its contacts 26 and 27 (both FIG. 3a) to deenergize the relay KSIT. Following the 150 millisecond interval during which the relay KCAD is maintained energized, this relay becomes deenergized and its contacts 22 and 23 (FIG. 3a) open to deenergize the relay KTST. Contacts 24 and 25 of the relay KCAD now close to permit the relay KCA to be again energized when the continuity of the simplex line 29 is completed at the receiver interface unit. The contacts 21 and 22 of the relay KCAD also close to reenergize the relay KAS.

Upon the next succeeding energization of the relay KCA and its energization of the relay KCAD, the contacts 21 and 22 of the latter open and thus deenergize the relay KAS but this relay is maintained energized for a twenty five millisecond interval by discharge of a condenser C6 through a resistor R10 and the operating winding of the relay KAS. This twenty five millisecond interval maintains the control circuit conductor JLL, as extended through the normally closed contacts 21 and 22 of the relay KSB-2, brefly deenergized at the then open contacts 21 and 22 of the relay KAS even though the relay KCA may be reenergized immediately by electrical continuity of the simplex line 29. The contacts 3 and 4 of the relay KAS (FIG. 3d) again complete and later interrupt a circuit between the data common conductor JD11 and the timing conductor JL6 as before to effect generation of a timing transition by the transmitter data set.

The transmitter interface unit is now conditioned to perform a further data transmission as soon as the relay KCA is again energized to close its contacts 24 and 25, and apply energization to the control conductor JLL to permit a transmitter to gain access to the common data channel.

If certain types of error (such as a parity error) should occur while a transmission is in progress, the remote receiver-recorder unit signifies this error by interrupting the electrical continuity of the simplex line 29 to deenergize the relay KCA. The relay KCAM stands energized at this time by reason of the previous energizations of the relays KCA and KFC, and the initial energizations of the relay KCAM has through its now open contacts 21 and 22 (FIG. 3c) effected immediate deenergization of a normally energized delay relay KFCD (which performs its principal functions at the time the remote receiver-recorder is shut down as will be explained hereinafter). Thus the control circuit conductor JLP is maintained energized at this time, as required to continue access of a transmitter to the common data communication channel, only by the previously closed contacts 26 and 27 (FIG. 3b) of the relay KCA. The deenergization of the relay KCA by reason of the error condition here considered accordingly effects immediate deenergization of the control line conductor JLP, and this immediately terminates access of the transmitter to the common data communication channel.

When the remote receiver-recorder unit is taken out of service for a prolonged period, as at the end of a day, it interrupts electrical continuity of the simplex line 29 for the purpose of deenergizing the relay KCA. Initiation of any new transmission is thereupon prevented by the opening of the relay KCA contacts 26 and 27 to remove energization from the control line conductor JLP. The relay KCA contacts 6 and 7 (FIG. 3c) open to deenergize the relay KCAD which, however, remains energized for an additional 150 millisecond interval by charge of the condenser C1 through the resistor R3. The relay KCA contacts 2 and 3 also open and, in the absence of a data transmission in progress (KCAM energized), deenergize the delay relay KFCD which, however, remains energized for an additional 200 millisecond delay interval by charge of a condenser C10 through a resistor R1. During this delay interval, the contacts 27 and 28 (FIG. 3c) of the relay KFCD maintain electrical continuity between the mode common conductor JD21 and the data mode conductor JD22 while its contacts 21 and 22 prevent the transferred contacts 21-23 of the relay KCA from completing a circuit between the mode common conductor JD21 and the answer back mode conductor JD23. The relay KFCD during its delay interval ensures that the tone transmitter of the transmitter data set will continue transmitting all "space" tones while the remote receiver-recorder is in process of going out of service.

The relay KFCD particularly performs the important function at this time of introducing a delay to take into account the fact that, by reason of the physical separation of the remote receiver-recorder unit from the transmitters, it is possible for a data transmission to start after receiver turn OFF has been manually initiated or after the receiver has attempted to halt data transmissions to permit the time transmitter of the remote control unit to effect an impending time recording. Once a transmission has been initiated, it cannot be stopped and the transmission must be accepted if it is not to be lost. This is particularly true in connection with badge transmissions in the attendance mode of system operation to be considered hereinafter, particularly since in these transmissions no alarm is sounded either at the transmitter or receiver-recorder should a transmission be lost. The delay relay KFCD creates a special delay interval at the beginning of each data transmission, and during this interval the transmission can restore the remote receiver-recorder to normal receiving condition for the duration of this transmission only but otherwise to halt further reception.

These particular delay functions provided by the delay relay KFCD will be considered more particularly hereinafter, but for the moment assume that the relay KFCD becomes deenergized before a further reenergization of the relay KCA. The relay KCAD contacts 7 and 8 (FIG. 3c) thereupon open to deenergize a relay KAL which was previously energized directly through these contacts. However, the relay KAL remains energized for an additional 1 second interval by charge of a condenser C7 through a resistor R4. Upon deenergization after this long waiting interval, relay KAL contacts 21 and 22 (FIG. 3d) close to energize the relays KSB–1 and KSB–2 through a diode rectifier CR11. These relays when energized place the system in a stand-by mode of operation wherein the local receiver-recorder unit 16 (FIG. 1) receives all data transmissions and controls the transmitter operation. To this end, it will be noted from FIG. 3b that the contacts of the relays KSB–1 and KSB–2 there shown transfer to connect the common data communication channel conductors A–H directly to the data conductors JLA–JLH extending to the data input channel of the local receiver-recorder and also connect the control conductors JLL and JLP of the receiver to the control conductors similarly identified and which extend to the transmitters. The relay KSB–1 contacts 30 and 31 are now open and prevent transmitter energization of the relay KSIT. The relay KSB–2 contacts 5 and 6 (FIG. 3c) open to interrupt the electrical continuity of a circuit extending between the mode common conductor JD21 and the answer-back mode conductor JD23 to disconnect the answer-back receiver of the transmitter data set from the common data channel 22, and the relay KSB–2 contacts 9 and 10 close to complete the electrical continuity of a circuit between the conductors JD21 and JD22 to connect the tone transmitter of the transmitter data set to the common communicaton channel 22. All "space" tones are thereupon transmitted to cause the space detector of the receiver data set to indicate to the remote receiver-recorder unit that the transmitter data set is operative, and the operator of the remote receiver-recorder unit may then or later take appropriate steps to cause further transmissions to be made to the remote receiver-recorder unit.

If the attempt to take the remote receiver-recorder out of service (as indicated by deenergization of the relay KCA) occurs at a time when a transmitter has energized the relay KSIT to initiate a transmission but before the first data code (which arrives about 60 milliseconds after the relay KSIT is energized) has been received to energize the relay KAT, the remote receiver-recorder unit is not permitted to be taken out of service in the manner just above described until the transmission has been completed. In this event none of the relays KAT, KCT, KFC, or KCAM have yet had time to be energized, and the opening of the relay KCA contacts 2 and 3 removes normal energization from the delay relay KFCD. The latter is maintained energized for 200 milliseconds as earlier mentioned (i.e. by charging of the condenser C10 through the resistor R1 and the now closed contacts 7 and 8 of the relay KFC and the normally closed contacts 21 and 22 of the relay KCAM). The delay relay KFCD contacts 2 and 3 (FIG. 3b) thus remain closed to maintain the control conductor JLP energized so that the transmitter may retain its access to the common data communication channel and continue in operation. The delay relay KFCD contacts 27 and 28 (FIG. 3c) remain closed to maintain electrical continuity between the mode common conductor JD21 and the data mode conductor JD22 to maintain the tone transmitter of the transmitter data set 17 coupled to the common data communication channel 22 (FIG. 1) for transmission of the data information. The relay KSIT being energized, its contacts 2 and 3 (FIG. 3d) maintain electrical continuity between the data common conductor JD11 and the message hold conductor JD10 to effect transmission of a message hold "mark" tone which prevents the remote receiver-recorder unit from being removed from service. This message hold "mark" tone received at the remote receiver-recorder unit will cause the latter so to control the receiver interface unit 27 (FIG. 1) as to re-establish electrical continuity of the simplex line 29, whereby the relay KCA is reenergized through the now closed contacts 23 and 24 of the delay relay KFCD. Normal operation of the transmitter interface unit and the transmitter data set unit accordingly prevails until the data transmission progresses to completion. If in the operation last described the relay KCA should not be reenergized prior to receipt of the first transmitted data code and the resultant energization in turn of the relays KAT and KCT, the delay relay KFCD contacts 25 and 26 (FIG. 3a) remain closed so that energization of the relay KCT effects energization of the relay KFC in the manner previously described. The subsequent reenergization of the relay KCA will cause its contacts 4 and 5 (FIG. 3a) to close and maintain the relay KFC energized after the delay relay KFCD contacts 25 and 26 open. The reenergization of the KCA to close its contacts 22 and 23 (FIG. 3c) now maintains electrical continuity between the data mode conductor JD21 and the data mode conductor JD22 after the delay relay KFCD contacts 27 and 28 open at the end of the 200 millisecond interval. Also during this delay interval, the delay relay KFCD contacts 21 and 22 (FIG. 3c) remain open to prevent the transmitter data set from going into the answer-back mode (by completion of an electrically continous circuit between the mode common conductor JD21 and the answer-back mode conductor JD23) as would otherwise occur when the relay KCA is first deenergized to close its contacts 21 and 22. Thus it will be seen that the delay relay KFCD functions to create a special interval at the beginning of each data transmission during which a transmission initially started will prevent the remote receiver-recorder unit from going out of service until completion of the transmission.

There are ocassions when the remote receiver-recorder unit operation must be halted temporarily, as to enable a new roll of tape to be placed in its tape punch recorder or while awaiting reception by all of several local receivers to be completed to enable a concurrent recording by all of a time transmission from the time transmitter of the remote control unit 14' (FIG. 1). The remote receiver-recorder indicates its desire to halt by controlling the receiver interface unit 27 (FIG. 1) to interrupt the electrical continuity of the simplex line 29 and deenergize the relay KCA. The latter then opens its contacts 26 and 27 to deenergize the control conductor JLP and prevent any transmitter from gaining access to the common data communication channel to initiate data transmissions. The contacts 21–23 of the relay KCA transfer to place the transmitter data set in the answer back character of operation as soon as the contacts 27 and 28 of the delay relay KFCD open and its contacts 21 and 22 close at the completion of the 200 millisecond delay provided by this relay. The receiver interface unit 27 in this instance now causes the receiver data set 26 to transmit from its answer-back transmitter a tone which prevents a stand-by character of operation of the local receiver-recorder unit. This tone is received by the answer-back receiver of the transmitter data set 17 ( FIG. 1), and operates a relay in the latter to complete an electrical circuit between the answer-back "B–1" conductor JD19 and the answer-back "B–2" conductor JD20 to effect energization of a relay KBA. The relay KBA contacts 22 and 23 (FIG. 3c) thereupon close to maintain the relay KAL energized and prevent the relay KAL contacts 21 and 22 (FIG. 3d) from closing to place the system in stand-by operation by energization of the relays KSB-1 and KSB-2 in the manner previously described.

A transmission in progress may be aborted at the transmitting station by one of several operations available to the transmitting operator such as, for example, by manual operation of a tabulating card reject switch provided at the transmitter. Should this occur, the transmitting station removes energization from the transmission line conductor JLL (FIG. 3b). This deenergizes the relay KSIT which was previously energized through the now closed contacts 7 and 8 of the relay KFC, the diode rectifier CR9, and normally closed contacts 21 and 22 of the relay KSB-2 from the transmission line conductor JLL. The contacts 21 and 22 of the relay KSIT (FIG. 3a) thereupon close to energize the relay KTST through the now closed contacts 22 and 23 of the relay KFC, and the now closed contacts 4 and 5 of the relay KSIT energize the relay KAT through the now closed contacts 26 and 27 of the relay KFC. The contacts 2 and 3 of the relay KSIT (FIG. 3d) open to interrupt the electrical continuity of the message hold conductor JD10 extending to the transmitter data set unit and thus terminate transmission of the message hold "mark" tone by the latter. Energization of the relay KAT effects the previously described energization of the relay KCT and in turn the relays KCT-1 and KCT-2 to complete and then interrupt a circuit between the timing conductor JD6 (FIG. 3d) and the data common conductor JD11 thus effect transmission by the transmitter data set unit of a timing "mark" to "space" transition. The effect at the remote receiver-recorder unit of the transmission of this timing transition in the absence of a message hold "mark" tone is to cause the receiver to record a cancel code and initiate a sequence of relay operations in preparation to receive a new data transmission.

It was earlier mentioned that the system may be placed in the attendance mode of operation by the remote control unit (unit 14' of FIG. 1). This may be accomplished manually, but usually is automatically accomplished during preselected periods of the day under control of a time transmitter included in the control unit. Whether accomplished manually or automatically, each period of system attendance mode operation is preceded by a time transmission and the recording of this transmission at the remote receiver-recorder unit.

Each such recording causes the simplex line 29 to have its electrical continuity interrupted and thus effect deenergization of the relay KCA (FIG. 3a) of the transmitter interface unit. The contacts 6 and 7 of the relay KCA (FIG. 3c) thereupon open to interrupt the energization of the relay KFCD which becomes fully deenergized at the end of 150 milliseconds as previously explained. The contacts 2 and 3 of the relay KCA (FIG. 3c) open to deenergize the relay KFCD which becomes fully deenergized at the end of 200 milliseconds as previously explained. The deenergization of these relays interrupts the electrical continuity between the mode common conductor JD21 and the data mode conductor JD22 and establishes electrical continuity between the mode common conductor JD21 and the answer back mode conductor JD23 to disconnect the tone generator of the transmitter data set unit and connect the receiver of this unit to receive answer back transmissions. In this respect, it may be noted that the initial time recording which began this procedure could not be accomplished until completion of any data transmission in progress so that no data transmission is interrupted by changeover of the system to the attendance mode of operation.

An answer back tone is received by the answer back receiver of the transmitter data set to effect completion by the latter of an electrical circuit between the conductors JD19 (FIG. 3d) and JD20 (FIG. 3c) of the transmitter interface unit. This effects energization of the relay KBA, and the contacts 22 and 23 of the latter now close to maintain the relay KAL energized and thus prevent the stand-by operation previously described and which involves transfer of all data transmissions to the local receiver-recorder unit. Also the answer back receiver of the data set receives a tone which causes an electrical circuit to be completed between the conductor JD17 (FIG. 3d) and the conductor JD18 (FIG. 3c) to effect a brief period of energization of the relay KGD by discharge of a previously charged condenser C4. The contacts 22 and 23 of the relay KGD thereupon close to energize the attendance mode relay KAM through the normally closed contacts 3 and 4 of the relay KSB-2 and the diode rectifier CR14 from the now energized conductor JD20. The contacts 21 and 22 of the relay almost immediately close to establish a hold energizing circuit for the relay KAM through its fast-closing contacts 1 and 2 "AX."

When the remote receiver causes the receiver data set to reclose the electrical continuity of the simplex line conductor 29, the relay KCA is again energized through the now closed contacts 9 and 10 of the relay KAM (or the now closed contacts 24 and 25 of the relay KCAD which, however, immediately open when the latter relay is energized upon closure of the contacts 6 and 7 of the relay KCA). Also the contacts 2 and 3 of the relay KCA now close to reenergize the relay KFCD. These relay energizations interrupt the electrical continuity between the conductors JD21 (FIG. 3c) and the answer back mode conductor JD23, and electrical continuity is now established from the mode common conductor JD21 through the now closed contacts 2 and 3 of the relay KCAD and the now closed contacts 28 and 29 of the relay KAM to the data mode conductor JD22. Hence the transfer contacts 21, 22 and 23 of the relay KCA, by reason of the now open contacts 3 and 4 of the relay KAM, no longer control electrical continuity between the mode common conductor JD21 and the data mode conductor JD22 as occurs in normal data transmissions as earlier described. The contacts 7 and 8 of the relay KAM (FIG. 3b) are now closed to energize the transmission line conductor JLU which extends to all transmitters and energizers an attendance mode relay in each thereof to place the transmitters in the attendance mode of operation. The contacts 22 and 23 of the relay KAM (FIG. 3a) now close to transfer the hold circuit for the relay KTST to the contacts 22 and 23 of the relay KFC, thus removing the contacts 22 and 23 of the relay KCAD from this hold circuit since this relay does not become deenergized between attendance mode transmissions. The contacts 9 and 10 of the relay KAM maintain direct energization of the relay KCA from the simplex line conductor 29 so that this relay can be energized without waiting for deenergization of the relay KCAD to close its contacts 24 and 25 as during normal data transmissions previously described.

In the attendance mode of system operation, only the data of personnel identification badges is read and transmitted. Each such data transmission progresses in the manner of the data transmissions earlier described, and the end of a badge transmission is accompanied (like that of a data transmission) by transmitter brief deenergization of the transmission line conductor JLL to deenergize the relay KSIT which thereupon closes its contacts 21 and 22 (FIG. 3a) to energize the relay KTST. Completion of the electrical circuit from the message hold conductor JD10 (FIG. 3c) to the data common conductor JD11 is thereupon interrupted by the now open contacts 2 and 3 of the relay KSIT to send a message hold "space" tone to the remote receiver; a "mark" to "space" timing transition is thereafter transmitted upon brief closure of the contacts 2 and 3 of the relay KCT-2; and a message hold "mark" tone is thereafter transmitted by completing electrical continuity between the line conductors JD10 and JD22 when the contacts 2 and 3 of the relay KSIT again close upon brief reenergization of the latter relay by the transmitter through the transmission line conductor JLL. It may be noted that the message hold mark tone is not transmitted until reclosure of the contacts 3 and 4 of the relay KCT-2 since the contacts 24 and 25 of the relay KTST are open at this time. This delays transmission of the message hold "mark" tone for a slightly longer interval after transmission of the timing "mark" tone by the previously mentioned operation of the relay KCT-2. The transmission of these timing and message hold "mark" and "space" tones signify the end of a transmission to the remote receiver, which records the last transmitted code and causes the receiver data set unit to interrupt the simplex line 29 and thus deenergize the relay KCA.

As in a data transmission previously described, deenergization of the relay KCA opens its contacts 4 and 5 again to deenergize the relay KFC which in turn deenergizes the relays KCAM, KTST, and KSIT. The electrical continuity of the simplex line 29 is again completed in a sufficiently short time that the reenergization of the relay KCA through the now closed contacts 9 and 10 of the relay KAM prevents deenergization of the relay KCAD. Thus the relay KAS is not energized, and a timing "mark" tone is accordingly not transmitted by the normally open contacts 3 and 4 of the latter relay. The transmitter interface unit is now in readiness to initiate a further transmission.

The system is taken out of the attendance mode of operation by answer back transmission of an "A" tone along, thus to energize the relay KGD which opens its contacts 21 and 22 and interrupt the hold energizing circuit of the attendance mode relay KAM. The contacts 7 and 8 of the relay KAM thereupon open to deenergize the conductor JLU which maintains the attendance mode relay of each transmitter energized.

During intervals when data transmissions to the remote receiver-recorder unit are not in progress, in which event neither of the relays KSIT or KFC would be energized, the system may be manually placed in stand-by operation by which the local receiver-recorder receives and records all data transmissions. This is accomplished by manual actuation of the switch S1 (FIG. 3d) to close its contacts 2 and 3 and thus energize the relays KSB-1 and KSB-2 through the diode rectifier device CR11, the normally closed contacts 24 and 25 of the relay KSIT, and the normally closed contacts 4 and 5 of the relay KFC. The switch S1 remains in the position to which it is manually set, so that stand-by operations thus manually initiated will continue until the switch S1 is manually actuated to open its contacts 2 and 3. If the switch S1 should be so manually actuated to open its contacts 2 and 3 while a data transmission is being received by the local receiver-recorder unit, energization is supplied from the local receiver through the control conductor JLS and the diode rectifier CR12 to maintain the relays KSB-1 and KSB-2 energized until completion of the data transmission in progress.

*2. The data set unit 17*

The data set unit 17 includes a tone transmitter having the electrical circuit arrangement shown in FIG. 4 and includes an answer back receiver having the electrical circuit arrangement shown in FIG. 5. Their operation and characteristics are generally described in a Bell System technical reference manual entitled "Data Sets 402A and 402B Interface Specification" dated February 1963 and published by the American Telephone and Telegraph Company (copyright 1963), including suitable tone frequency values for transmission of "Mark" and "Space" data code tones and answer back control tones.

As shown in FIG. 4, the tone transmitter utilizes two transistors Q1 and Q2 having their collector electrodes connected through a common collector load resistor 4-10 to a source of negative energizing potential indicated as —E. The emitter electrode of the transistor Q1 is connected to ground potential through a series resistor 4-11 and the series connected primary windings of five oscillation transformers 4-12-4-16 having secondary windings across which are coupled individual ones of a plurality of amplitude limiting varistors RV1-RV5 as shown. These transformers have tertiary windings shunted by individual condensers to provide individual resonant circuits 4-17-4-21 establishing the "space" tone frequencies of data code-bit levels Nos. 1, 3 and 6, the timing space tone, and the message hold space tone as indicated. The emitter electrode of the transistor Q2 is similarly connected to ground through a series resistor 4-25 and a series circuit including the primary windings of four transformers 4-26-4-29. These transformers have secondary windings across which are connected individual ones of a plurality of amplitude limiting varistors RV6-RV9 as shown, and have tertiary windings across which are connected shunt condensers to provide resonant circuits 4-30-4-33 which establish the space tone frequencies of the data code-bit levels Nos. 2, 4, 5 and 7 as indicated. The secondary windings of the transformers 4-12-4-16 are all serially connected between the base electrode of the transmitter Q1 and a resistor 4-33 connected to the negative terminal of the energizing source E, the low potential end of the resistor 4-33 being connected to ground through four series connected voltage regulating varistors RV10-RV13 as indicated. The secondary windings of the transformers 4-26-4-29 similarly are serially connected between the base electrode of the transistor Q2 and a resistor 4-34 connected to the negative terminal of the energizing source E, the low potential end of the resistor 4-34 being connected to ground through three series connected voltage regulating varistors RV14-RV16. One terminal of all of the shunt resonant circuits 4-17-4-21 and 4-30-4-33 is connected to the data common conductor JD11, whereas the other terminal of each shunt resonant circuit is coupled through an individual one of a plurality of condensers 4-38-4-46 to individual ones of the line conductors JD2-JD10 as shown.

In the absence of an electrical connection between the data common conductor JD11 and any of the data bit conductors JD2-JD10, the transistor Q1 operates as an oscillatory circuit concurrently to generate five "space" frequencies corresponding to the shunt resonant frequencies of the circuits 4-17-4-21. The transistor Q2 also operates as an oscillator to generate four "space" frequencies corresponding to the resonant frequencies of the shunt resonance circuits 4-30-4-33. The contacts of the code relays of the transmitter interface unit, previously described in relation to FIG. 3, complete electrical circuits between the data common conductor JD11 and each of the conductors JD2-JD5 and JD7 and JD9. Each such completed circuit connects one of the condensers 4-38-4-46 in shunt to its associated resonance circuit and thus lowers the frequency of that circuit to establish a "mark" code bit frequency. An electrical circuit completed by the interface unit between the data common conductor JD11 and the timing conductor JD6 similarly places the condenser 4-42 in shunt to the resonance circuit 4-19 to lower the frequency of the circuit and thus create a timing "mark" tone. The completion of an electrical circuit between the data common conductor JD11 and the message hold conductor JD10 likewise places the condenser 4-38 in shunt to its associated resonant circuit 4-17 to lower the frequency of this circuit and establish a message hold "mark" tone.

It will thus be evident that the transmitter interface relays so control the tone transmitter as to effect the concurrent generation of a total of nine "mark" or "space" ones of which seven correspond to seven code bits representing an alphanumeric character or symbol to be transmitted and two correspond to timing and message hold signals. All of these concurrently generated tones are developed across the collector load resistor 4-10 and are coupled through a condenser 4-47 to the data mode conductor JD22. When the latter conductor is connected by operation of the transmitter interface unit to the mode common conductor JD21 shown in FIG. 5, the generated tones of the tone transmitter are applied to the primary winding of the transformer 20 for transmission through the transmission line conductors 22 to the remote receiver data set 26 (FIG. 1).

The answer back receiver of the transmitter data 17 (FIG. 1) has the electrical circuit arrangement shown in FIG. 5. It was earlier explained in connection with the transmitter interface unit described with reference to FIG. 3 that this unit operates during answer back intervals to establish a conductive circuit between the mode common conductor JD21 and the answer back mode conductor JD23. There are three answer back "mark" tones and a receiver gain-reducing "rest" tone employed in answer back transmissions, and these are received over the transmission line conductors 22 and are translated through the transformer 20 to the base electrode of a transistor Q3 employed in the first stage of the answer back receiver. This amplifier stage is of conventional circuit arrangement, and is coupled to two additional tandem-arranged amplifier stages utilizing transistors Q4 and Q5. The first of these additional amplifier stages employing the transistor Q4 is also conventional except that thermisters RV17 and RV18 are serially coupled between the collector and base electrodes of the transistor Q4 to provide amplitude limiting of the tones translated by the amplifier transistor Q3. The third transistor Q5 likewise is included in a conventional amplifier arrangement except that a diode rectifier CR4 is coupled between the base and emitter electrode of this transistor to stabilize upon the positive-peak half-cycle amplitude of the tones translated by the transistor Q4 to the transistor Q5.

The received and amplified answer back tones are concurrently applied to three transistors Q6, Q7 and Q8 have individual shunt-resonant input circuits 5–10, 5–11 and 5–12 as shown and which are resonant at individual ones of the three answer back tone frequencies. The tone amplified by the transistor Q6 is translated directly to a transistor Q9 which rectifies the tone to energize a relay winding 5–15 and thus close associated relay contacts 5–16 and 5–17 and establish electrical continuity between answer back "A–1" conductor JD17 and answer back "A–2" conductor JD18. A tone translated by the transistor Q8 likewise is applied to a transistor Q10 which rectifies the tone to energize a relay winding 5–18 and thus close associated relay contacts 5–19 and 5–20 to establish electrical continuity between the answer back "B–1" conductor JD19 and the answer back "B–2" conductor JD20. The tone translated by the transistor Q7 is applied concurrently to both transistors Q9 and Q10 concurrently to energize both relays 5–15 and 5–18 and complete the electrical circuit continuities of both the "A" and "B" answer back circuit conductors. Thus the answer back receiver responds to each of the answer back tones received to complete the electrical circuit continuity of either or both of two answer back circuits which cause the transmitter interface unit to perform certain functions as earlier described in connection with FIG. 3.

3. The data set unit 26

The receiver data set unit 26 (FIG. 1) has an arrangement shown in block diagram form in FIG. 6a and FIG. 6b arranged in FIG. 6. It includes a relay 6–10 (FIG. 6a) which is normally energized from a potential +E through a resistor 6–11 to close contacts 14 and 15 of this relay and thus connect the output circuit of an answer back transmitter 6–12 to the winding 25 of the line transformer 24, whereby answer back tones of the transmitter 6–12 are transmitted through the line conductors 22 to the answer back receiver just described in connection with FIG. 5. During answer back operations of the transmitter 6–12, the receiver interface unit completes an electrical circuit between a signal ground conductor JDK and an answer back "A" conductor JDa to energize a relay 6–13, completes an electrical circuit between the signal ground conductor JDK and the answer back "B" conductor JDb to energize a relay 6–14, or completes electrical circuits between the signal ground conductor JDK and both of the answer back "A" and "D" conductors JDa and JDb. Energization of the relay 6–13 effects closure of its contacts 34 and 35 to cause the answer back transmitter 6–12 to transmit an "A" tone, energization of the relay 6–14 effects closure of its contacts 44 and 45 to cause the transmitter 6–12 to transmit a "B" tone, and energization of both relays 6–13 and 6–14 concurrently causes the transmitter 6–12 to transmit a third tone which the answer back receiver utilizes as representing concurrent "A" and "B" tones as earlier explained in connection with FIG. 5. When neither "A" or "B" mark tones are transmitted, a "rest" tone is transmitted and serves to reduce the gain of the answer back receiver and thus reduce its susceptibility to noise.

During data transmissions, the receiver interface unit 27 (FIG. 1) completes an electrical circuit between the signal ground conductor JDK and the data mode conductor JDM which energizes a relay 6–15 through a diode rectifier 6–16 and causes a diode rectifier 6–17 to be rendered conductive and produce across the resistor 6–11 a potential drop sufficiently large as to deenergize the relay 6–10. Deenergization of the latter relay disconnects the answer back transmitter 6–12 from the line transformer 24, and energization of the relay 6–15 effects closure of its contacts 24 and 25 to connect the secondary winding 25 of the line transformer 24 to an amplitude limiting amplifier 6–20 to amplify (with amplitude limiting) tones transmitted from the transmitter data set through the transmission line 22.

It will be recalled from the previous description of data transmissions that an alphanumeric character or symbol is transmitted by individual combinations of seven code bits each identified by "mark" and "space" tones. For convenience of reference, the code bits and their identifying tones are considered as transmitted through individual channels. Accordingly, the data code bit tones translated by the amplifier 6–20 are concurrently applied to seven detector channels 6–21–6–27 which are identified in FIG. 6a as channel numbers 1 through 7. The message hold "mark" and "space" tones are detected by a detector 6–28 corresponding to a channel number 8, and the timing mark and space tones are applied to and translatted by a timing filter 6–29. Whenever a "space" code tone is detected by a channel detector, it energizes an output circuit 6–30 to energize one input circuit of an AND gate 6–21. If all of the detector units 6–21–6–28 (including the message hold detector unit) detect space tones and thus energizes all of the input circuits of the AND gate 31, the latter energizes an all-space amplifier 6–32 to effect energization of a relay 6–33 (FIG. 6b). The contacts of this relay thereupon close to complete an electrical circuit between the signal ground conductor JDK and an all-space detector conductor JDL which energizes an all-space relay in the receiver interface unit, presently to be described, to indicate that an all-space condition prevails in the data transmission interval.

Whenever any of the detectors 6–21–6–28 detect a "mark" tone, it energizes one input circuit of an associated AND gate 6–36. A second input circuit of these AND gates is energized, concurrently with the second input of the other AND gates, by a sample pulse potential. The latter is generated in response to a timing pulse applied to the timing filter 6–29, and appears in the output circuit of a sample-pulse amplifier 6–37 for application to the AND gates 6–36 through a sample pulse conductor 6–38. When both input circuits of any of the AND gates 6–36 are concurrently energized, the sample pulse potential applied to the one input circuit of such AND gate is translated by the latter to turn ON an associated multivibrator 6–40. The latter thereupon energizes an associated relay 6-41 to effect closure of associated relay contacts and thus effect completion of electrical circuit between the data common conductor JDc and a corresponding one of the data conductors JDA-JDH and/or the message hold conductor JDJ. The completion of such electrical circuits effects the energization of corresponding data code relays and a message-hold relay included in the receiver interface unit presently to be described.

The timing "mark" and "space" tones translated by the timing filter 6-29 are amplified by an amplifying limiter 6-44 and detected by a discriminator 6-45 to control the operation of a bistable slicer 6-46 which transforms the timing pulses to pulses of reshaped rectangular waveform. These reshaped timing pulses are supplied through a differentiator and full-wave rectifier unit 6-47 to a pulse shaper 6-48 which slightly delays the timing pulses by a selectable amount and then converts them to pulses of shorter duration. These further reshaped timing pulses are translated through a differentiating network 6-49 to its output circuit 6-50 which extends to the reset circuit of all of the multivibrators 6-40. The timing pulses translated by the unit 6-49 have quite brief durations and are also applied to the input circuit of the amplifier 6-37 to develop in the output circuit of the latter the sample pulses earlier mentioned. The reset potential pulses developed in the output circuit 6-50 of the differentiating network 6-49 precede the sample pulses generated in the output circuit 6-38 of amplifier 6-37, so that all of the multivibrators 6-40 are reset OFF before the sample pulses condition the AND gates 6-36 to turn ON associated ones of the multivibrators 6-40.

The amplifier of 6-20 of FIG. 6a is conventional as earlier mentioned and needs no further description. FIG. 7 shows the circuit arrangement of typical ones of the channel tone detectors of FIG. 6a, particularly and by way of example the circuit arrangement of the detector 6-21 and the detector 6-28, and additionally shows the circuit arrangement of the AND unit 6-31, the all-space amplifier 6-32, the AND units 6-36 and a typical multivibrator 6-40 of FIG. 6b. The amplified and amplitude limited code tones are concurrently applied to the base electrode of an input transistor Q14 included in each detector channel, and the tones after amplification by the input transistor are applied to a frequency discriminator 7-10 having shunt resonant circuits 7-11 and 7-12 tuned respectively to the mark and space tones associated with that channel. A mark tone is selected by the resonant circuit 7-11 and is applied to a full-wave rectifier 7-13 to develop across an output resistor 7-14 a unidirectional potential having the polarity indicated. A space tone is selected by the resonant circuit 7-12 and is similarly applied to a full-wave rectifier 7-15 to develop across a resistor 7-16 a unidirectional potential having a polarity which, as indicated, is opposite to that of the potential developed across the resistor 7-14 of the channel.

The tone frequency components of these unidirectional potentials are filtered by filter condensers 7-17, and each developed unidirectional potential is applied in series with a positive bias potential to the cathode electrode of an individual diode rectifier device 7-18 of the AND unit 6-31. A mark tone appearing in any detector channel will develop across its output resistor 7-14 a unidirectional potential having a polarity such as to render its associated diode rectifier device 7-18 conductive and thus prevent development of a positive output potential by the AND unit 6-31.

When space tones are received by all detector channels concurrently, however, none of the diode rectifier devices 7-18 is conductive and the AND unit 6-31 accordingly develops an output positive potential which is applied to the base electrode of a transistor Q15 of the all-space amplifier 6-32 to render this transistor fully conductive. This conductive state of the transistor Q15 causes transistors Q16 and Q17 of the all-space amplifier 6-32 also to be rendered conductive with the result that the transistor Q17 energizes the relay 6-33 which closes its associated contacts and thereby establishes electrical continuity between the signal ground conductor JDK and the space detector conductor JDL to indicate that all received tones are space tones.

When a mark tone is received by a detector channel, the unidirectional potential developed across the output resistor 7-14 of that channel is applied through a filter network comprised by a series resistor 7-20 and a shunt condenser 7-21 to a diode rectifier device 7-22 included in the associated AND unit 6-36. The polarity of this unidirectional potential opposes the positive bias potential which normally maintains the diode 7-22 conductive so that the developed mark potential renders the diode 7-22 non-conductive. During this non-conductive interval of the diode 7-22, a sample pulse is applied through the conductor 6-38 to a diode rectifier device 7-23 of the AND unit 6-36 to render the diode 7-23 also non-conductive. The non-conductive states of the diodes 7-22 and 7-23 causes a diode rectifier device 7-24 of the AND unit 6-36 to become conductive and thus render a transistor Q18 non-conductive. The transistor Q18 is included with a transistor Q19 in a conventional bistable multivibrator arrangement comprising the units 6-40, and the non-conductive state of the transistor Q18 causes the transistor Q19 to be rendered conductive and thus energize the relay winding 6-41. The latter thereupon closes its associated relay contacts and completes an electrical circuit between the data common conductor JDc and the data conductor JDA to indicate that the detector channel concerned is receiving a mark tone. The relay 6-41 remains energized until a reset potential pulse applied through the conductor 6-50 renders the transistor Q19 non-conductive thereby to render the transistor Q18 once more conductive.

The answer-back transmitter 6-12 of FIG. 6a has the electrical circuit arrangement shown in FIG. 8. It includes a transistor Q22 included in a conventional oscillatory circuit arrangement including an emitter electrode winding 8-10 coupled to a regenerative feedback base electrode winding 8-11, the winding 8-10 being coupled to a shunt resonant circuit 8-12 to provide a first oscillatory frequency. When the contacts 34 and 35 of the relay 6-13 are closed, a condenser 8-13 is connected in shunt to the resonant circuit 8-12 to lower the oscillatory frequency and thus provide a first answer back transmitter tone. When the relay 6-14 is energized to close its contacts 44 and 45, and inductor 8-14 is connected in shunt to the resonant circuit 8-12 to increase the oscillatory frequency and thus provide a second answer back transmitter tone. Energization of both of the relays 6-13 and 6-14 concurrently to close their respective pairs of contacts 34-35 and 44-45 places both the condenser 8-13 and the inductor 8-14 across the resonant circuit 8-12 to provide a third answer back transmitter tone. The tone frequencies generated by the transmitter are coupled from the collector circuit of the transistor Q22 through a condenser 8-15 to the contact 15 of the control relay 6-10.

The timing signal channel units 6-44 through 6-49 and 6-37 of FIGS. 6a and 6b have electrical circuit arrangements shown in FIGS. 9a and 9b arranged as in FIG. 9. Referring particularly to FIG. 9a, the timing filter 6-29 selects the "mark" and "space" timing tones and applies them to the base electrode of a first stage transistor Q26 of a conventional tandem-connected three stage amplifier including transistors Q27 and Q28. A series circuit including a coupling condenser 9-10 and varistors 9-11 and 9-12 couples the callector electrode of the transistor Q27 to its base electrode to effect amplitude limiting of the timing mark tones amplified by the amplifier Q26. The amplified and amplitude limited timing tones are applied from the output transistor amplifier stage Q28 to the timing discriminator 6-45 which includes space tone and mark tone shunt resonant circuits 9-15 and 9-16.

These space and mark tones, which during data transmissions follow one another at equal time intervals, are full-wave rectified by bridge rectifier circuits 9–17 and 9–18 to derive rectangular-pulse space and mark potentials which are then combined with opposite polarities and integrated by an integrating network including a series inductor 9–19 and shunt condensers 9–20 and 9–21. This integrated timing signal is amplified by a transistor amplifier Q29 of conventional arrangement, and the amplified signal is applied to a bistable multivibrator also of conventional arrangement and which includes cross-coupled transistors Q30 and Q31. As the amplified timing signal goes through the zero intercept in changing from positive to negative polarity, the transistor Q30 of the bistable multivibrator is rendered conductive and the transistor Q31 is thereupon rendered non-conductive. The zero intercept of the timing signal in changing from negative to positive polarity renders the transistor Q30 nonconductive and thus renders the transistor Q31 conductive. Thus there is developed in the output circuit of the transistor Q31 a timing signal of rectangular-pulse wave form which is made to have a pulse interval equal to the interval between pulses by manual adjustment of a bias potentiometer 9–22.

These timing pulses are differentiated by a differentiating amplifier Q32 and the differentiated pulses are translated by a full-wave bridge rectifier 9–26 to a rectifier load resistor 9–27. The potential pulses thus developed across the resistor 9–27, having negative pulse polarity, are coupled through a coupling condenser 9–28 to a monostable vibrator included in the timing pulse shaper 6–48 and which includes transistors Q33 and Q34 in a conventional circuit arrangement. Each negative polarity potential pulse applied to the emitter electrode of the transistor Q33 renders the latter non-conductive and renders the transistor Q34 conductive. After a short interval, selected by manual setting of a potentiometer 9–29 in the base bias circuit of the transistor Q33, the latter transistor once more becomes conductive and the transistor Q34 is thereupon rendered non-conductive. The lagging edges of the potential pulses thus developed in the collector circuit of the transistor Q34 are applied to the emitter electrode of a transistor Q35 which with a transistor Q36 provides a further conventional monostable multivibrator included in the timing pulse shaper unit 6–48. The lagging edge of each potential pulse applied to the transistor Q35 causes the multivibrator to execute a very brief cycle of operation, thus to develop in the collector circuit of the transistor Q36 potential pulses which are applied to the base electrode of a differentiating amplifier Q37. The latter includes in its collector electrode circuit the differentiating network 6–49 comprised by a differentiating transformer 9–31. This transformer includes a first secondary winding 9–32 in which the reset potential pulses are developed and are supplied through the conductor 6–50 to reset the data storage triggers 6–40 (FIG. 6b) which store the data mark code bits of a received alphanumeric character or symbol. The transformer 9–31 includes a further secondary winding 9–33 in which brief duration sample potential pulses are developed and after amplification by the conventional transistor amplifier Q38 are applied through the conductor 6–38 to the AND gates 6–36 (FIG. 6a) for purposes of sampling the presence of mark code bits of a newly received alphanumeric character or symbol.

Also shown in FIG. 9b is a conventional power supply system 9–36 which supplies, with respect to ground potential indicated as $E_o$, a negative potential $-E$ and a positive potential $+E$ which are used to energize the electrical circuit arrangements just described in connection with FIGS. 7, 8 and 9. Also shown is a voltage stabilized network, which includes the series resistors 9–37 and 9–38, the shunt connected resistor 9–39 and shunt condenser 9–40, and the series connected voltage regulating varistors 9–41, which supplies a positive "bias" potential to the detector channels having circuit arrangements shown in FIG. 7.

4. The receiver interface unit 27

The electrical circuit arrangement of the receiver interface unit 27 is shown in FIGS. 10a–10d arranged as in FIG. 10. It receives from a power supply system, not shown, a low alternating voltage applied to input conductors JPJ and JPK and a unidirectional voltage applied with positive polarity to an input conductor JPP and with negative polarity to an input conductor JPN. This unit also receives from the remote receiver-recorder unit 15' (FIG. 1), whenever the latter is turned ON, a unidirectional potential applied with positive polarity to an input conductor JLe and with negative polarity to a conductor JLHH.

When the receiver interface unit is first placed into operation, the alternating potential applied to the input conductors JPJ and JPK energizes a red indicator light 10—10 through normally closed contacts 21 and 22 of a relay KSD, or normally closed contacts 21 and 22 of a relay KFS, or normally closed contacts 1 and 2 of a relay KCC and the normally closed contacts 21 and 22 of a relay RKAL. This alternating potential concurrently energizes an audible alarm buzzer 10–11 through normally closed contacts 1 and 2 of the relay KFS and normally closed contacts 4 and 5 of the relay RKAL.

Assume that when the receiver interface unit is placed into operation, the associated remote receiver-recorder unit presently to be described has also been placed into operation as has the transmitter interface unit 15, the transmitter data set unit 17 and the receiver data set unit 26 (FIG. 1). The transmitter interface unit 15 has its relay KCA deenergized at this time as earlier explained in connection with FIG. 3 and provides the earlier described standby character of operation with its associated local receiver-recorder unit 16. Thus the transmitter data set unit 17 is so controlled by the transmitter interface unit 15 at this time that the tone generator of the transmitter data set transmits all space tone frequencies. This causes the receiver data set unit 26 to complete an electrically continuous circuit from its signal ground circuit conductor JDK to its all space detector output circuit JDL as explained in connection with FIG. 6. This electrically continuous circuit energizes the relay KSD (FIG. 10b) through a circuit which extends from the negatively energized conductor JPN, the operating winding of the relay KSD, the normally closed contacts 5 and 6 of a relay KMHM, the normally closed contacts 1 and 2 of a relay KDD, the electrically continuous circuit last mentioned between the conductors JDL and JDK to the positively energized conductor JPP.

The receiver interface unit is now placed into operation by manual actuation of a switch 10S–1 (FIG. 11a) to its reset position. This energizes a relay RKAL through a circuit which extends from the receiver negatively energized conductor JLHH, the operating winding of the relay RKAL, the normally closed contacts 24 and 25 of the relay KFS, the now closed contacts 4 and 5 of the switch 10S–1, and the now closed contacts 26 and 27 of the relay KSD to the receiver positively energized conductor JLe. The contacts 4 and 5 of the relay RKAL thereupon open to deenergize the alarm buzzer 10–11, and the contacts 7 and 8 of the relay RKAL close to complete a hold circuit for this relay through a condenser 11–12 and a resistor 11–13 having values selected to maintain the relay RKAL energized approximately 100 milliseconds after the normal energizing circuit of the relay RKAL is interrupted. The contacts 2 and 3 (FIG. 10d) of the relay RKAL now close to supply positive energization from the line conductor JLe through a diode rectifier device 10–14 to the conductor JLFF extending to the associated receiver-recorder unit to energize a relay (KRT) of the latter. When the receiver is conditioned for operation and its last mentioned relay (KRT) energized, a further relay (KLC) of the receiver is also energized to complete the electrical continuity of a circuit from the circuit conductor JLFF to a ircuit condutor JLL. The positive energization thus applied to the conductor JLL thereupon energizes a relay RKCA (FIG. 10c) through normally closed contacts 21 and 22 of a relay KMHM. Energization of the relay RKAL effects opening of its contacts 21 and 22 to extinguish the indicator lamp 10–11.

The energization of the relay RKCA as last described effects closure of its contacts 24 and 25 (FIG. 10b) to complete an electrically continuous circuit from the simplex line conductor 28 to the signal system ground. This electrically continuous circuit extends from the simplex line cnductor 28 through the normally closed contacts 23 and 24 of a relay KDD, the normally closed contacts 4 and 5 of the relay KFS, the now closed contacts 24 and 25 of the relay RKCA, normally closed contacts 21 and 22 of a relay RKGD, the operating winding of a relay KCM (having relatively low ohmic value of the order of 500 ohms), and the now closed contacts 22 and 23 of the relay RKAL to the system ground conductor.

The previously described energization of the relay RKCA effects closure of its contacts 26 and 27 to energize a relay RKFCD (FIG. 10d) through normally closed contacts 27 and 28 of the relay KMHM.

It was previously explained that the transmitter interface unit initiates each new transmission by causing the associated transmitter data set to transmit a message hold "mark" tone. When this occurs, the receiver data set unit interrupts the electrical continuity between the signal ground conductor JDK and the all space detector conductor JD11 and a relay KSDM now is energized in series with the relay KSD. This energizing circuit extends from the negatively energized conductor JPN, the operating winding of the relay KSD, the now closed contacts 24 and 25 of the relay KSD, the normally closed contacts 3 and 4 of the relay KSDM, the operating winding of the relay KSDM, the normally closed contacts 21 and 22 of the relay KDD, the now closed contacts 27 and 28 of the relay RKFCD, and the now closed contacts 5 and 6 of the relay RKAL to the positively energized conductor JPP. A hold circuit for the relay KSDM is completed through its now closed contacts 1"AX" and 2 (which move into engagement before the contacts 3 and 4 of the relay KSDM open) and a resistor 10–15 to the negatively energized conductor JPN. Thereafter the normally closed contacts 3 and 4 of the relay KSDM open to interrupt the original energizing circuit of this relay and thereby effect deenergization of the relay KSD.

The contacts 2 and 3 (FIG. 10c) of the relay RKFCD now close whereby a circuit is completed from the positively energized conductor JLL through the latter mentioned contacts, the normally closed contacts 1 and 2 of a relay KSD, the now closed contacts 24 and 25 of the relay RKAL, the normally closed contacts 1 and 2 of a relay KGA, and the normally closed contacts 23 and 24 of a relay RKGD to a conductor JLP which is positively energized from the associated receiver-recorder unit.

The now closed contacts 8 and 9 (FIG. 10b) of the relay KSDM now apply positive energization from the conductor JPP to the data common conductor JDc which enables the code relay contacts of the receiver interface unit to energize the output circuit conductor JDA–JDF, JDH and JDJ as earlier described in connection with FIG. 7 and thereby effect corresponding energization of the code relays RKC–1–RKC–7 and KMH shown in FIGS. 10a and 10b. The energizations of these code relays in accordance with the concurrently presented "mark" code tones of the receiver data set effect closures of the contacts 2 and 3 of these relays (FIGS. 10c and 10d), thereby to energize the data output conductors JLA–JLF and JLH through the now closed contacts 6 and 7 of the relay KSDM, the now closed contacts 24 and 25 of the relay RKAL, the normally closed contacts 1 and 2 of the relay KGA, and the normally closed contacts 23 and 24 of the relay RKGD from the positively energized conductor JLP. Energization of the data code output conductors JLA–JLF and JLH as last mentioned effect corresponding energization of punch magnets included in the receiver-recorder unit presently to be described, and thus effect recording of a received coded alpha-numeric character or symbol.

As earlier explained, the first received code of a data transmission is a transaction code, and all such codes include a code bit 4 "mark" tone to effect energization of the code relay RKC–4. A message hold "mark" tone is concurrently transmitted, as previously explained in connection with the transmitter interface unit 15 (FIG. 1), to effect concurrent energization of the message hold relay KMH for the remainder of the data transmission and until the end of transmission signal is received. Accordingly the now closed contacts 4 and 5 of the relay KMH and the now closed contacts 4 and 5 of the relay RKC–4 energize the relay KMHM through a diode rectifier device 10–16 from the positively energized circuit earlier traced to the conductor JLP. The contacts 1"AX" and 2 (FIG. 10a) of the relay KMHM (which contacts close before the other contacts of this relay open) complete a hold circuit for the relay KMHM after the contacts 4 and 5 of the code relay RKC–4 open upon completion of transmission of the transaction code. The transaction code is supplied to and recorded by the recorder of the associated receiver-recorder unit and, as will presently be explained in the description of this unit, a relay (KSI) of the receiver unit must thereafter remain energized by positive potential applied by the receiver interface unit to the conductor JLL. This positive energization of the conductor JLL is initially established from the positively energized conductor JLP through the now closed contacts 2 and 3 of the relay RKFCD, but is now maintained through the now closed contacts 2 and 3 of the relay KMH, a diode rectifier 10–17, the now closed contacts 1"AX" and 2 of the relay KMHM, the now closed contacts 6 and 7 of the relay KSDM, the now closed contacts 24 and 25 of the relay RKAL, the normally closed contacts 1 and 2 of the relay KGA, and the normally closed contacts 23 and 24 of the relay RKGD to the positively energized conductor JLP. Energization of the relay KMHM opens its contacts 21 and 22 to remove a shunt conductive path from across the now closed contacts 2 and 3 of the relay KMH which, as will presently be described, eventually open to transmit an end of message pulse through the conductor JLL to the relay KSI of the receiver. The contacts 27 and 28 (FIG. 10d) of the relay KMHM open to deenergize the relay RKFCD, and the contacts 5 and 6 (FIG. 10b) of the relay KHMH open to prevent possible sporadic energization of the all space detector relay KSD during the progress of the transmission.

The succeeding coded alpha-numeric characters and symbols received by the receiver data set effect corresponding energizations of groups of the receiver interface code relays RKC–1–RKC–7, and the contacts 2 and 3 (FIGS. 10c and 10d) of these relays close in correspondingly coded groups to energize the data conductors JLA–JLF and JLH and thus by energization of the punch magnets of the associated receiver-recorder unit effect recording of these successively received alpha-numeric characters and symbols.

It was briefly explained that the message hold "mark" tone is terminated for a brief interval as an end of transmission signal. The message hold relay KMH is accordingly deenergized for approximately 10 to 15 milliseconds by the end of transmission signal last mentioned, and the contacts 2 and 3 (FIG. 10c) of the relay KMH accordingly briefly open to deenergize the conductor JLL in turn briefly to deenergize the receiver relay KSI to signify to the receiver the end of transmission. If the receiver has received the correct number of alpha-numeric characters and symbols as identified by the initial transaction code, the receiver applies positive energization to the conductor JLH as a "message good" signal. This energization is applied through the normally closed contacts 1 and 2 of the code relay RKC-7, the normally closed contacts 21 and 22 of the relay RKAM, and a diode rectifier 10-18 to energize a relay RKGD. The contacts 25, 26 (FIG. 10b) of the relay RKGD thereupon open to interrupt the electrical circuit continuity between the data mode conductor JDM and the signal ground conductor JDK, and the contacts 26 and 27 of the relay RKGD now close to establish electrical continuity between the answer back A conductor JDa and the signal ground conductor JDK. As explained in connection with FIG. 6a, this deenergizes the relay 6-15 (with automatic reenergization of the relay 6-10) and energizes the answer back A relay 6-13, whereby the transmission line to the receiver data set 26 is disconnected from the data receiver of this unit and is connected to the output circuit of the answer back transmitter which transmits an answer back A "mark" tone. At the same time, the contacts 23 and 24 of the relay RKGD open to deenergize the relay RKCA (FIG. 10c) and the relay KMHM. Contacts 6 and 7 of the relay RKCA thereupon open to deenergize relay KSDM, and the contacts 24, 25 of the relay RKCA open to interrupt electrical continuity of the simplex line conductor 28 to deenergize the relay KCA of the transmitter interface unit 15 (FIG. 1) as earlier described.

Energization of the relay RKGD effects concurrent charging from the energized line conductor JLH of a condenser 10-21 through a resistor 10-22, and the charged condenser 10-21 accordingly maintains the relay RKGD energized for approximately 70 milliseconds after the receiver has removed the good signal energization from the line conductor JLH. When the receiver completes a sequence of relay operations, presently to be considered in the description of the receiver, it is ready to receive a further transmission as indicated by further reenergization of the line conductor JLL which thereupon reenergizes the relay RKCA through the normally closed contacts 21 and 22 of the relay KMHM. The energization of the relay RKCA effects closure of its contacts 24 and 25, and after the 70 millisecond delay interval provided by continued reenergization of the relay RKGD as just described the contacts 21 and 22 of the latter reclose to complete the electrical circuit continuity to signal ground of the simplex line conductor 28 and thereby effect reenergization of the relay KCM. This completes a data transmission, and the transmitter interface unit stands ready to receive a further all space signal to energize the space detector relay KSD and thus condition it to receive a further transmission.

Should a parity error occur during a data transmission and be detected by the associated receiver-recorder unit, the latter responds to the parity error to remove positive energization from the line conductor JLP. This effects deenergization of the relays RKCA, KMHM, KSDM, and the now open contacts 24, 25 of the deenergized relay RKCA interrupt the electrical continuity to system ground of the simplex line conductor 28 and thus of the relay KCM. It will be recalled from the previous description of the transmitter interface unit that the interruption of the electrical continuity of the simplex line deenergizes the relay KCA of the transmitter interface unit, and that deenergization of this relay effects deenergization of the transmitter interface control conductor JLP to remove access of the active transmitter to the common data communication channel.

It was previously explained that the remote control unit 14' (FIG. 1) could place the data communication system in the attendance mode of operation either manually or automatically during preselected periods of the day. In doing so, the time transmitter of this remote control unit demands access to the input data channel of the receiver-recorder unit to effect an initial time recording. If the receiver is not in process of receiving a data transmission at this time, the demand made upon the receiver by the time transmitter simply causes the receiver to remove positive energization from the line conductor JLL and thereby effect deenergization of the relay RKCA; otherwise, the receiver continues to receive the data transmission while the receiver interface unit maintains positive energization on the conductor JLL in the manner previously explained and to the end of the data transmission at which time the relay RKCA is deenergized as just above described. Prior to the time the relay RKCA was so deenergized, its then closed contacts 26 and 27 maintained the relay RKFCD energized through the now closed contacts 27 and 28 of the relay MHM. Also the then closed contacts 25 and 26 of the relay RKFCD maintained a condenser 10-26 charged through a resistor 10-27. When the relay RKCA is deenergized as last mentioned, its contacts 24 and 25 open to interrupt the electrical continuity of the simplex line conductor 28 and thus deenergize the relay KCM, and th econtacts 26 and 27 of the relay RKCA open to remove energization from the relay RKFCD which, however, remains energized by discharge of the condenser 10-26 for approximately 70 milliseconds. The now closed contacts 5 and 6 (FIG. 10d) of the relay RKFCD establish electrical continuity between the conductors JLd and JLf which delays the time transmission for approximately 70 milliseconds while the relay RKFCD is becoming deenergized. Thus the latter relay establishes a time delay to make certain that the overall system delays have not yet indicated a new data transmission just initiated, in which latter event the data transmission will be initiated within the 70 millisecond delay provided by this relay. Also during this 70 millisecond delay, the closed contacts 23 and 24 of the relay RKFCD maintain positive energization on the conductor JLs which in the receiver maintains the receiver relay KRT energized for the 70 millisecond delay interval and the relay KRT in turn maintains a relay KLC of the receiver energized whereby the input data channel of the receiver is maintained connected to the output conductors JLA-JLF and JLH of the receiver interface unit. If a new data transmission is initiated during this 70 millisecond delay interval, the accompanying message hold tone will energize the message hold relay KMH and the immediately following transaction code will have a 4 bit to energize the code relay KC-4. The relays KMH and KC-4 together reenergize the relays RKCA and KMHM from the positively energized conductors JLL and JLP as previously described. The simplex line is thereupon reclosed and the relay KCM reenergized.

When the relay RKFCD becomes deenergized at the end of its 70 millisecond delay interval, its contacts 21 and 22 close to energize a disconnect delay relay KDD (FIG. 10d) through the now closed contacts 21 and 22 of the relay RKCA and the now closed contacts 26 and 27 of the relay RKAL from the delay disconnect conductor JLK which is positively energized at this time by the associated receiver-recorder unit by reason of the time transmitter demand for access to the receiver common data input channel (and is likewise energized when the operator manually takes the receiver out of its receive condition). The contacts 3 and 4 of the relay KDD open and its contacts 4 and 5 close to interrupt electrical continuity between the signal ground conductor JDK and the data mode conductor JDM and to establish electrical continuity between the signal ground conductor JDK and the answer back B conductor JDb. It will be recalled from the description of FIG. 6a that this deenergizes the relay 6-15 and energizes the relay 6-10 to disconnect the data receiver of the data set unit 26 (FIG. 1) from the transmission line and to connect the output of the answer back transmitter to the transmission line while at the same time energizing a relay 6-14 to cause the transmitter to transmit an answer back B "mark" tone. The contacts 24 and 25 of the relay KDD close to connect, between the system ground and the simplex line conductor 28, the operating winding of a relay KCC having relatively high resistance which enables energization of the relay KCC without effecting energization of the relay KCA of the transmitter interface unit. The contacts 3 and 4 of the relay KCC close to establish a hold energizing circuit for the relay RKAL throughout each period of the attendance mode of system operation, thus preventing deenergization of the relay RKAL which would have the effect of causing the transmitter interface unit to transfer to standby operation as explained in connection with the arrangement of the transmitter interface unit.

When the time transmitter transmits its first time digit for recording by the receiver-recorder unit, energization is removed from the delay disconnect conductor JLK but the relay KDD nevertheless remains energized through a diode rectifier 10–28 and the now closed contacts 9 and 10 of the relay KDD from a conductor JLx which is energized directly from the energizing circuit of a receiver relay KRO that is energized at this time. The contacts 1 and 2 of the relay KDD are now open and prevent energization of the all space detector relay KSD during the attendance mode changeover interval while the system has the answer back transmitter of the receiver data set connected for operation. Near the end of the transmission of the first time digit, a relay RKAM (FIG. 10d) is energized through the normally closed contacts 28 and 29 of the relay RKGD from the attendance mode conductor JLU which is energized by the receiver during the attendance mode of system operation. The now closed contacts 26 and 27 of the relay RKAM complete a hold circuit to the energized conductor JLU, and the now closed contacts 2 and 3 of the relay RKAM energize the relay RKGD through an energizing circuit which includes the normally closed contacts 1 and 2 of the relay KAMM and the now closed contacts 2 and 3 of the relay RKAM. The contacts 24 and 25 of the relay RKAM close to establish electrical continuity between the signal ground conductor JDK and the answer back B conductor JDb so that this electrical continuity is maintained when the now closed contacts 26 and 27 of the relay RKGD establish electrical continuity between the signal ground conductor JDK and the answer back A conductor JDa. This causes the answer back transmitter to transmit both A and B "mark" tones which have the effect at the transmitter interface unit to place the data system in the attendance mode as earlier explained. When the time transmission is completed, the receiver reenergizes the conductor JLL to reenergize the relay RKCA. The relay KDD is now deenergized both by removal of positive energization from the conductor JLx (the receiver relay KRO is deenergized at this time) and also by the now open contacts 21 and 22 of the relay RKCA. A relay KAMM is now energized through the now closed contacts 7 and 8 of the relay RKGD, the now closed contacts 4 and 5 of the relay RKAM, the now closed contacts 8 and 9 of the relay RKCA, and the now closed contacts 2 and 3 of the relay RKAL. The contacts 2 and 3 of the relay KAMM open to effect deenergization of the relay RKGD after a short time delay interval established by discharge of the condenser 10–21. The contacts 21 and 22 of the relay RKGD now close to complete the electrical continuity to system ground of the simplex line conductor 28 with consequent reenergization of the relay KCM. The contacts 25 and 26 of the relay RKGD also now close to establish through the now closed contacts 3 and 4 of the relay KDD electrical continuity between the signal ground conductor JDK and the data mode conductor JDM to remove the connection of the receiver data set answer back transmitter from the transmission line and to effect reconnection of the latter to the data receiver of the data set. The receiver interface unit is now in readiness to receive attendance mode data transmissions by initial energization of the all space detector relay KSD, the contacts 26, 27 of which close to establish a hold circuit for the relay RKAL during subsequent attendance mode data transmissions.

Attendance mode data transmissions are now received and recorded by the associated receiver-recorder unit in the manner above described, and the end of each such data transmission is signified as before by brief deenergization of the message hold relay KMH so that the contacts 2 and 3 of the latter effect corresponding temporary deenergization of the conductor JLL as previously explained. The receiver as before indicates a message good reception by energization of the conductor JLH which now, however, energizes the relay KGA through the now closed contacts 22 and 23 of the relay RKAM. The contacts 1 and 2 (FIG. 10c) of the relay KGA thereupon open to deenergize the relays RKCA and KMHM. The deenergized state of the relay RKCA accordingly interrupts electrical continuity of the simplex line conductor 28 at the new open contacts 24 and 25 of the relay RKCA, but the receiver data set answer back transmitter is not placed into operation as in the case of data transmissions occurring in the non-attendance mode of system operation. Rather, the receiver-recorder simply reenergizes the conductor JLL to effect reenergization of the relay RKCA to recomplete the electrical continuity of the simplex line conductor 28 and condition the transmitter interface unit to effect a further attendance mode data transmission. In the attendance mode of operation, the associated receiver-recorder unit maintains the conductor JLP energized even though the receiver may detect a parity error in a received alpha-numeric or symbol code, so that parity errors have no effect on transmissions in the attendance mode of system operation.

When the remote control unit 14' (FIG. 1) removes the system from the attendance mode of operation, the time transmitter of the control unit effects a time recording by the receiver-recorder unit. At the end of this time transmission, the conductor JLU becomes deenergized to deenergize the relay RKAM and the contacts 1 and 2 of the latter now close to energize the relay RKGD. The contacts 25 and 26 of the latter open to interrupt electrical circuit continuity between the signal ground conductor JDK and the data mode conductor JDM, thus placing the receiver data set answer back transmitter in operation with transmission of an answer back A "mark" tone effected by the establishment of electrical continuity between the signal ground conductor JDK and the answer back A conductor JDa through the now closed contacts 26 and 27 of the relay RKGD. The relay KAMM is deenergized at the now open contacts 6 and 7 of the relay RKGD, and the relay RKGD is itself deenergized by the now open contacts 2 and 3 of the relay KAMM but remains energized for the short 70 millisecond delay interval earlier mentioned by discharge of the associated condenser 10–21. The receiver interface unit thereupon is conditioned for non-attendance mode data transmissions in the manner first explained above.

The all space detector relay KSD is normally energized during the interval between successive data transmissions, and during such interval the switch 10–S1 may be manually operated to its disable position where it will remain with its contacts 2 and 3 operated to closed position. This will effect energization of the relay KFS through the contacts 2 and 3 of the switch 10–S1 and the contacts 28 and 29 of the all space detector relay KSD. The now closed contacts 28 and 29 (FIG. 10a) of the relay KFS maintain this relay energized even though the space detector relay KSD should become briefly deenergized to open its contacts 5 and 6. The contacts 5 and 6 (FIG. 10b) of the relay KFS now close to complete the electrical continuity of the simplex line conductor 28 through the high resistance operating winding of the relay KCC to energize this relay while deenergizing the relay KCA of the transmitter interface unit as earlier described. Deenergization of the last mentioned relay causes the transmitter interface unit to be conditioned to receive answer back transmissions as earlier described in connection with FIG. 3, but the receiver interface unit does not establish any answer back transmissions at this time. When the transmitter interface unit has failed to receive answer back transmissions for a period of one second, it automatically places the system in the earlier described standby operation wherein the local receiver-recorder 16 (FIG. 1) is coupled by the transmitter interface unit to the common data communication channel used by the several system transmitters. The contacts 1 and 2 of the relay KFS interrupt the energizing circuit for the alarm buzzer 10–11 for a reason which will now be considered.

During normal system operation, the relay RKAL can become deenergized by reason of some malfunction of the system which causes the all space detector relay KSD to become deenergized for a prolonged period. The contacts 26 and 27 (FIG. 10a) of the relay KSD open under this condition to interrupt the energizing circuit for the relay RKAL, but the latter is maintained energized for a 100 millisecond interval thereafter by discharge of the condenser 10–12 through the now closed contacts 7 and 8 of the relay RKAL and the operating winding of this relay. When the relay RKAL eventually becomes deenergized by prolonged deenergization of the relay KSD, its contacts 4 and 5 close to energize the alarm buzzer 10–11. At the same time, the contacts 21, 22 of the relay RKAL close to energize the red indicator light 10—10. The same character of operation prevails in the event that the all space detector KSD remains energized between data transmissions but the electrical continuity of the simplex line 28 is interrupted to deenergize the relay KCM for a prolonged interval, thus to open the contacts 3 and 4 of this relay and thereby interrupt the direct energizing circuit of the relay RKAL. With the relay RKAL so deenergized by one of the system operating conditions just described, manual operation of the switch 10–S1 to its disable position will effect energization of the relay KFS if the all space detector KSD is energized. Energization of the relay KFS deenergizes the alarm buzzer 10–11 as just explained, but continued energization of the lamp 10—10 provides a visual indication that the relay KCC contacts 1 and 2 remain closed and thus that an electrically discontinuous simplex line circuit has prevented energization of the relay KCC. When the lamp 10—10 thereafter becomes extinguished, an indication is provided that the simplex line circuit once more has electrical continuity to energize the relay KCC. The operator may then manually operate the switch 10–S1 to its reset position to place the receiver interface unit in operative condition to receive data transmissions as previously described. If neither the alarm buzzer 10–11 nor the indicator lamp 10—10 are deenergized when the switch 10–S1 is manually operated to its disable position, an indication is provided that the all space detector relay KSD stands deenergized by reason of the absence of one or more space tone frequencies. In this event, neither the alarm buzzer 10–11 nor the indicator lamp 10—10 can be deenergized by operation of the switch 10–S1 to either its reset or disable position.

If a malfunction of the system should cause the code tone frequencies to be lost in the middle of a data transmission, the last code received will remain stored in the code relays RKC–1–RKC–7 and will be repetitively recorded by the receiver-recorder unit. When this continues beyond a normal message transmission interval, a receiver relay (KTD) energizes a conductor JLr to energize the relay KDD through a diode rectifier 10–30. The contacts 21 and 22 (FIG. 10b) of the relay KDD thereupon open to deenergize the relay KSDM, and the contacts 8 and 9 of the latter open to interrupt the energization of the data common input conductor JDc and thus prevent further energization of the code relays RKC–1–RKC–7 and the message hold relay KMH. The contacts 2 and 3 (FIG. 10c) of the relay KMH thereupon open to interrupt energization of the conductor JLL, and this causes a receiver relay (KSI) to effect the recording of a cancel code and the deenergization of the conductor JLr. Deenergization of the latter conductor does not immediately effect deenergization of the relay KDD which is maintained energized for a short interval by discharge of a condenser 10–31 through a resistor 10–32, the diode rectifier 10–30 and the operating winding of the relay KDD. While the relay KDD remains thus energized, its contacts 23–25 transfer to deenergize the relay KCM and energize the high resistance operating winding of the relay KCC with resultant deenergization of the transmitter interface relay KCA which causes the latter to place the transmitter data set unit in the answer back mode of operation. The contacts 3–5 (FIG. 10b) of the relay KDD transfer to place the receiver interface unit in the answer back mode with transmission of an answer back B "mark" tone, and the transmitter interface unit then resumes operation with transmission of all space "mark" tones.

5. The receiver-recorder units 16 and 16'

The electrical circuit arrangement of the receiver-recorder unit is shown in FIGS. 11a–11h arranged as in FIG. 11 and, with the exception of certain changes hereafter noted, is essentially similar to the receiver-recorder unit described in the aforementioned copending application Ser. No. 254,896 to which reference is made for a more complete understanding of the detailed arrangement and operation of this unit.

Briefly considered for purposes of the present description, the data collection system herein described may or may not employ a time transmitter in the control unit 14 or 14' (FIG. 1). While the use of a time transmitter is quite desirable, principally for recording the times of receipt of data transmissions and to enable the system to operate in the attendance mode earlier mentioned, its use is not essential. FIGURE 11a accordingly shows in broken lines an appropriately labelled group of jumper connections made between the line terminals there shown when a time transmitter is not used. The following brief description of the receiver electrical circuit arrangement will assume at the outset that no time transmitter is used in the system. This description will be followed by consideration of a slightly changed character of receiver operation when using a time transmitter but without system operation in the attendance mode, and the description will conclude with consideration of the receiver operation during periods of attendance reporting.

The recorder portion of the receiver-recorder unit is herein shown by way of example as comprised by a tape punch which may have the physical construction shown in the Blodgett U.S. Patent No. 2,927,158 and which punch records successive information-item groups of punch-code apertures. For this purpose, the punch unit includes punch magnets LP1–LP8 (FIGS. 11a and 11b) which are energized singly and in code combinations and further includes a punch clutch magnet LPC which is energized to effect each cycle of punch operation in accomplishing an information-item recording. The punch unit is driven by a synchronous motor 50 (FIG. 11d) which with a motor starting relay 51 is energized from a suitable alternating current power source PAC upon manual actuation of a power switch 11–S4 to its ON position to close its contacts 1 and 2. A punch unit tape take-up motor 11M (FIG. 11d) is also energized at this time. The punch unit also includes cam actuated contacts SPCC1 through SPCC11 shown at various locations in FIG. 11, each having electrical contacts which are operated to open-circuit and closed-circuit positions during specific angular notations associated with each punch cam actuated contact shown in FIG. 11.

Upon manual actuation of the power switch 11–S4 (FIG. 11d) to its ON position to energize the punch motor 50 as earlier described, a unidirectional power supply system 52 is concurrently energized to provide a unidirectional power source for the receiver. A relay KCD (FIG. 11d) is also energized from the punch motor alternating current circuit, and an alarm buzzer 53 (FIG. 11a) and error indicating lamp 54 are now energized through normally closed contacts 1 and 2 of a relay KLP from a low voltage alternating current source of energization furnished by the power supply unit 52.

Figure 11B:
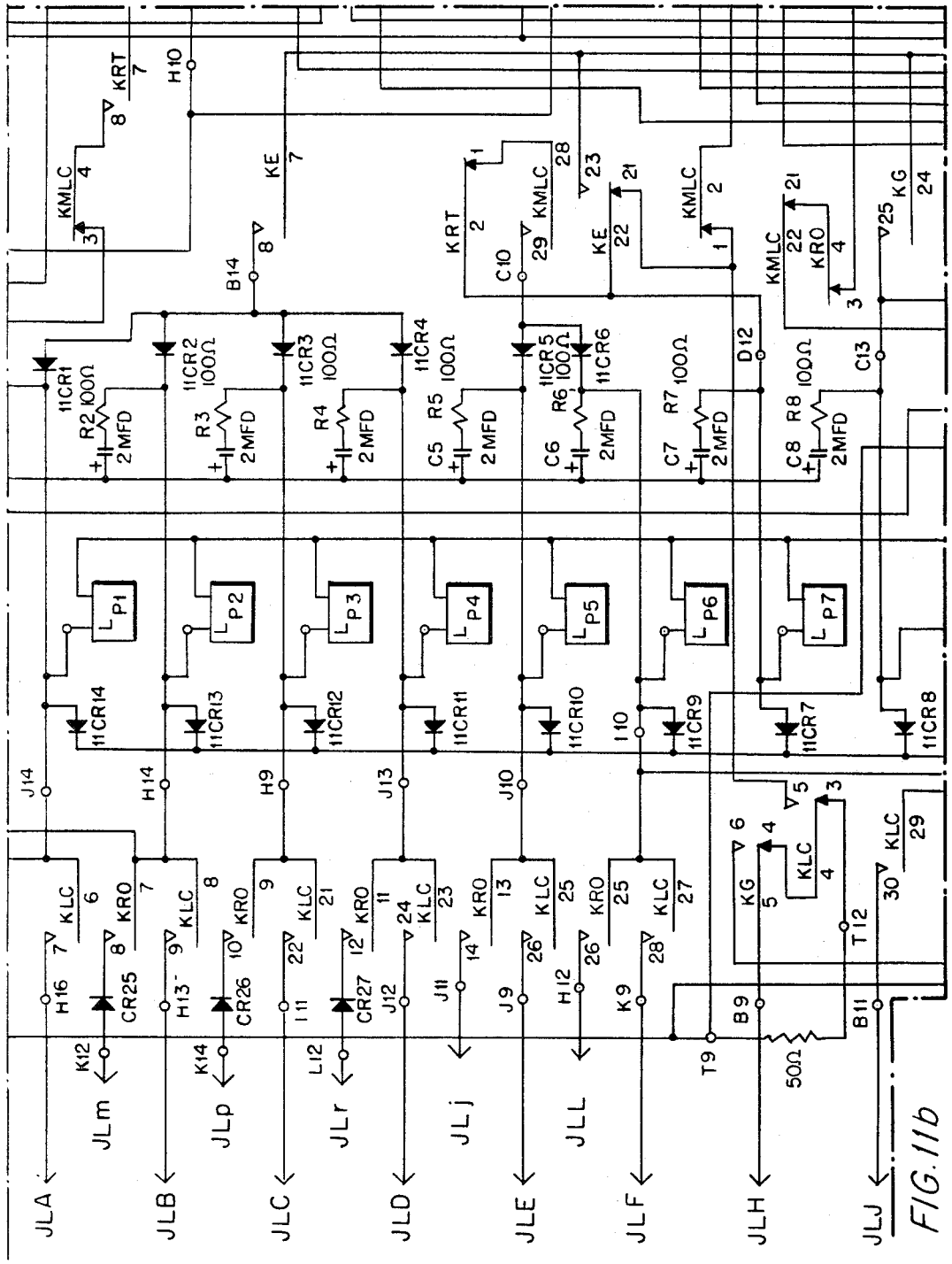

The receiver is placed into operation by relatively brief manual actuation of a tape feed switch 11–S3 (FIG. 11a) to close its contacts 4 and 5. The switch 11–S3 is manually retained in actuated position for a minimum of one cycle of the tape punch unit for a reason presently to be explained. Manual actuation of the switch 11–S3 energizes an error relay KE (FIG. 11g) through a diode rectifier CR29 and the now closed contacts 4 and 5 of the tape feed switch 11–S3. The relay KE is maintained energized to 41° of each punch cycle, initiated in a manner presently to be explained, through punch cam actuated contacts SPCC11 (FIG. 11e). A relay KLP (FIG. 11a) is also energized through a diode rectifier CR28 and the now closed contacts 4 and 5 of the tape feed switch 11–S3. The relay KLP is maintained energized through its now closed contacts 7 and 8. The contacts 1 and 2 (FIG. 11d) of the relay KLP now open to deenergize the alarm buzzer 53 and the error indicator lamp 54.

The now closed contacts 7, 8 and 22, 23 (FIG. 11b) of the error relay KE apply energization from the normally closed punch cam actuated contacts SPCC10 (FIG. 11c) through diode rectifier devices 11CR1–11CR4 to the punch magnets LP1–LP4 and directly energize the punch magnet LP7. Each of the punch magnets has an associated diode rectifier 11CR7–11CR14 associated with it as shown and by which the energization of any of these magnets effects energization of a relay KCR (FIG. 11c) to close its contacts 1, 2 and 3 of which the contacts 2 and 3 provide a hold energizing circuit for the relay KCR, and the contacts 1 and 3 energize the punch clutch magnet LPC, through the punch cam actuated contacts SPCC10. Thus the initial energization of the error relay KE is effective to punch record a 1–2–3–4–7 cancel code.

During the first cycle of the punch operation just described a message length control relay KMLC (FIG. 11f) is energized when the punch cam actuated contacts SPCC9 close at 30° of the punch cycle and is retained energized through its now closed contacts 30 and 31. This hold circuit retains the relay KMLC energized, if the relay KE remains energized, after the punch cam actuated contacts SPCC9 open at 245° of the punch cycle. The now closed contacts 28 and 29 (FIG. 11b) of the relay KMLC energize through diode rectifier devices 11CR5 and 11CR6 the punch magnets LP5 and LP6 so that the concurrent energizations of the error relay KE and the message length control relay KMLC cause the punch unit to record a delete code 1–2–3–4–5–6–7 upon each successive cycle of the punch which continues in operation so long as the error relay KE remains energized as a result of continued manual actuation of the tape feed switch 11–S3.

Upon manual release of the tape feed switch 11–S3, its contacts 4 and 5 open to deenergize the error relay KE when the cam actuated contacts SPCC11 open between 41° and 175° of the punch cycle. The contacts 24 and 25 of the relay KE now open to deenergize the message length control relay KMLC. A receive switch 11–S1 (FIG. 11d) is now manually actuated to its ON position, this switch being of the toggle type and remaining in the ON or OFF position to which it is manually set. A receive transmission relay KRT (FIG. 11d) is thereupon energized through a diode rectifier CR32, the normally closed contacts 5 and 6 of the relay KMLC, the normally closed contacts 2 and 3 of the tape feed switch 11–S3, the now closed contacts 23 and 24 of the relay KLP, and the now closed contacts 4 and 5 of the switch 11–S1 to the conductor JLFF which is energized to a positive potential by the operative state of the receiver interface unit as earlier described in connection with FIG. 10.

The relay KRT remains energized through its contacts 9 and 10 and a diode rectifier CR30, and its energizing potential is supplied through the conductor JLs to the receiver interface unit. A line-connecting relay KLC (FIG. 11c) is now energized through normally closed contacts 1 and 2 of a relay KRO, normally closed contacts 24 and 25 of a relay KET, normally closed contacts 1 and 2 of a relay KTS, normally closed contacts 3 and 4 of a time delay relay KTD, normally closed contacts 21 and 22 of a relay KPE, and now closed contacts 28 and 29 of the relay KRT. As shown in FIG. 11b, the contacts 4–9 and 21–30 of the line connecting relay KLC complete electrical circuits between the punch magnets LP1–LP8 and individual ones of the conductors JLA–JLF and JLH which comprise the data input channel extending to the receiver interface unit of FIG. 10 earlier described.

Positive energization is thereupon applied to the transmission line conductor JLL (FIG. 11a) as required, for reasons previously explained, to enable energization of certain relays of the receiver interface unit during operation of the latter. This energizing circuit includes normally closed contacts 5 and 6 of the relay KMLC, the now closed "AX" (fast closing) contacts 1 and 2 of the relay KLC, and the normally closed contacts 21 and 22 of the relay KCT. Energization of the line conductor JLL as just described effects concurrent energization of a stop indicator relay KSI (FIG. 11d) through a diode rectifier device CR16. This relay has numerous contacts which complete and interrupt energizing hold circuits for numerous other relays included in the receiver as will later be explained.

It will be recalled that the first code of each data transmission is a transaction code, typical of which may be codes 2–4–5, 2–4–7, 2–4–6, 1–3–4–5–6, 1–3–4–6–7, 1–3–4–5–7– and 2–4–5–6–7 to cite these codes by way of example. A badge reader code 1–3–4 is transmitted as the first code of a badge transmitter operation, and a 1–2–3–4–5 code signifies an attendance mode time transmission. These transaction and time codes when received energize the punch magnets LP1–LP7 for recording by the tape punch unit, and also effect energization of transaction code storage relays KC2, KC6 and KC7 shown in FIG. 11e. Specifically, the code bit No. 2, code bit No. 6 and code bit No. 7 of the transaction and time code effect energization of the relays KC2, KC6 and KC7 from the individual energizing circuits of the respective punch magnets LP2, LP6 and LP7. These energizing circuits include the respective normally closed contacts 3 and 4 of each of these relays and the normally closed contacts 1–4 and contacts 21 and 22 of the relay KMLC as shown. The energizing circuits of the relay KC2 additionally includes the now closed contacts 7 and 8 of the relay KRT, the energizing circuit of the relay KC6 additionally includes the normally closed contacts 3 and 4 of the relay KRO, and the energizing circuit of the relay KC7 additionally includes the normally closed contacts 21 and 22 of the relay KE. These relays are maintained energized through the now closed "AX" (fast closing) contacts 1 and 2 of each from the punch cam actuated contacts SPCC10, this energizing circuit including a diode rectifier CR21 (FIG. 11c) and the contacts 1 and 3 of the control relay KCR which is energized by the received transaction code. This hold energizing circuit is interrupted at 15° of the punch cycle when the cam actuated contacts SPCC10 open, but is then continued from 15° to 185° of the punch cycle when the cam actuated contacts SPCC1 (FIG. 11g) close and apply energization through the diode rectifier CR41 and the now closed contacts 28 and 29 of the relay KRT. At 30° of the punch cycle the punch cam actuated contacts SPCC9 (FIG. 11c) close to energize the relay KMLC through the now closed contacts 30 and 31 of the relay KRT, and thereafter the hold energizing circuit of the transaction code storage relays KC2, KC6 and KC7 is continued through the diode CR41, the now closed contacts 9 and 10 of the relay KMLC and the now closed contacts 28 and 29 of the relay KRT. Also in this punch cycle a delay relay KRD is energized through the now closed contacts 2 and 3 of the relay KSI, the normally closed contacts 4 and 5 of a relay KET, the now closed contacts 9 and 10 of the relay KMLC, and the now closed contacts 28 and 29 of the relay KRT.

The hold energizing circuit last mentioned allows the punch cam actuated contacts SPCC7 (FIG. 11h), upon closing of these contacts at 100° of the punch cycle, to energize a message length count relay KMLO through normally closed contacts 1 and 2 of a message length count relay KML3, normally closed contacts 4 and 5 of a message length count relay KML2, and normally closed contacts 4 and 5 of a message length count relay KML1. Now when the punch cam actuated contacts SPCC6 (FIG. 11h) restore at 249° of the punch cycle, the message length count relay KML1 is energized in series with the relay KMLO and through the now closed contacts 2 and 3 of the message length count relay KMLO. This registers a count of one in these message length count relays corresponding to the transaction code which was received and recorded during this punch cycle.

The energization of the message length relay KMLC, effected in the manner just explained, opens it contacts 5 and 6 to remove the direct positive energization of the transmission line conductor JLL effected in the manner previously explained, and the relay KSI must now be maintained energized by positive potential applied to the line conductor JLL from the receiver interface unit as previously explained in connection with FIG. 10. The previously energized relay KRD is of the slow-to-release type (i.e., its contacts remain in closed contact position for a short interval after the relay is deenergized) and effectively monitors the interval during which the relay KSI remains deenergized in response to an eventual brief removal of positive energization from the line conductor JLL to signify the end of a data transmission as explained above in connection with the description of the receiver-interface unit. If by reason of a system malfunction the relay KSI should remain deenergized sufficiently long that the contacts of the relay KRD close, an error procedure is inaugurated as will now be briefly explained. Each de-energization of the relay KSI causes a relay KTS to become energized either through normally closed contacts 21 and 22 of a relay KRO or the closed contacts of a punch cam actuated contact SPCC2 and the now closed contacts 1 and 2 of the relay KSI from the energizing circuit which extends through the now closed contacts 9 and 10 of the relay KMLC. The concurrent deenergization of the relay KSI and closure of the contacts of the delay relay KRD now cause the error relay KE to become energized through the now closed contacts 21 and 22 of the relay KTS, the normally closed contacts 1 and 2 of the relay KRD, a diode rectifier CR17, and the normally closed contacts of the punch cam actuated contacts SPCC4 energized through the diode rectifier CR41 by the energizing circuit which extends through the now closed contacts 9 and 10 of the relay KMLC. Energization of the relay KE effects the previously described energization of the punch magnets LP1–LP4 and LP7 to punch a cancel code 1-2-3-4-7 and initiates a sequence of relay deenergization, hereinafter described, to place the receiver in readiness to receive a further data transmission.

After the transaction code of a data transmission is received and recorded as above explained, each subsequent received code is likewise recorded by the punch unit and is counted by the message length counter relays KMLO through KML3. It has just been explained that the received transaction code caused energization of the relays KMLO and KML1, which are then maintained energized in series by the punch cam actuated contacts SPCC6. The next received code initiates a cycle of punch operation to effect recording of this code by the punch unit and at 100° of the punch cycle punch cam actuated contacts SPCC7 (FIG. 11h) close to maintain the relay KML1 energized through its now closed contacts 5 and 6, the normally closed contacts 4 and 5 of the relay KML2, and the normally closed contacts 1 and 2 of the relay KML3. The relay KMLO is now deenergized by the opening of the punch cam actuated contacts SPCC6 at 110° of the punch cycle and by the now open contacts 4 and 5 of the relay KML1. When the punch contacts SPCC6 again close at 249° of the punch cycle, the relay KML2 is energized in series with the relay KML1 through the normally closed contacts 1 and 2 of the relay KMLO and the now closed contacts 2 and 3 of the relay KML1. This concurrent energization of the relays KML1 and KML2 effects storage of a count of two in the message length relays which is consistent with the fact that both a transaction code and a first data code have been recorded by the punch unit. The second received data code effects a further cycle of punch operation for recording of this code, and the punch cam actuated contacts SPCC7 close during the punch cycle to maintain the relay KML2 energized and cam actuated contacts SPCC6 open to deenergize the relay KML1. Thereafter the punch cam actuated contacts SPCC6 close to energize the message length count relay KML3 in series with the relay KML2 through the normally closed contacts 1 and 2 of the relay KMLO, the normally closed contacts 1 and 2 of the relay KML1 and the now closed contacts 2 and 3 of the relay KML2. This concurrent energization of the relays KML2 and KML3 records a count of three which is consistent with the recording of a transaction code and two data codes. The fourth data code in similarly initiating a cycle of punch operation causes the punch contacts SPCC7 to retain the relay KML3 energized while the opening of cam actuated contacts SPCC6 deenergizes the relay KML2, but the relay KML3 now becomes deenergized upon subsequent opening of the punch cam actuated contacts SPCC7 thus to leave all of the relays KMLO through KML3 deenergized and by their deenergized states effectively to store a count of four. Thus it will be seen that the length of message is determined on a "modulus-four" basis in that the total number of digits in a message (including the transaction code, the body of the message, and time transmission when used) is divided by four and any remainder is indicated by the energized states of the message length relays KMLO through KML3.

When a data transmission is completed and the receiver interface unit briefly removes positive energization from the line conductor JLL (FIG. 11a), the relay KSI is thereupon deenergized. The contacts 1 and 2 (FIG. 11e) of the relay KSI thereupon close to energize the relay KTS in the manner earlier explained, and energization of the relay KTS is thereafter maintained through its now closed contacts 4 and 5 which are connected in parallel with the contacts 1 and 2 of the relay KSI. The relay KLC (FIG. 11c) is now deenergized by interruption of its energizing circuit at the now open contacts 1 and 2 of the relay KTS, and the contacts 4–9 and 21–30 (FIG. 11b) of the relay KLC open to disconnect the punch magnets LP1–LP7 from the input conductors JLA–JLF and JLH. The slow-to-release relay KRD is also deenergized by the now open contacts 2 and 3 of the relay KSI, but the contacts of the relay KRD open only after approximately 25 milliseconds which is a longer interval than the approximately 12 milli-second interval before the receiver interface unit again applies energization to the line conductor JLL to effect reenergization of the relay KSI through the diode rectifier CR16 (FIG. 11d). The relay KSI now remains energized through its now closed contacts 21 and 22 and the now closed contacts 2 and 3 of the relay KTS from the energizing circuit which extends through the normally closed contacts 3 and 4 of the delay relay KTD.

Figure 11C:
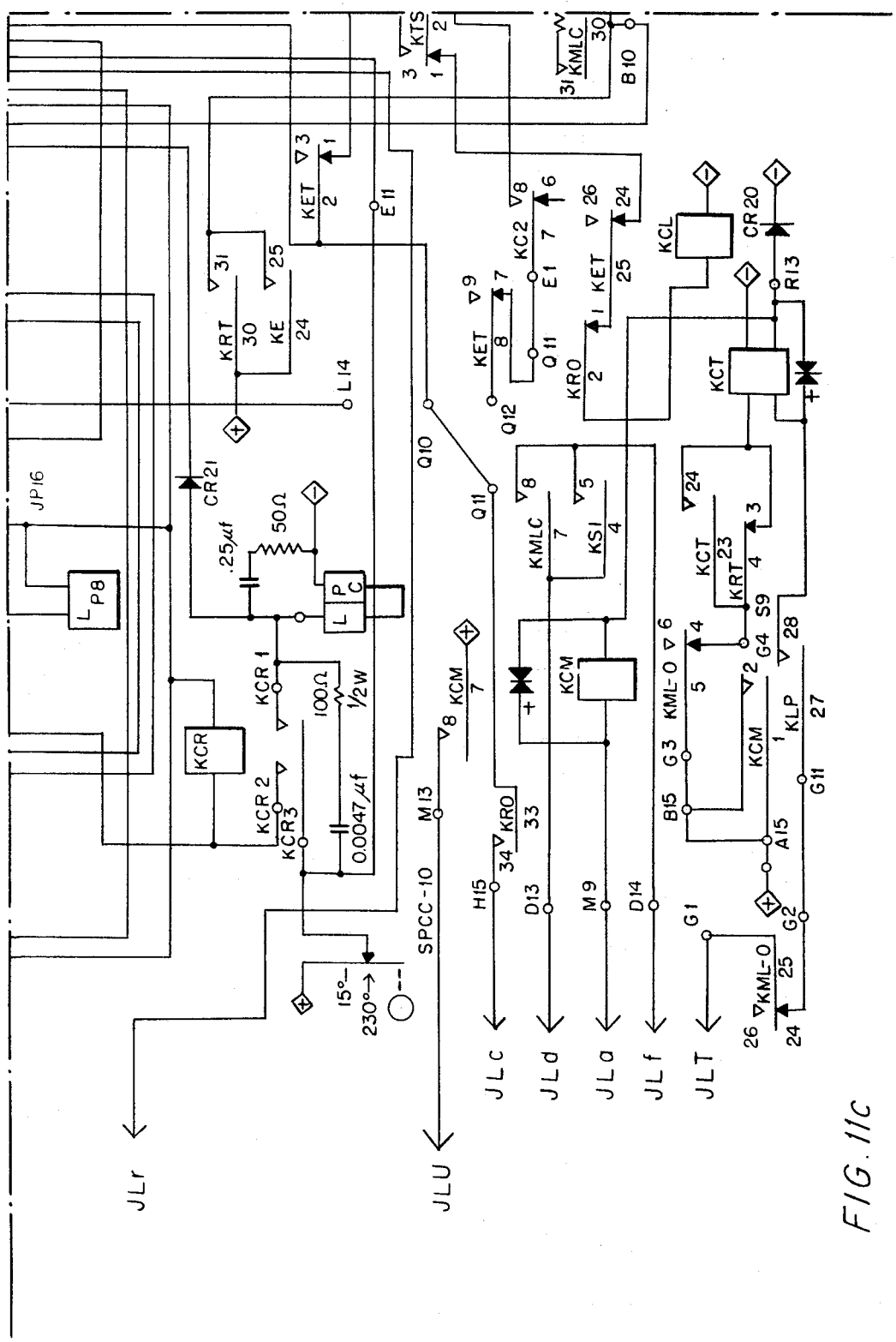
Figure 11D:
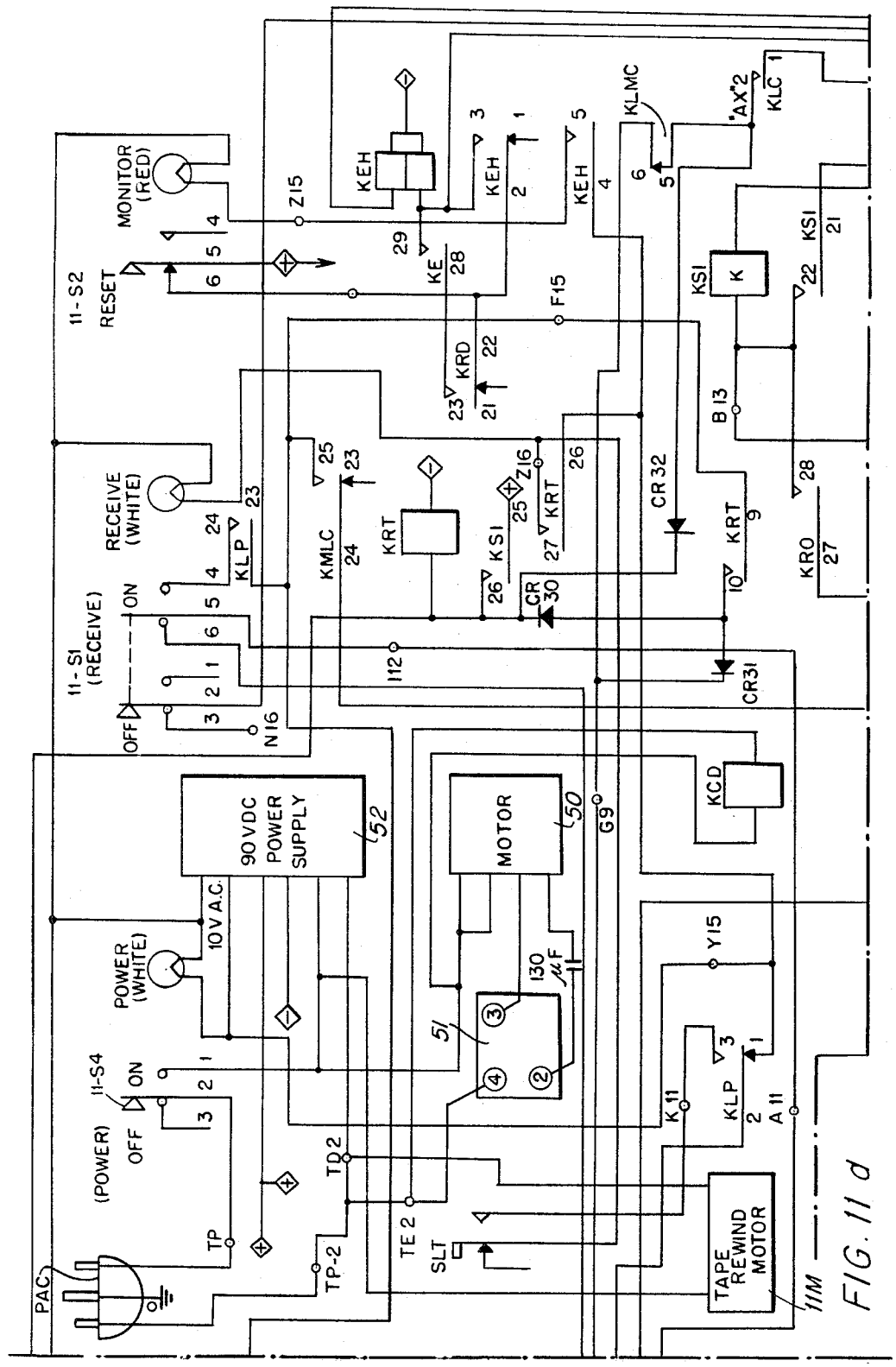
Figure 11E:
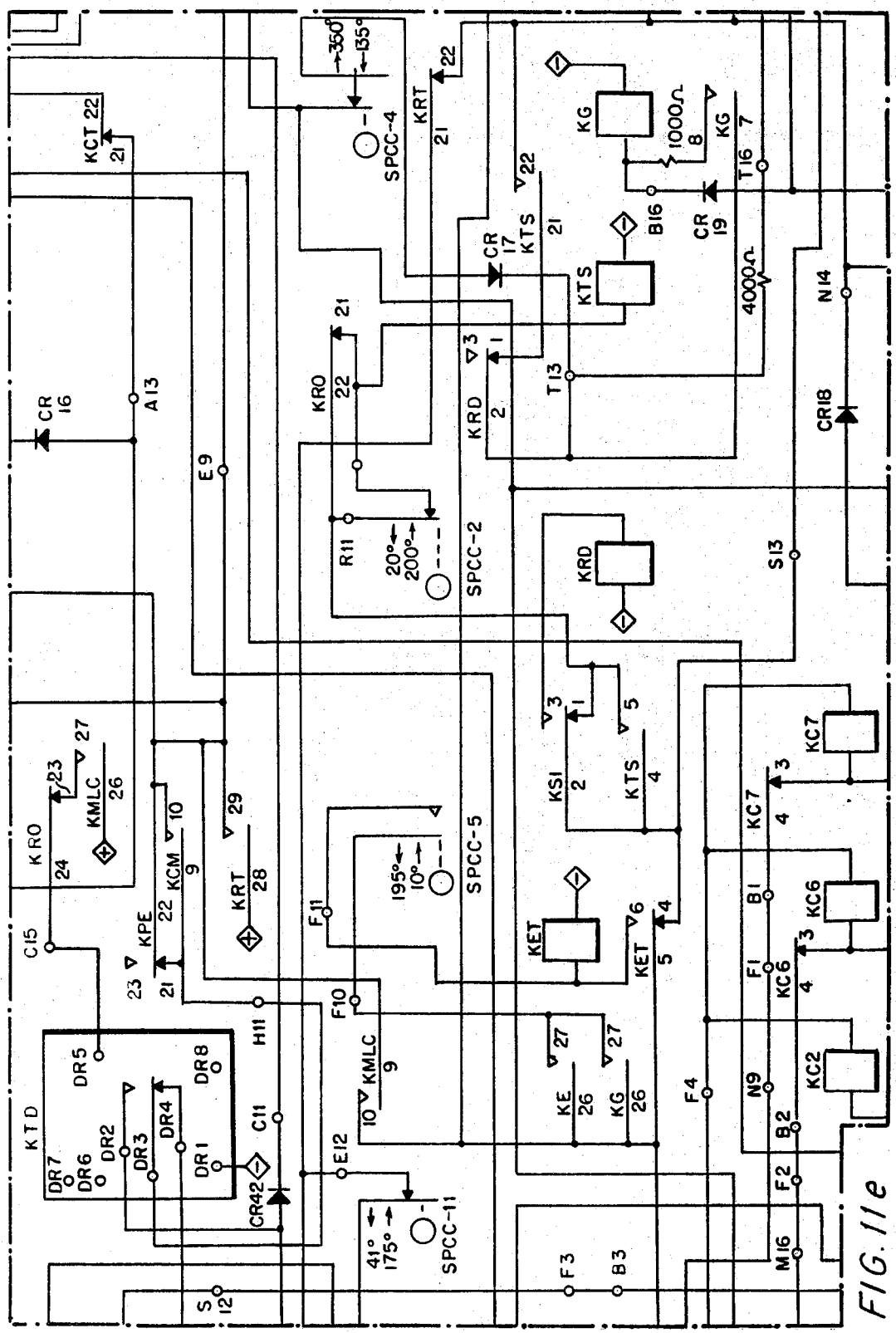
Figure 11F:
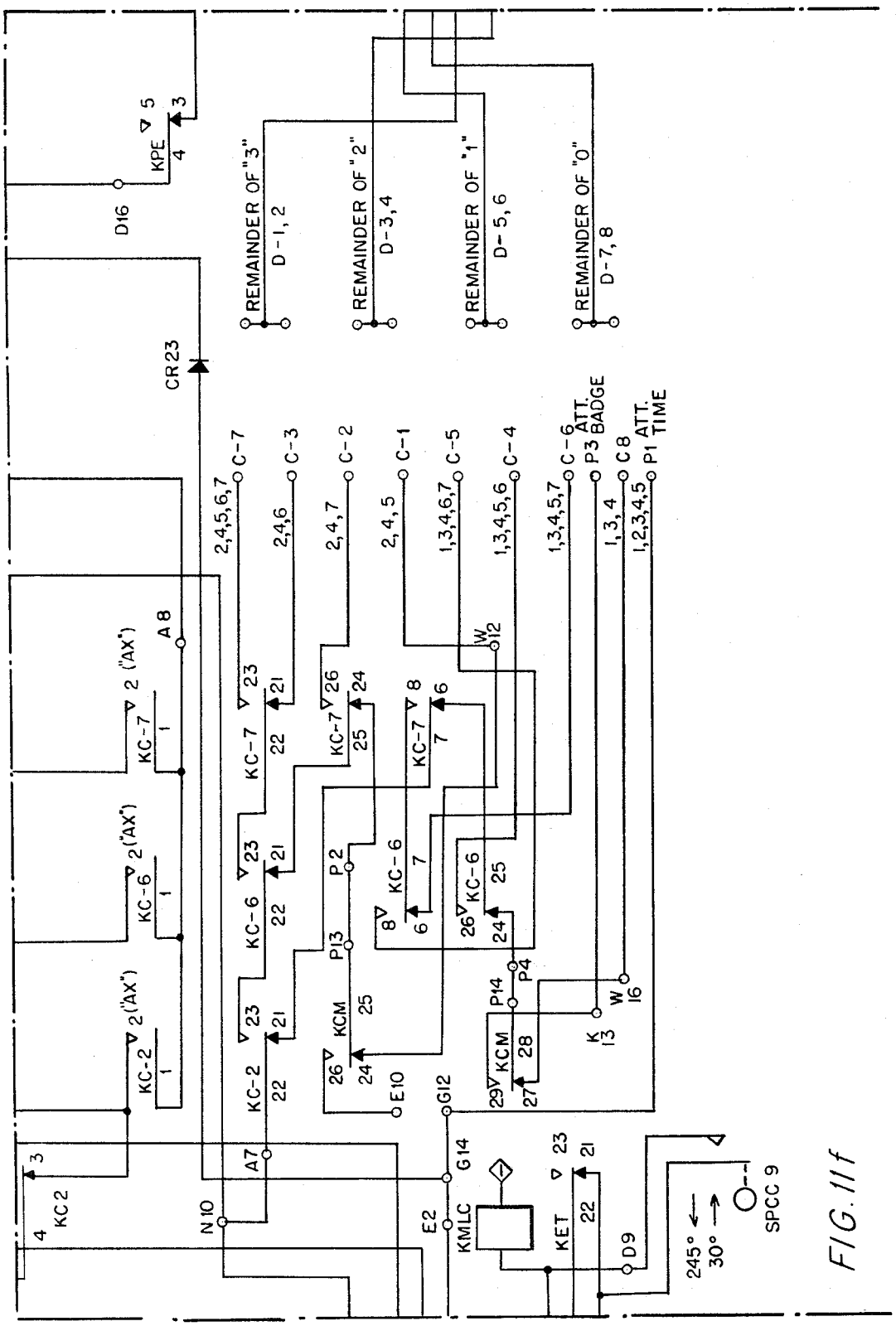

The code storage relays KC2, KC6 and KC7 have electrically interconnected contacts as shown in FIG. 11f which become energized at this time through a circuit which includes the normally closed contacts 1 and 2 of the relay KET, the normally closed contacts of punch cam actuated contacts SPCC3, the now closed contacts 25 and 26 of the relay KTS, the now closed contacts 23 and 24 of the relay KSI, a jumper connection between the line terminal JLY and the line terminal JLe, and the now closed contacts 2 and 4 of the relay KCD. According to the particular transaction code stored in the transaction code storage relays KC2, KC6 and KC7, one of the output terminals C1–C8 is energized through the storage relay contacts interconnected as shown. The number of digits transmitted, including the transaction code digit, for each transaction program selected, is preestablished and the terminals C1–C8 are accordingly jumper connected to an appropriate one of the terminals D1–D8 corresponding to the "modulus-four" remainder which should prevail by operation of the message length count relays KMLO–KML3 in effecting a count of the number of received digits. If the correct number of digits has been received and counted, the energization applied to the transaction code storage relay contacts shown in FIG. 11f will be applied to one of the output terminals C1–C8 and by jumper connection to one of the terminals D1–D8 and will further be applied through now closed ones of the contacts 21–23 of the message length counter relays KMLO–KML3 and through the now closed contacts 3 and 4 of a relay KPE and a diode rectifier CR19 to energize a message good relay KG.

The message good relay KG remains energized at this time through either or both of two hold energizing circuits; (1) through the contacts 7 and 8 of the relay KG, the diode rectifier device CR17, and the normally closed contacts of the punch cam actuated contacts SPCC4 to the energizing circuit which extends through the diode rectifier device CR41 and the now closed contacts 9 and 10 of the relay KMLC; and (2) through the original energizing circuit earlier described and which includes contacts of the message length relays KMLO through KML3 and contacts of the transaction code storage relays KC2, KC6 and KC7. The energization applied to the relay KG is also applied through a diode rectifier CR22 to one energizing winding of the error relay KE, but this relay is reverse energized at this time through the diode rectifier device CR18 (FIG. 11e) from the energizing circuit provided for the FIG. 11f contacts of the transaction code storage relays KC2, KC6 and KC7. Thus the error relay KE remains deenergized.

Energization of the relay KG as last described causes the line conductor JLH (FIG. 11b) to be positively energized through the now closed contacts 5 and 6 of the relay KG and from the energizing circuit which extends through the now closed contacts 9 and 10 of the relay KMLC. At the same time the now closed contacts 24 and 25 of the relay KG energize the punch magnet LP8, to record an "end of good message" 8-code, through the normally closed contacts of the cam actuated contacts SPCC10. It will be recalled from the previous description of the receiver interface unit that energization of the line conductor JLH as just described constitutes a signal which, by answer back transmission, is relayed to the transmitter to signify that the transmitted data has been correctly received and that this "message received good" signal causes the transmitter to lose access to the common data communication channel. At the same time, the receiver interface unit removes positive potential energization from the line conductor JLL (FIG. 11a).

The relay KET (FIG. 11e) is now energized during this punch cycle through the now closed contacts of the punch cam actuated contacts SPCC5 and the now closed contacts 26 and 27 of the message good relay KG from the energizing circuit which extends through the now closed contacts 9 and 10 of the relay KMLC. The relay KET remains energized through its now closed contacts 5 and 6 from the energizing circuits last mentioned. The contacts 1 and 2 (FIG. 11c) of the relay KET open to interrupt the original energizing circuit (extending through the storage relay contacts of FIG. 11f and the counter relay contacts of FIG. 11h) of the message good relay KG so that this relay becomes fully deenergized when the punch cam actuated contacts SPCC4 open at 135° of the punch cycle as the "end of good message" code 8 is punched. The massage length relay KMLC is also deenergized when the cam actuated contacts SPCC9 open at 245° of its punch cycle, the hold energizing circuit of the relay KMLC being interrupted by the now open contacts 21 and 22 of the relay KET. The now open contacts 4 and 5 (FIG. 11e) of the relay KET interrupt the hold energizing circuit of the message length count relays KMLO through KML3, and the hold energizing circuits of both the relay KRD and the relay KTS. The contacts 2 and 3 (FIG. 11c) of the relay KTS thereupon open to deenergize the hold circuit of the relay KSI, and the contacts 9 and 10 (FIG. 11e) of the relay KMLC open to deenergize the relay KET and interrupt the hold energizing circuit of the code storage relays KC2, KC6 and KC7.

The relay KLC (FIG. 11c) is now again energized through the normally closed contacts 1 and 2 of the relay KRO, the normally closed contacts 24 and 25 of the relay KET, the normally closed contacts 1 and 2 of the relay KTS, the normally closed contacts 3 and 4 of the delay relay KTD, the normally closed contacts 21 and 22 of the relay KPE, and the now closed contacts 28 and 29 of the relay KRT. The deenergization of the relay KMLC as last described effects closure of its contacts 5 and 6 once more to apply positive energization to the line conductor JLL (FIG. 11a) and to reenergize the relay KSI through the diode rectifier device CR16 from the earlier traced circuit extending to the conductor JLFF energized with positive potential by the receiver interface unit in operative condition.

If the receive switch 11–S1 should be manually actuated to its OFF position while a data transmission is in progress, the receive transmission relay KRT is nevertheless maintained energized to completion of the transmission (1) through the now closed contacts 25 and 26 of the relay KSI, or (2) through the diode rectifier CR30, the now closed contacts 9 and 10 of the relay KRT, the now closed contacts 24 and 25 of the relay KMLC, and the now closed contacts 28 and 29 of the relay KRT.

The foregoing description of the receiver operation assumed that the good relay KG (FIG. 11e) became energized through the contacts of the message length counter relays KMLO–KML3 of FIG. 11h and the contacts of the transaction code storage relays KC2, KC6 and KC7 of FIG. 11f by reason of the reception of a message having the correct number of data digits. If, however, there should be an incorrect number of digits received at the time the receiver interface unit briefly removes (for a 12 millisecond interval) energization from the line conductor JLL (FIG. 11a) first to deenergize and then to reenergize the relay KSI (FIG. 11d), an error indication is provided. Upon reenergization of the relay KSI by the "end of message" signal, the previously described energization applied to the contacts of the transaction storage relays KC2, KC6 and KC7 of FIG. 11f is applied through the diode rectifier CR18 to energize one winding of the error relay KE but no energization is applied to the relay KG or the reverse energizing circuit of the relay KE from the contacts of the message length counter relays KMLO–KML3 shown in FIG. 11h. This energizes the error relay KE, and its contacts 7 and 8 (FIG. 11b) and 22 and 23 cause the punch unit to record a cancel code 1–2–3–4–7. A relay KEH (FIG. 11d) is thereupon energized through the now closed contacts 28 and 29 of the error relay KE, the now closed contacts 22 and 23 of the relay KRD, and the now closed contacts 5 and 6 of a reset switch 11–S2. The contacts 4 and 5 of the relay KEH close to energize a MONITOR (RED) error indicator light (FIG. 11d), and the contacts 2 and 3 of the relay KEH now close to maintain the relay energized through the contacts 5 and 6 of the reset switch 11–S2. This indicates a length of message error, and an error signal is transmitted to the receiver interface unit by removal of positive energization from the line conductor JLP (FIG. 11a) by opening of the contacts 1 and 2 of the error relay KE. As previously described in connection with the receiver interface unit, deenergization of the line conductor JLP causes the simplex line to the transmitter interface unit to be interrupted under such conditions as to cause the data transmitter to lose access to the common data communication channel and to light an error-repeat indicating lamp and energize an error buzzer at the transmitter. The contacts 26 and 27 (FIG. 11e) of the error relay KE close to duplicate the relay sequence deenergization previously described as being effected by energization of the relay KG to close its contacts 26 and 27. The receiver thus is restored to a condition in readiness to receive a further data transmission, but there is the difference that no "message good" energization of the line conductor JLH (FIG. 11b) takes place due to the length of message error. Manual actuation of the reset switch 11–S2 deenergizes the relay KEH to extinguish the error MONITOR light.

Assume now that during transmission of data to the receiver energization is removed from the line conductor JLL (FIG. 11a) for some reason. This deenergizes the relay KSI (FIG. 11d) which opens its contacts 2 and 3 to deenergize the relay KRD (FIG. 11e). The relay KTS (FIG. 11e) is thereupon energized in the manner previously described, and the contacts 1 and 2 of the relay KTS deenergize the relay KLC to effect disconnection of the data input conductors JLA–JLF and JLH from the punch magnets LP1–LP7. If the relay KSI remains deenergized sufficiently long to permit the delay relay KRD to close its contacts, the error relay KE (FIG. 11g) is energized through the now closed contacts 21 and 22 of the relay KTS, the now closed contacts 1 and 2 of the relay KRD, the diode rectifier CR17, and the punch cam actuated contacts SPCC4 from the energizing circuit which extends through the now closed contacts 9 and 10 of the relay KMLC. A cancel code 1–2–3–4–7 is thereupon recorded and a sequence of relay deenergization thereupon takes place in the manner last described to place the receiver in condition to receive a further transmission. As before, the contacts 1 and 2 (FIG. 11a) of the relay KE interrupt energization of the line conductor JLP to transmit an error signal to the data transmitter, and the receiver upon being returned to receiving condition does not transmit a message good signal through the line conductor JLH (FIG. 11b).

The tape punch recorder unit includes a system of parity check contacts 55 (FIG. 11g) interconnected as shown in the Blodgett et al. U.S. Patent No. 2,905,298 to provide continuity of an electrical circuit through the contacts upon recording of an information item having erroneous parity. For the data collection system herein described all codes have odd parity, so that electrical continuity is established through the contacts of the parity check contact system 55 should the punch unit record an erroneous even parity code. When this occurs, an electrical relay KPE (FIG. 11g) is energized through the parity check contact system 55 and the punch cam actuated contacts SPCC8 at 125° of the punch cycle from the energizing circuit which extends through the now closed contacts 9 and 10 of the relay KMLC. The relay KPE remains energized through its contacts 1 and 2 "AX" from the energizing circuit last mentioned. The parity check contact system 55 in similar manner energizes the relay KEH (FIG. 11d) which remains energized through its now closed contacts 2 and 3 and the normally closed contacts 5 and 6 of the reset switch 11–S2. The now closed contacts 4 and 5 of the relay KEH energize the MONITOR (RED) indicator light to indicate the parity error which has occurred. Upon energization of the relay KPE as just described, its contacts 21 and 22 (FIG. 11e) open to remove the positive energization applied to the line conductor JLP, so that the receiver interface unit is no longer able to impress positive potential energization on the line JLL with consequent deenergization of the relay KSI. Since the relay KPE remains energizes so long as the contacts 9 and 10 (FIG. 11e) of the relay KMLC are closed, the period of deenergization of the relay KSI is of prolonged duration more than sufficient to allow the contacts of the relay KRD to close after deenergization of the latter by the opening of the contacts 2 and 3 of the relay KSI. The concurrent deenergization of the relays KSI and KRD effects the recording by the punch unit of a 1–2–3–4–7 cancel code and the initiation of a relay deenergization sequence initiated by the error relay KE in the manner last described and by which the receiver is placed in condition to receive a further data transmission.

The time delay relay KTD (FIG. 11e) is energized through the contacts 26 and 27 of the relay KMLC each time this relay becomes energized at the outset of a data transmission to the receiver. The time delay relay KTD provides a 10 second delay, and if any operating condition of the system prevails which prevents the completion of a data transmission within this 10 second delay the contacts 3 and 4 of the relay KTD open and its contacts 2 and 3 close to energize the relay KEH through the diode rectifier CR42 and thereby illuminate the MONITOR (RED) error indicator light. The opening of the contacts 3 and 4 of the relay KTD interrupts the positive energization applied to the line conductor JLP with consequent deenergization through the receiver interface unit of the line JLL to deenergize the relay KSI for a prolonged period. This prolonged deenergization of the relay KSI with resultant concurrent deenergization of the relay KRD effects recording by the punch unit of a cancel code and the initiation of a relay sequence deenergization in the manner previously described to condition the receiver for a further data transmission. The relay KTD is deenergized each time the relay KMLC is deenergized to open its contacts 26 and 27, and this deenergization of the relay KTD quickly resets it again to provide its normal time interval delay measurement upon its next period of energization.

If the supply of tape to the punch unit should become nearly exhausted, low tape contacts SLT (FIG. 11d) close to energize the alarm buzzer 53 and to illuminate the error light 54 but without interruption of operation of the receiver. This energizing circuit extends from the buzzer 53 and error light 54 through the now closed contacts 2 and 3 of the relay KLP, the now closed SLT contacts, and the now closed contacts 26 and 27 of the relay KRT.

If the tape supplied to the tape punch unit should break or become exhausted, the tape contacts SPT (FIG. 11a) open to interrupt the hold energizing circuit of the relay KLP. The contacts 23 and 24 of the relay KLP open to deenergize the relay KRT, and the contacts 5 and 6 of the relay KLP open to interrupt the positive energization applied to the line conductor JLP with consequent deenergization through the receiver interface unit of the line conductor JLL and consequent prolonged deenergization of the relay KSI. The various contacts of the relay KRT open to deenergize all relays which stand energized at this time, thus requiring manual operation of the tape-feed switch 11–S3 to return the receiver to its operative state to receive a further data transmission.

The foregoing description of the receiver-recorder unit assumes that the system includes no time transmitter. Assume, however, that the system operates with a time transmitter but that in doing so neither the manual nor automatic attendance mode of operation of the system is employed.

The operation of the receiver is then the same as that previously described through the second energization of the relay KSI effected when the receiver interface unit after its "end of message" signal reenergizes the line conductor JLL. If at this time the time transmitter is not in a period of time change and otherwise stands in readiness to make a time transmission, a relay KRO (FIG. 11a) is energized through a circuit which includes the normally closed contacts 21 and 22 of the relay KCM, the normally closed punch cam actuated contacts SPCC3, the now closed contacts 25 and 26 of the relay KTS, the now closed contacts 23 and 24 of the relay KSI, and a circuit completed through the time transmitter (in the manner described in the aforementioned copending application Ser. No. 254,896) from the line conductor JLY to the line conductor JLe and through the now closed contacts 2 and 4 of the relay KCD. The contacts 5–14 and 25 and 26 of the relay KRO thereupon close to connect the punch magnets LP1–LP6 to individual ones of the time data transmission line conductors JLh, JLj, JLk, JLm, JLn and JLp extending from the time transmitter to the receiver. The relay KRO is maintained energized through its now closed contacts 31 and 32, the normally closed contacts 27 and 28 of the relay KET, a diode rectifier CR15, and a circuit extending through the time transmitter from the line conductor JLX to the line conductor JLe so that the relay KRO remains energized until serializer contacts of the time transmitter open upon completion of the time data transmission.

The now closed contacts 29 and 30 (FIG. 11a) of the relay KRO and the now closed contacts 23 and 24 of the relay KTS complete a circuit between the line conductors JLb and JLZ which energizes the time transmitter serializer clutch magnet to initiate a cycle of serializer time digit read out operation. The time digit codes transmitted by the time transmitter are recorded by the tape punch unit in the same manner as data received from a data transmitter, and the number of time digits are included in the message length of the data transmission and are counted in the manner previously described by the message length counting relays of FIG. 11h. The time transmitter sends an "end of time message" signal by positive energization applied to the line conductor, JLc (FIG. 11c), and this energization is applied through the now closed contacts 33 and 34 of the relay KRO and the normally closed contacts 1 and 2 of the relay KET to the FIG. 11f contacts of the transaction code storage relays KC2, KC6, and KC7 to effect energization in the manner earlier described of the transmission good relay KG if the length of message (i.e., the number of data digits including the time digits transmitted) corresponds to the length of message specified by the transaction program selected. Otherwise an incorrect message length effects energization of the error relay KE. Energization of the transmission good relay KG or error relay KE causes a recording by the punch unit of a message good code or a cancel code and the initiation of a sequence of relay deenergizations in the manner earlier described to place the receiver in condition to receive a new data transmission. While this is occurring, the time transmitter interrupts the hold energizing circuit extending through the line conductor JLX to deenergize the relay KRO.

When the data collection system uses a time transmitter and is to operate in either the manual or automatic attendance mode, a jumper connection extending between terminals G14 and G12 of FIG. 11f is removed as is the jumper connection between the terminals A15 and B15 of FIG. 11c, and a jumper connection is now made between terminals G12 and E10 of FIG. 11f.

As more fully explained in the aforementioned copending application, the data collection system is changed over to the manual or automatic attendance mode of operation upon an occurrence of a time change of the time clock in the time transmitter. A time transmitter relay (KARC) is energized for 13 seconds at this time change, and a further time transmitter relay (KRR) must be energized to complete change-over to the attendance mode of operation. The time transmitter relay KRR is directly energized for this purpose, but may be reverse energized temporarily if a circuit is completed between the line conductors JLd and JLf (FIG. 11c) through either of the contacts 7 and 8 of the relay KMLC or the contacts 4 and 5 of the relay KSI of which one or both will be energized if a data transmission is in progress at the time of the attempted change-over of the system to the attendance mode. An additional time transmitter relay (KTS) is energized, however, and applies positive energization to the conductor JLT. If no data transmission is in progress, the counter relay KMLO will be deenergized, and the energization of the conductor JLT effects energization of a relay KCT through the normally closed contacts 24 and 25 of the relay KMLO and the now closed contacts 27 and 28 of the relay KLP. The contacts 21 and 22 (FIG. 11e) of the relay KCT open to prevent receiver energization of the relay KSI and receiver energization of the line conductor JLL, which energization it will be recalled is necessary to enable a new data transmission to be initiated. The opening of the contacts 21 and 22 of the relay KCT does not, however, deenergize the relay KSI while the latter is energized through the line JLL from the receiver interface unit while a data transmission is in progress so that this transmission is not interrupted by energization of the relay KCT. Further, the completion of the data transmissions may be accompanied by a receiver request for a time transmission from the time transmitter, and by the recording of the time transmissions followed by normal message length check as previously described.

Now as soon as any in-progress data transmissions are completed, the earlier mentioned relay KRR of the time transmitter is energized and energizes a relay KCM (FIG. 11c) through a line conductor JLa and a diode rectifier device CR20. The previously energized relay KCT is now maintained energized through its now closed contacts 23 and 24, the normally closed contacts 4 and 5 of the relay KMLO, and the now closed contacts 1 and 2 of the relay KCM. Also the relay KRO (FIG. 11a) is energized through a circuit which includes the now closed contacts 11 and 12 of the relay KRT, and the now closed contacts 25 and 26 of the relay KCT to a line conductor JLV which was energized as soon as the transmitter relay KRR became energized. The contacts 5–14 and 25 and 26 of the relay KRO connect the punch magnets LP1–LP6 to the time data transmission lines conductors JLh, JLj, JLk, JLm, JLn, and JLp extending to the time transmitter. The now closed contacts 29 and 30 of the relay KRO (FIG. 11a) and the now closed contacts 25 and 26 of the relay KCT connect the line conductor JLb to the line conductor JLZ to initiate operation of the time transmitter read-out serializer.

Each time transmission in the attendance mode of operation is preceded by an attendance mode code 1–2–3–4–5 which is recorded, and the "2" bit of this code is stored in the transaction code storage relay KC2 of FIG. 11e. Each time digit transmitted (including the attendance mode code) is counted by the message length counter relays KMLO–KML3 of FIG. 11h. The counter relay KMLO is energized in counting the attendance mode code, and its contacts 4 and 5 open to interrupt the hold energizing circuit of the relay KCT which thereupon becomes energized since the time transmitter has just previous to this time deenergized the line conductor through which the relay KCT was previously energized. The end of transmission signal is transmitted as a positive energization of the line conductor JLc, and this energization is appplied through the now closed contacts 33 and 34 of the relay KRO, the normally closed contacts 1 and 2 of the relay KET, the now closed contacts 22 and 23 of the storage relay KC2, normally closed contacts 21 and 22 of the relay KC6, normally closed contacts 24 and 25 of the relay KC7, and now closed contacts 25 and 26 of the relay KCM to the "Attendance Time" terminal P1 jumper wired to an appropriate one of the counter input terminals D1–D8. A correct number of time digits accordingly effects energization of the message good relay KG in the manner previously explained, or an error of time transmission effects energization of the error relay KE. Energization of the latter relays effects a corresponding recording of a transmission good code or a cancel code by the punch unit.

After this initial time recording effected at the time of change-over of the system to the attendance mode, either manual or automatic, a time transmitter relay (KAM) remains energized throughout the attendance mode period of operation and in turn maintains the relay KCM (FIG. 11c) energized through the line conductor JLa. Each subsequent time change of the time clock effects energization of the earlier mentioned time transmitter relays KTS and KRR to effect energization of the receiver relays KCT and KRO for a time transmission recording accomplished in the manner just described. While each such time transmission is in progress, the contacts 21 and 22 (FIG. 11e) of the relay KCT again close to effect ultimate receiver energization of the relay KSI and energization of the line conductor JLL at the end of the time transmission so that the system data transmitters may transmit badge data to the receiver for recording. However, a conductor JLU (FIG. 11c) is positively energized at this time through the now closed contacts 7 and 8 of the relay KCM, and it will be recalled that the energization of this line so controls the receiver interface unit as to effect energization of an attendance relay in each data transmitter to change its operation to one for transmitting badge data information only.

While the system is in the attendance mode of operation, it may be desirable manually to operate the receive switch 11-S1 to its OFF position such as for the purpose of putting a new supply of tape on the tape punch unit. If no transmission is in progress, operation of the switch 11S-1 to its OFF position deenergizes the relays KSI and KRT, and the latter thereupon closes its contacts 3 and 4 (FIG. 11c) to energize the relay KCT, the normally closed contacts 4 and 5 of the relay KMLO, and the now closed contacts 1 and 2 of the relay KCM. The relay KRO is thereupon energized as soon as the relay KRT becomes once more energized, by actuation of the tape feed switch 11-S3 for several punch cycles followed by actuation of the receive switch 11-S1 to its ON position, and closes its contacts 11 and 12 (FIG. 11a). The contacts 29 and 30 (FIG. 11a) of the relay KRO thereupon close to cause a time transmission to take place and to be recorded by the punch unit.

The present receiver may, if desired, have a different character of operation than that previously described. In this modified form of operation, the receiver makes a final length of message check upon receiving the "end of message" signal from the receiver interface unit (a 12 millisecond interruption of energization of the line conductor JLL) without requesting a time transmission from the time transmitter. The operation of the latter is so modified, as explained in the aforementioned copending application, that it effects periodic time transmissions without regard to whether the overall system is operating in the normal data transmission mode or in the attendance mode.

This character of receiver operation is selected by removing the jumper connection between the terminals S14 and S15 and completing a jumper connection between the terminals S10 and S14 in FIG. 11a, by completing a jumper connection between the terminals A15 and B15 of FIG. 11c, by completing a jumper connection between the terminals Q10, Q12 and L14, of FIG. 11c, and by removing the jumper connection between the terminals E10 and G12 and completing a jumper connection between the terminals G12 and G14 and between the terminals P13 and W12 of FIG. 11f. With these modified jumper connections, the brief interruption of energization of the line conductor J11 (FIG. 11a) by the receiver interface unit in transmitting the "end of message" signal effects the previously described sequential energization of the relays KTS and KSI. The time transmitter applies continuous energization to the line conductor JLY (FIG. 11a), and this energization is now applied through the now closed contacts 23 and 24 of the relay KSI, the now closed contacts 25 and 26 of the relay KTS, and the normally closed contacts of the punch cam actuated contacts SPCC3 to the contacts of the transaction code storage relays KC2, KC6 and KC7 shown in FIG. 11f. This effects check of the message length, and either the message good relay KG or the error relay KE is thereupon energized to effect recording of a message good code or a cancel code and the initiation of a relay sequence to place the receiver in condition for reception of a further data transmission as previously described. It will be noted in this respect that the length of message check is not preceded by a time transmission requested by the receiver in response to the receiver interface unit "end of message" signal.

The time transmitter now makes periodic time transmissions in a manner similar to that previously described in connection with the periodic time transmissions during the attendance mode of system operation. In this, the time transmitter upon each time change energizes the relay KCT (FIG. 11c) and the relay KRO (FIG. 11a) but without energization of the relay KCM (FIG. 11c). Each time transmission is preceded by an attendance time code 1-2-3-4-5 of which the "2" bit of the code is stored in the code storage relay KC2 (FIG. 11f), and each time transmission is terminated by an "end" signal appearing as a positive energization of the line conductor JLc (FIG. 11c). The latter energization is applied through the now closed contacts 33 and 34 of the relay KRO, the jumper connections between the terminals Q11 and Q12, the normally closed contacts 7 and 8 of the relay KET, the now closed contacts 7 and 8 of the code storage relay KC2, and the jumper connection between the terminals G12 and G14 to the "attendance time" terminals P1 which is jumper connected to an appropriate one of the counter input terminals D1-D8. The energization applied to the terminal G14 of FIG. 11f is also applied through a diode rectifier device CR23 to one energizing circuit of the error relay KE, and accordingly either the latter relay or the message good relay KG is energized in accordance with the length of message check effected by the counter relays KMLO-KLM3 of FIG. 11h. As before, the relay KCT is deenergized when the counter relay KMLO in initiating a count operation opens its contacts 4 and 5 to interrupt the hold energizing circuit of the relay KCT.

It will be apparent from the foregoing description of the invention that a data transmission system embodying the invention enables one or a group of data transmitters to be coupled through a relatively simple and economical form of common data transmission channel to a remotely situated data receiver without sacrifice of speed of data transmissions and while preserving full system control over transmitter inter-related operations. A data transmission system embodying the invention not only permits a remotely situated data receiver to receive and record data supplied by one or more local data transmitters transmitting through a simple simplexed form of two conductor transmission channel of telephone-line quality, but also controls through such channel the individual operation of each transmitter and the electrically interlocked operations of plural transmitters together with the automatic stand-by operation of a local data receiver which receives and preserves transmitted data upon operational failure for any reason of the transmission channel or remote receiver.

While there has been described one specific embodiment of the invention for purposes of illustration, it is contemplated that numerous changes may be made without departing from the spirit of the invention.

What is claimed is:

1. A data communication system comprising a two-conductor transmission line, a data transmitter for supplying to said line a succession of alternating-current-tone mark and space code-bit groups each representing an individual item of data information and for transmitting an end-of-message signal, a data receiver coupled to said line for receiving and utilizing said tone code-bit-group data transmissions, transmitter control means having a first operative state permitting initiation of data transmissions and a second operative state which immediately inactivates said transmitter prior to said end-of-message signal but which effects delayed inactivation of said transmitter following said end-of-message signal, and receiver control means coupled through said line continuously to control said transmitter control means and responsive to each data-receptive operative state of said receiver for establishing said first operative state of said transmitter control means to permit said initiation of data transmissions but responsive to an end-of-message signal received by said receiver for establishing said second operative state of said transmitter control means to effect said delayed inactivation of said transmitter.

2. The combination as set forth in claim 1 wherein said receiver control means responds to an error reception by said receiver for establishing said second operative state of said transmitter control means to effect immediate inactivation of said transmitter.

3. The combination as set forth in claim 1 wherein said transmitter control means includes a transmitter relay having a first and second operative state, and a relay in said data receiver having contacts coupled through said line continuously to control said transmitter relay and having a winding energized in response to each data-receptive operative state of said receiver for establishing said first operative state of said transmitter relay, and wherein said data receiver relay is deenergized in response to an end-of-message signal received by said receiver for establishing said sceond operative state of said transmitter relay, and wherein the first and second operative states of said transmitter relay correspond to the said first and second operative states of said transmitter control means.

4. A data communication system comprising a two-conductor transmission line, a data transmitter, tone generator means responsive to data transmissions supplied thereto for supplying to said line a succession of alternating-current-tone mark and space code-bit groups each representing an individual item of data information and for transmitting an end-of-message signal, a data receiver coupled to said line for receiving and utilizing said tone code-bit-group data transmissions, a standby data receiver, transmitter control means having first and second operative states respectively permitting and preventing initiation of data transmissions, receiver control means coupled through said line continuously to control said transmitter control means and responsive to the data-receptive and non-receptive operative states of said receiver for respectively establishing said first and second operative states of said transmitter control means respectively to permit and prevent said initiation of data transmissions by said transmitter, and means responsive to a preselected duration of said second operative state of said transmitter control means for transferring from said transmitter control means to said standby receiver control over the initiation and termination of data transmissions and for terminating the supply of data transmissions to said tone generator means while concurrently establishing the supply of data transmissions to said standby receiver.

5. A data communication system comprising a two-conductor transmission line, a data transmitter for supplying to said line a succession of alternating-current-tone mark and space code-bit groups each representing an individual item of data information and for transmitting an end-of-message signal, a data receiver coupled to said line for receiving and utilizing said tone code-bit-group data transmissions, transmitter control means having first and second operative states respectively permitting and preventing initiation of data transmissions, means responsive to a newly initiated data transmission occurring prior to establishment of said second operative state of said control means for transmitting through said line to said receiver control tones indicative of said transmission initiation, receiver control means coupled through said line continuously to control said transmitter control means and responsive to the data-receptive and non-receptive operative states of said receiver for respectively establishing said first and second operative states of said transmitter control means respectively to permit and prevent said initiation of data transmissions, and receiver means responsive to said control tones for preventing establishment of a non-receptive operative state of said receiver until completion of the newly initiated data transmission.

6. A data communication system comprising a two-conductor transmission line, a data transmitter for supplying to said line a succession of alternating-current-tone mark and space code-bit groups each representing an individual item of data information and for transmitting an end-of-message signal, a data receiver coupled to said line for receiving and utilizing said tone code-bit-group data transmissions, an answer-back receiver at said transmitter and an answer-back transmitter at said receiver, transmitter control means having a first operative state permitting initiation of data transmissions and a second operative state which immediately inactivates said transmitter prior to said end-of-message signal but which subsequent to transmission of said end-of-message signal couples said answer-back receiver to said transmission line to receive a mesage acknowledgement signal effecting inactivation of said transmitter, and receiver control means coupled through said line continuously to control said transmitter control means and responsive to each data-receptive operative state of said receiver for establishing said first operative state of said transmitter control means to permit said initiation of data transmissions but responsive to an end-of-message signal received by said receiver for establishing said second operative state of said transmitter control means while coupling said answer-back transmitter to said transmission line for transmission of said acknowledgement signal.

7. The combination as set forth in claim 6 wherein said transmitter control means is effective after a preselected time delay to couple said answer-back receiver to said transmission line to receive said message acknowledgement signal to control the further operations of said transmitter subsequent to the transmission of said end-of-message signal.

8. The combination as set forth in claim 7 wherein said message acknowledgement signal may be any of plural control signal codes effective to select individual ones of plural modes of transmitter operation available for further data transmissions.

9. The combination as set forth in claim 6 wherein said acknowledgement signal is transmitted in response to receipt of an error-free message, and means included in said transmitter control means for effecting inactivation of said transmitter upon failure of said answer-back receiver to receive said message acknowledgement signal within a delay interval of preselected duration.

10. A data communication system comprising a two-conductor transmission line, a data transmitter for supplying to said line a succession of alternating-current-tone mark and space code-bit groups each representing an individual item of data information and for transmitting an end-of-message signal, a data receiver coupled to said line for receiving and utilizing said tone code-bit-group data transmissions, an answer-back receiver at said transmitter and an answer-back transmitter at said receiver, transmitter control means having a first operative state permitting initiation of data transmissions and a second operative state which immediately inactivates said transmitter prior to said end-of-message signal but which subsequent to transmission of said end-of-message signal transfers the coupling of said transmission line from said data transmitter to said answer-back receiver to receive a message acknowledgement signal effecting inactivation of said data transmitter, and receiver control means coupled through said line continuously to control said transmitter control means and responsive to each data-receptive operative state of said receiver for establishing said first operative state of said transmitter control means to permit said initiation of data transmissions but responsive to an end-of-message signal received by said receiver for establishing said second operative state of said transmitter control means while transferring the coupling of said transmission line from said data receiver to said answer-back transmitter for transmission of said acknowledgement signal.

11. A data communication system comprising a two-conductor transmission line, a data transmitter for supplying to said line a succession of alternating-current-tone mark and space code-bit groups each representing an individual item of data information and for transmitting an inter-message signal indicative of the initial and continuing operability of said transmitter, a data receiver coupled to said line for receiving and utilizing said tone code-bit-group data transmissions, transmitter control means having a first operative state permitting initiation of data transmissions and a second operative state which terminates data transmissions, and receiver control means coupled through said line continuously to control said transmitter control means and jointly responsive to said inter-message signal and to each data-receptive operative state of said receiver for establishing said first operative state of said transmitter control means to permit said initiation of data transmissions but individually responsive to absence of said inter-message signal at said receiver and to a non-receptive operative state of said receiver for establishing said second operative state of said transmitter control means to terminate said data transmissions.

12. The combination as set forth in claim 11 and including delay means responsive to the initial and each subsequent control of said transmitter control means to said first operative state thereof for preceding the initiation of each data transmission with an all-space signal of at least one preselected duration established by said delay means to condition said data receiver for reception of an ensuing data transmission.

13. A data communication system comprising a two-conductor transmission line, a data transmitter for supplying to said line a succession of alternating-current-tone mark and space code-bit groups each representing an individual item of data information and for initiating and continuing each data transmission with a message-hold signal followed by an end-of-message signal, a data receiver coupled to said line for receiving and utilizing said tone code-bit-group data transmissions, an answer-back receiver at said transmitter and an answer-back transmitter at said receiver, transmitter control means having a first operative state permitting data transmissions and a second operative state which effects transfer of said line from said transmitter to said answer-back receiver for answer-back control over said transmitter operations, and receiver control means coupled through said line continuously to control said transmitter control means and responsive to each data-receptive operative state of said data receiver and to said message-hold signal for first establishing and thereafter maintaining said first operative state of said transmitter control means to permit said data transmissions but responsive to an end-of-message signal received by said data receiver for establishing said second operative state of said transmitter control means and for transferring said line from said data receiver to said answer-back transmitter to control said data transmitter.

14. The combination as set forth in claim 13 wherein said end-of-message signal is provided by briefly interrupting said message-hold signal, and wherein relay means are included at said data receiver and responsive to an end-of-message signal received thereby for controlling said receiver control means to establish said second operative state of said transmitter control means and for effecting transfer of said line from said data receiver to said answer-back transmitter to control said data transmitter.

15. A data communication system comprising a two-conductor transmission line, a data transmitter for supplying to said line a succession of alternating-current-tone mark and space code-bit groups each representing an individual item of data information and for initiating and containing each data transmission with a message-hold signal followed by an end-of-message signal, a data receiver coupled to said line for receiving and utilizing said tone code-bit-group data transmissions, an answer-back receiver at said transmitter and an answer-back transmitter at said receiver, transmitter control means having a first operative state permitting data transmissions and a second operative state which effects transfer of said line from said transmitter to said answer-back receiver for answer-back control over said transmitter operations, means responsive to initiation of said second operative state of said transmitter control means for maintaining said data transmitter activated for a preselected interval, receiver control means coupled through said line continuously to control said transmitter control means and responsive to each data-receptive operative state of said data receiver and to said message-hold signal for first establishing and thereafter maintaining said first operative state of said transmitter control means to permit said data transmissions, and means responsive to an end-of-message signal received by said data receiver for controlling said receiver control means to establish said second operative state of said transmitter control means and responsive to reception by said data receiver of an error-free message for transferring said line from said data receiver to said answer-back transmitter and for transmitting within said preselected interval a signal for control of said data transmitter.

16. A data communication system comprising a two-conductor transmission line, a data transmitter for supplying to said line a succession of alternating-current-tone mark and space code-bit groups each representing an individual item of data information and for transmitting an inter-message signal indicative of the initial and continuing operability of said transmitter, a data receiver coupled to said line for receiving and utilizing said tone code-bit-group data transmissions, transmitter control means having a first operative state permitting initiation of data transmissions and a second operative state which terminates data transmissions, receiver control means coupled through said line continuously to control said transmitter control means and jointly responsive to said inter-message signal and to each data-receptive operative state of said receiver for establishing said first operative state of said transmitter control means to permit said initiation of data transmissions but individually responsive to absence of said inter-message signal at said receiver and to a non-receptive operative state of said receiver for establishing said second operative state of said transmitter control means to terminate said data transmissions, and manual means which upon manual actuation thereof is responsive to the presence of said inter-message signal for effecting a non-receptive operative state of said data receiver with concurrent control through said line of said transmitter control means to said second operative state thereof.

17. A data communication system comprising a two-conductor transmission line, a data transmitter for supplying to said line a succession of alternating-current-tone mark and space code-bit groups each representing an individual item of data information and responsive to its readiness or lack of readiness to initiate a data transmission for transmitting respectively a message-hold signal and an all-space signal of which either is indicative of the continuing operability of said transmitter, a data receiver coupled to said line for receiving and utilizing said tone code-bit-group data transmissions, transmitter control means having a first operative state permitting initiation of data transmissions and a second operative state which terminates data transmissions, and receiver control means coupled through said line continuously to control said transmitter control means and responsive to either of said message hold and all-space signals and to each data-receptive operative state of said transmitter control means to permit said initiation of data transmissions but individually responsive to absence of both of said signals at said receiver and to a non-receptive operative state of said receiver for establishing said second operative state of said transmitter control means to terminate said data transmissions.

18. A data communication system comprising means for transmitting successive items of data information as electrical-pulse mark and space code-bit groups having parallel presentation of the code bits in each thereof, a two-conductor transmission line, translation means coupled to said transmitting means and responsive to each of said code-bit groups for supplying to said line corresponding alternating current mark and space tone code-bit groups having concurrent presentation of the code-bit tones in each thereof, first receiving means coupled to said line for receiving and utilizing said tone code-bit-group data transmissions, second receiving means adapted to receive and utilize said items of data information transmitted as electrical-pulse code-bit groups, transmitter control means having first and second operative states respectively permitting and halting data transmissions by said transmitting means, means at said first receiving means and responsive to the data receptive and non-receptive operative states thereof for controlling said transmitter control means respectively to said first and second operative states by use of a control signal transmitted through said transmission line concurrently with said data transmissions, and transfer means controlled by an uninterrupted continuance of said second operative state of said transmitter control means throughout an interval of preselected duration for transferring the coupling of said transmitting means from said translation means to said second receiving means and for terminating control over said transmitting means by said transmitter control means.

19. The combination as set forth in claim 18 and including stand-by control means operable to maintain said delay means non-responsive to said second operative state of said transmitter control means, and means responsive to a stand-by operative state of said first receiving means for operating said stand-by control means by use of a control signal transmitted thereto through said transmission line from said first receiving means.

20. The combination as set forth in claim 18 wherein said transfer means is initially controlled without delay by said second operative state of said transmitter control means and thereafter controlled by an uninterrupted continuance of said second operative state.

21. The combination as set forth in claim 18 wherein said transfer means are initially controlled manually upon completion of a data transmission.

22. The combination as set forth in claim 18 wherein said transfer means may subsequently be controlled without delay by the first operative state of said transmitter control means for retransferring the coupling of said transmitting means from said second receiving means to said translation means upon completion of a data transmission to said second receiving means and for restoring control over said transmitting means by said transmitter control means.

23. The combination as set forth in claim 18 wherein said transfer means also transfers data translation control over said transmitting means from said transmitter control means to said second receiving means.

24. A data transmitter comprising transmitter means adapted upon control by a control signal to transmit coded items of data information each presented in parallel-bit code form, translating means for translating said data information to a selected one of two physically independent data transmitting channels, control means adapted to be controlled by a remote data receiver coupled to one of said channels for controlling said translating means to effect transmission of said data information to said one channel while concurrently effecting supply of said transmitter means, second receiver means coupled to the other of said channels to receive data information transmitted thereto by said translating means while concurrently supplying said control signal through said translating means to said transmitting means, and directing means responsive to a data transmission in progress to said remote receiver means for preventing control by said control means of said translating means until completion of said data transmission in progress.

25. The combination as set forth in claim 24 and including manual means for controlling said translating means to effect selection thereby of said other transmitting channel, and wherein said directing means responds to a data transmission in progress through said one channel for preventing control by said manual means.

26. A data transmitter comprising transmitter means adapted upon control by a control signal to transmit coded items of data information each presented in parallel-bit code form, translating means for translating said data information to a selected one of two physically independent data transmitting channels, control means adapted to be controlled by a remote data receiver coupled to one of said channels for controlling said translating means to effect transmission of said data information to said one channel while concurrently effecting supply of said control signal through said translating means to said transmitter means, receiver means coupled to the other of said channels to receive data information transmitted thereto by said translating means while concurrently supplying said control signal through said translating means to said transmitting means, and means included in said control means and operative following termination of all control by said remote receiver over said control means during an interval of preselected duration for automatically controlling said translating means to effect transmission thereby of said data information to said other transmitting channel.

27. A data communication system comprising: a data transmitter for transmitting successive alpha-numeric characters, symbols, and functional control items of data information with each data transmission interval preceded by an initial pretransmission conditioning space signal and by a succeeding transmission alert message-hold signal; a data receiver for receiving data transmissions from said transmitter and including means responsive to reception of said conditioning space signal for initiating the conditioning of said receiver to receive a data transmission; means included in said receiver and responsive to said initial conditioning of said receiver for controlling said transmitter to permit continuance of data transmissions; and means included in said receiver and responsive to reception of said message-hold signal for completing the conditioning of said receiver to receive an ensuing data transmission from said transmitter.

28. A data communication system comprising: a data transmitter for transmitting successive alpha-numeric characters, symbols and functional control items of data information with each data transmission interval initiated by the successive transmissions of a conditioning space signal and an alert message-hold signal and terminated by an end-of-message signal; a data receiver for receiving data transmissions from said transmitter and including means responsive to reception of said conditioning space signal for initiating the conditioning of said receiver to receive a data transmission; means included in said receiver and responsive to said initial conditioning of said receiver for controlling said transmitter to permit continuance of data transmissions; means included in said receiver and responsive to reception of said message-hold signal for completing the conditioning of said receiver to receive an ensuing data transmission from said transmitter; and means included in said receiver and responsive to said end-of-message signal for terminating the receptive conditioned state of said receiver to await reconditioning thereof by said last-mentioned means in response to reception of a further conditioning space signal and message-hold signal.

29. A data communication system comprising: a data transmitter for transmitting successive alpha-numeric characters, symbols, and functional control items of data information with each data transmission interval preceded by an initial pretransmission conditioning space signal and by a succeeding transmission alert message-hold signal; a data receiver for receiving data transmissions from said transmitter and including means responsive to reception of said conditioning space signal for initiating the conditioning of said receiver to receive a data transmission; means included in said receiver and responsive to said initial conditioning of said receiver for controlling said transmitter to permit continuance of data transmissions; and means included in said receiver and responsive to detection of an error in the received data for terminating the receptive conditioned state of said receiver to await reconditioning thereof by said last-mentioned means in response to reception of a further conditioning space signal and message-hold signal.

30. A data communication system comprising: a data transmitter for transmitting successive alpha-numeric characters, symbols, and functional control items of data information with each data transmission interval preceded by an initial pretransmission conditioning space signal and by a succeeding transmission alert message-hold signal; a data receiver for receiving data transmissions from said transmitter and including means responsive to reception of said conditioning space signal for initiating the conditioning of said receiver to receive a data transmission; means included in said receiver and responsive to said initial conditioning of said receiver for controlling said transmitter to permit continuance of data transmissions; and means included in said receiver and responsive to detection of an error in the data received for controlling said transmitter to terminate data transmissions and for terminating the receptive conditioned state of said receiver to await reconditioning thereof by said last-mentioned means in response to reception of a further message-hold signal.

31. A data communication system comprising: a data transmitter for transmitting successive alpha-numeric characters, symbols and functional control items of data information with each data transmission interval initiated by the successive transmissions of a conditioning space signal and an alert message-hold signal and terminated by an end-of-message signal; a data receiver for receiving data transmissions from said transmitter and including means responsive to reception of said conditioning space signal for initiating the conditioning of said receiver to receive a data transmission; means included in said receiver and responsive to said initial conditioning of said receiver for controlling said transmitter to permit continuance of data transmissions; means included in said receiver and responsive to reception of said message-hold signal for completing the conditioning of said receiver to receive an ensuing data transmission from said transmitter; and means included in said receiver and responsive to said end-of-message signal for transmitting to said transmitter a signal indicative of error-free data reception by said receiver and for terminating the receptive conditioned state of said receiver to await reconditioning thereof by said last-mentioned means in response to reception of a further message-hold signal.

32. A data communication system comprising: a data transmitter for transmitting successive alpha-numeric characters, symbols, and functional control items of data information with each data transmission interval initiated by a pretransmission conditioning space signal and a succeeding transmission alert message-hold signal and terminated by an end-of-message signal; a data receiver for receiving data transmissions from said transmitter and including means responsive to reception of said conditioning space signal for initiating the conditioning of said receiver to receive a data transmission; means included in said receiver and responsive to said initial conditioning of said receiver for controlling said transmitter to permit continuance of data transmissions; mode control means in said receiver and having a first operative state effective to establish a first data communication mode of system operation but adapted to be controlled to a second operative state effective to establish a second data communication mode of system operation; control means in said transmitter and having a first operative state effective to establish a first data transmission mode of transmitter operation but adapted to be controlled to a second operative state effective to establish a second data communication mode of transmitter operation; and means included in said receiver and responsive to said first operative state of said mode control means and to said end-of-message signal for transmitting to said transmitter a signal indicative of error-free data reception by said receiver but responsive to establishment of said second operative state of said mode control means for transmitting a signal effective to control said transmitter control means to said second operative state thereof and for terminating all transmissions of said error-free indicative signal while said mode control means is in said second operative state thereof.

33. A data communication system comprising: a data transmitter for transmitting successive alpha-numeric characters, symbols, and functional control items of data information with each data transmission interval preceded by an initial pretransmission conditioning space signal and by a succeeding transmission alert message-hold signal; a data receiver for receiving data transmissions from said transmitter and including means responsive to reception of said conditioning space signal for initiating the conditioning of said receiver to receive a data transmission; means included in said receiver and responsive to said initial conditioning of said receiver for controlling said transmitter to permit continuance of data transmissions; and means included in said receiver and responsive to the initiation of a temporary or prolonged receiver deconditioning to reception of data transmissions for establishing a terminal delay interval during which each of said means is permitted to initiate and complete said conditioning of said receiver to receive one further data transmission and said first-named means is permitted to control said transmitter to permit continuance of said further data transmission.

References Cited
UNITED STATES PATENTS

| | | | |
|---|---|---|---|
| 3,001,009 | 9/1961 | Light et al. | 178—2 |
| 3,025,498 | 3/1962 | Blodgett | 178—2 |
| 3,109,068 | 10/1963 | Boyd et al. | 178—3 |
| 3,248,476 | 4/1966 | Cilino | 178—2 |

THOMAS A. ROBINSON, *Primary Examiner.*